US012756755B2

(12) United States Patent
Wang et al.

(10) Patent No.: US 12,756,755 B2
(45) Date of Patent: Oct. 6, 2026

(54) METHODS, ARCHITECTURES, APPARATUSES AND SYSTEMS DIRECTED TO TRANSACTION MANAGEMENT IN BLOCKCHAIN-ENABLED WIRELESS SYSTEMS

(71) Applicant: InterDigital Patent Holdings, Inc., Wilmington, DE (US)

(72) Inventors: Chonggang Wang, Princeton, NJ (US); Xu Li, Plainsboro, NJ (US); Paul Russell, Lawrence, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/011,908

(22) PCT Filed: Jun. 30, 2021

(86) PCT No.: PCT/US2021/039967
§ 371 (c)(1),
(2) Date: Dec. 21, 2022

(87) PCT Pub. No.: WO2022/006320
PCT Pub. Date: Jan. 6, 2022

(65) Prior Publication Data

US 2023/0247094 A1 Aug. 3, 2023

Related U.S. Application Data

(60) Provisional application No. 63/045,835, filed on Jun. 30, 2020.

(51) Int. Cl.

| | |
|---|---|
| ***H04L 67/1097*** | (2022.01) |
| ***H04L 9/00*** | (2022.01) |
| ***H04L 9/32*** | (2006.01) |

(52) U.S. Cl.
CPC ........ *H04L 67/1097* (2013.01); *H04L 9/3236* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 7,877,511 | B1 * | 1/2011 | Berger | G06F 16/10 709/212 |
| 10,299,128 | B1 | 5/2019 | Suthar et al. | |

(Continued)

FOREIGN PATENT DOCUMENTS

| | | | |
|---|---|---|---|
| CN | 107924389 | A | 4/2018 |
| CN | 109617787 | A | 4/2019 |

(Continued)

OTHER PUBLICATIONS

3rd Generation Partnership Project; Technical Specification Group Services and System Aspects; Study on support of the 5GMSG Service; (Release 17), 3GPP TR 23.700-24 V0.1.0 Aug. 2019, 13 pages.

(Continued)

*Primary Examiner* — Scott B Christensen
(74) *Attorney, Agent, or Firm* — Julian F. Santos

(57) ABSTRACT

Procedures, methods, architectures, apparatuses, systems, devices, and computer program products directed to transaction management in blockchain-enabled wireless systems are provided. Among the methods is a method that may include obtaining data from one or more sources and one or more parameters from at least one of the one or more sources; generating a transaction for the data based at least in part on the one or more parameters; determining a node (Continued)

BCA/BNA-Triggered BTM-Controlled Transaction Creation with an Auditor of a distributed ledger based at least in part on the one or more parameters; and sending the transaction to the node of a distributed ledger.

18 Claims, 36 Drawing Sheets

(56) References Cited

U.S. PATENT DOCUMENTS

| | | | |
|---|---|---|---|
| 10,484,341 B1 | 11/2019 | Todd et al. | |
| 10,554,407 B1 | 2/2020 | Greco et al. | |
| 10,630,485 B2 | 4/2020 | Zinder | |
| 10,713,100 B2 | 7/2020 | Shi et al. | |
| 10,789,597 B2 | 9/2020 | Brashers et al. | |
| 10,884,810 B1 | 1/2021 | Verma et al. | |
| 11,200,569 B1 | 12/2021 | James et al. | |
| 12,192,275 B2 | 1/2025 | Viswanathan et al. | |
| 2015/0081470 A1 | 3/2015 | Westphal | |
| 2016/0292672 A1 | 10/2016 | Fay et al. | |
| 2018/0096323 A1 | 4/2018 | Baber et al. | |
| 2018/0121909 A1 | 5/2018 | Christidis et al. | |
| 2018/0225640 A1 | 8/2018 | Chapman et al. | |
| 2019/0034922 A1 | 1/2019 | Castinado et al. | |
| 2019/0182254 A1 | 6/2019 | Christidis et al. | |
| 2019/0188699 A1* | 6/2019 | Thibodeau | G06Q 20/065 |
| 2019/0199700 A1 | 6/2019 | Abramowitz | |
| 2019/0236562 A1 | 8/2019 | Padmanabhan | |
| 2019/0238486 A1 | 8/2019 | Zizka | |
| 2019/0251199 A1* | 8/2019 | Klianev | G06Q 40/04 |
| 2019/0278852 A1 | 9/2019 | Jayachandran et al. | |
| 2019/0280855 A1 | 9/2019 | Tong | |
| 2019/0280878 A1 | 9/2019 | Xia | |
| 2019/0295049 A1 | 9/2019 | Karame et al. | |
| 2019/0325532 A1 | 10/2019 | Torrenegra et al. | |
| 2019/0349742 A1 | 11/2019 | Kim et al. | |
| 2019/0356641 A1 | 11/2019 | Isaacson et al. | |
| 2019/0372834 A1 | 12/2019 | Patil et al. | |
| 2019/0373521 A1 | 12/2019 | Crawford | |
| 2019/0379754 A1* | 12/2019 | Krishnaswamy | H04L 67/104 |
| 2020/0007513 A1 | 1/2020 | Gleichauf | |
| 2020/0022201 A1* | 1/2020 | Ross | H04B 7/0617 |
| 2020/0034839 A1 | 1/2020 | Soundararajan et al. | |
| 2020/0092084 A1* | 3/2020 | Maroney | H04L 9/3239 |
| 2020/0143466 A1 | 5/2020 | Wu et al. | |
| 2020/0151686 A1 | 5/2020 | Komandur et al. | |
| 2020/0187022 A1* | 6/2020 | Ross | H04B 7/0617 |
| 2020/0195495 A1 | 6/2020 | Parker et al. | |
| 2020/0219045 A1 | 7/2020 | Kikinis | |
| 2020/0374974 A1 | 11/2020 | Sun et al. | |
| 2020/0387893 A1* | 12/2020 | Maim | G09C 1/00 |
| 2020/0396065 A1 | 12/2020 | Gutierrez-Sheris | |
| 2021/0075610 A1 | 3/2021 | Covaci et al. | |
| 2021/0126771 A1 | 4/2021 | Bae et al. | |
| 2021/0136042 A1 | 5/2021 | Wang et al. | |
| 2021/0160312 A1 | 5/2021 | Yang | |
| 2021/0176038 A1 | 6/2021 | Bortnikov et al. | |
| 2021/0303713 A1 | 9/2021 | Sreedhar et al. | |
| 2021/0320926 A1 | 10/2021 | Shina et al. | |
| 2021/0406871 A1 | 12/2021 | Ravinathan et al. | |
| 2022/0172180 A1 | 6/2022 | Komiyama | |
| 2022/0337436 A1 | 10/2022 | Beaudet et al. | |
| 2023/0206199 A1 | 6/2023 | Chua et al. | |
| 2023/0245117 A1 | 8/2023 | Higgins et al. | |

FOREIGN PATENT DOCUMENTS

| | | | |
|---|---|---|---|
| CN | 109714752 | A | 5/2019 |
| CN | 110024357 | A | 7/2019 |
| CN | 110351388 | A | 10/2019 |
| CN | 110619317 | A | 12/2019 |
| CN | 110674128 | A | 1/2020 |
| CN | 110915245 | A | 3/2020 |
| CN | 111226199 | A | 6/2020 |
| CN | 111885133 | A | 11/2020 |
| WO | WO 2019032968 | A1 | 2/2019 |
| WO | WO 2019213775 | A1 | 11/2019 |
| WO | WO 2019217428 | A1 | 11/2019 |
| WO | WO 2020030936 | A1 | 2/2020 |
| WO | WO 2022006324 | A1 | 1/2022 |
| WO | WO 2022006361 | A1 | 1/2022 |
| WO | WO 2022197650 | A1 | 9/2022 |

OTHER PUBLICATIONS

3rd Generation Partnership Project; Technical Specification Group Radio Access Network; NG Radio Access Network (NG-RAN); Stage 2 functional specification of User Equipment (UE) positioning in NG-RAN; (Release 16), 3GPP TS 38.305 V16.0.0, Mar. 2020, 107 pages.

"Guidelines on writing a CR", 3GPP Tdoc S1-220008, 3GPP TSG SA1#97e, e-meeting, Feb. 14-24, 2022, 12 pages.

3rd Generation Partnership Project; Technical Specification Group Services and System Aspects; Procedures for the 5G System (5GS); Stage 2, (Release 16), 3GPP TS 23.502 V16.4.0, Mar. 2020, 213 pages.

English Language Abstract, Chinese Publication No. 111885133, Nov. 3, 2020, 1 page.

3rd Generation Partnership Project; Technical Specification Group Services and System Aspects; Policy and charging control framework for the 5G System (5GS); Stage 2, (Release 16), 3GPP TS 23.503 V16.4.1, Apr. 2020, 115 pages.

3rd Generation Partnership Project; Technical Specification Group Services and System Aspects;Study on application layer support for Factories of the Future in 5G network; (Release 17), 3GPP TR 23.745 V0.8.0, May 2020, 36 pages.

Qiong Zhang et al.: "Demo: A Blockchain Based Protocol for Federated Learning", IEEE 28th International Conference on Network Protocols (ICNP), Oct. 13, 2020, 2 pages.

3rd Generation Partnership Project; Technical Specification Group Services and System Aspects; 5G System (5GS) Location Services (LCS); Stage 2, (Release 16), 3GPP TS 23.273 V16.0.0, Jun. 2019, 86 pages.

3rd Generation Partnership Project; Technical Specification Group Services and System Aspects; Architecture enhancements for 5G System (5GS) to support network data analytics services (Release 16), 3GPP TS 23.288 V16.3.0, Mar. 2020, 62 pages.

"Permissioned Distributed Ledger (PDL); Application Scenarios", ETSI GR PDL 003 V1.1.Dec. 1, 2020, 38 pages.

3rd Generation Partnership Project; Technical Specification Group Services and System Aspects; Study on application layer support for Unmanned Aerial Systems (UAS); (Release 17), 3GPP TR 23.755 V0.7.0 Apr. 2020, 19 pages.

3rd Generation Partnership Project; Technical Specification Group Services and System Aspects; 5G System (5GS) Location Services (LCS); Stage 2, (Release 16), 3GPP TS 23.273 V16.3.0, Mar. 2020, 94 pages.

"O-RAN Architecture Description", O-RAN.WG1.O-RAN-Architecture-Description-v02.00, version 02.00.07, O-RAN Alliance, Jul. 2020, 28 pages.

3rd Generation Partnership Project; Technical Specification Group Services and System Aspects; System architecture for the 5G System (5GS), 3rd Generation Partnership Project (3GPP), Stage 2, Release 16, 3GPP TS 23.501 V16.4.0, Mar. 2020, 430 pages.

English Language Abstract, Chinese Publication No. 110619317, Dec. 27, 2019, 1 page.

Lu Yunlong et al: "Blockchain and Federated Learning for 5G Beyond", IEEE Network, IEEE Service Center, vol. 35, No. 1, Dec. 20, 2020, 7 pages.

Kwak, et al., "The Design of Hierarchical Consensus Mechanism Based on Service-Zone Sharding", IEEE Transactions On Engineering Management, vol. 67, No. 4, Nov. 2020, 17 pages.

English Translation of CN109617787A dated Jan. 22, 2026, 28 pages.

English Translation of CN110351388 A, Sep. 17, 2025, 21 pages.

English Translation of CN109714752 A dated Jan. 22, 2026, 31 pages.

(56) References Cited

OTHER PUBLICATIONS

English Translation of CN110674128 A dated May 6, 2026, 59 pages.
English Translation of CN110915245 A dated May 21, 2026, 52 pages.

* cited by examiner

General Workflow of a Blockchain System Consists of Several Steps:

Key Techniques in Each Step:

| | 1 | 2 | 3 | 4 | 5 |
|---|---|---|---|---|---|
| Cryptography | Yes | Yes | | | |
| Hashing | Yes | | Yes | | |
| Merkle Tree | | | Yes | | |
| Distributed Ledgers | | | | | Yes |
| P2P Networking | | Yes | Yes | Yes | Yes |
| Consensus Protocol | | | | Yes | |

General Workflow of a Blockchain System

Transaction States and Block States

5G System Architecture

General Procedures in 5G System Architecture

Policy Control Architecture for Non-Session Management

Policy Control Architecture for Session Management

Data Storage Architectures

Network Analytics Architecture

Non-Roaming 5G Location Services Architecture

Internet of Vehicles

Smart Manufacturing and Logistics

System Architecture of Integrated Blockchain and Wireless

Blockchain Transaction Management Architecture 1

Blockchain Transaction Management Architecture 2

BCA/BNA-Triggered BTM-Controlled Transaction Creation with an Auditor

BTC-Triggered BTM-Controlled Transaction Creation

BNA-Subscribed BTM-Controlled Transaction Creation

BCA-Triggered BTC-Controlled Transaction Creation

BTM-Subscribed BTC-Controlled Transaction Creation

BTM-Assisted Block Creation

BTM-Controlled Transaction Creation to Multiple Designated Blockchains

An Example of Transaction Creation to Multiple Designated Blockchains

Query Blockchain Transactions

Event Subscription on Designated Blockchain Network

Analytics-based Access Control of Blockchain Networks

2700

5G System Architecture Extension A with Blockchain Applications Enablement

5G System Architecture Extension B with Blockchain Applications Enablement

Basic BTM-Coordinated Transaction Creation in 5GS

Edge BTM-Coordinated Blockchain Transaction Creation in 5GS

AF-Subscribed BTM-Coordinated Transaction Creation in 5GS

WTRU-Triggered Blockchain Transaction Creation using 5GS Control Plane

WTRU-Triggered Blockchain Transaction Creation for Another WTRU using 5GS Control Plane WTRU-Triggered Blockchain Transaction Creation with Multiple WTRUs using 5GS Control Plane WTRU-Triggered Blockchain Transaction Creation using 5GS Data Plane by BTM WTRU-Triggered Blockchain Transaction Creation using 5GS Data Plane by WTRU

METHODS, ARCHITECTURES, APPARATUSES AND SYSTEMS DIRECTED TO TRANSACTION MANAGEMENT IN BLOCKCHAIN-ENABLED WIRELESS SYSTEMS

CROSS REFERENCE TO RELATED APPLICATIONS

This application is a U.S. National Stage Application under 35 U.S.C. § 371 of International Patent Application No. PCT/US2021/039967, filed Jun. 30, 2021, which claims the benefit of priority to U.S. Provisional Patent Application No. 63/045,835 filed Jun. 30, 2020, which is incorporated herein by reference.

BACKGROUND

This application is related to wired and/or wireless communications, including, for example, procedures in connection with transaction management in blockchain-enabled wireless systems.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
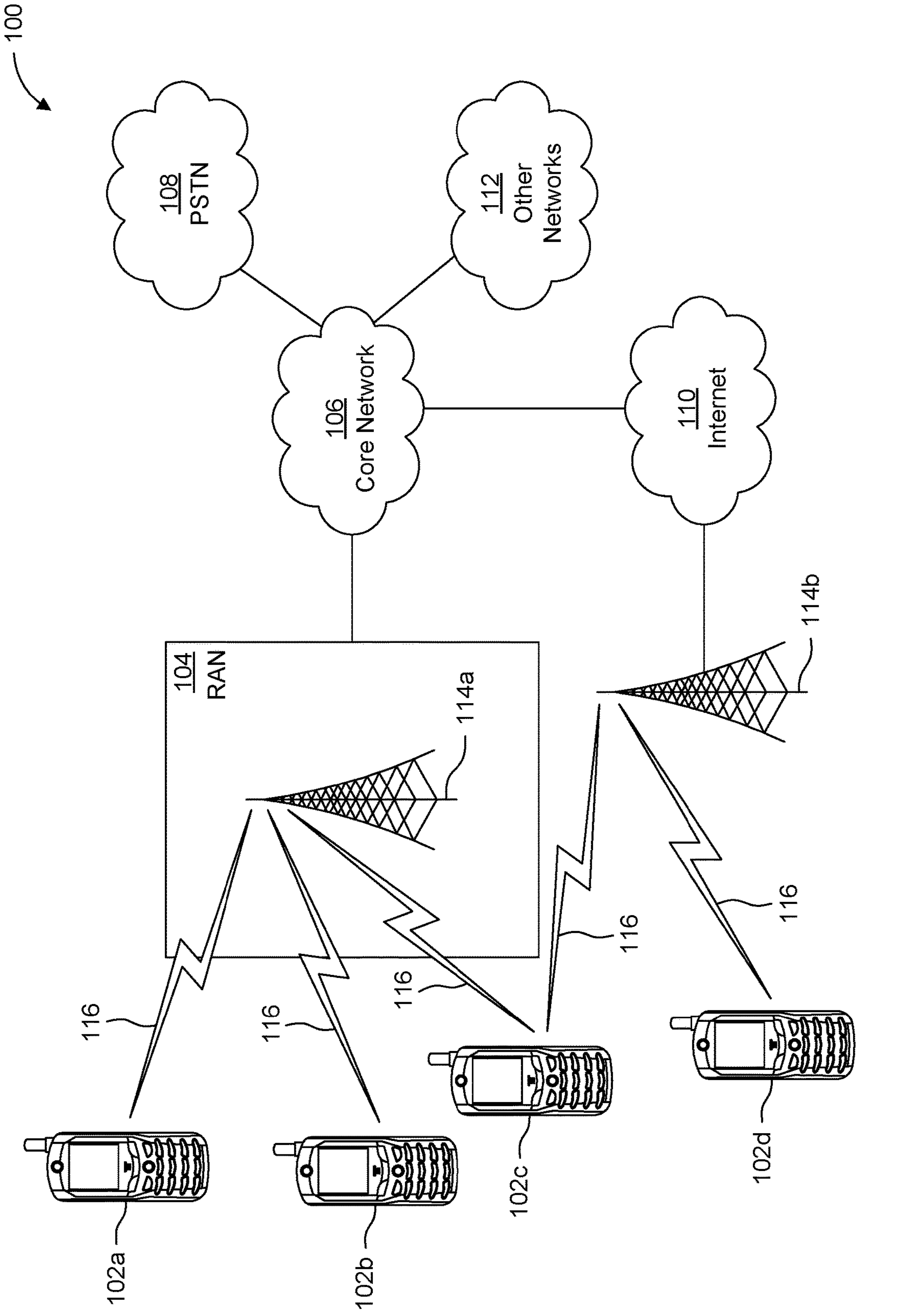
FIG. 1A is a system diagram illustrating an example communications system.

FIG. 1A is a diagram of an example communications system 100 in which one or more disclosed embodiments may be implemented. Example communications system 100 is provided for the purpose of illustration only and is not limiting of the disclosed embodiments. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronic device, a device operating on commercial and/or industrial wireless networks, and the like. Any of the WTRUs 102*a*, 102*b*, 102*c* and 102*d* may be interchangeably referred to as a WTRU.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
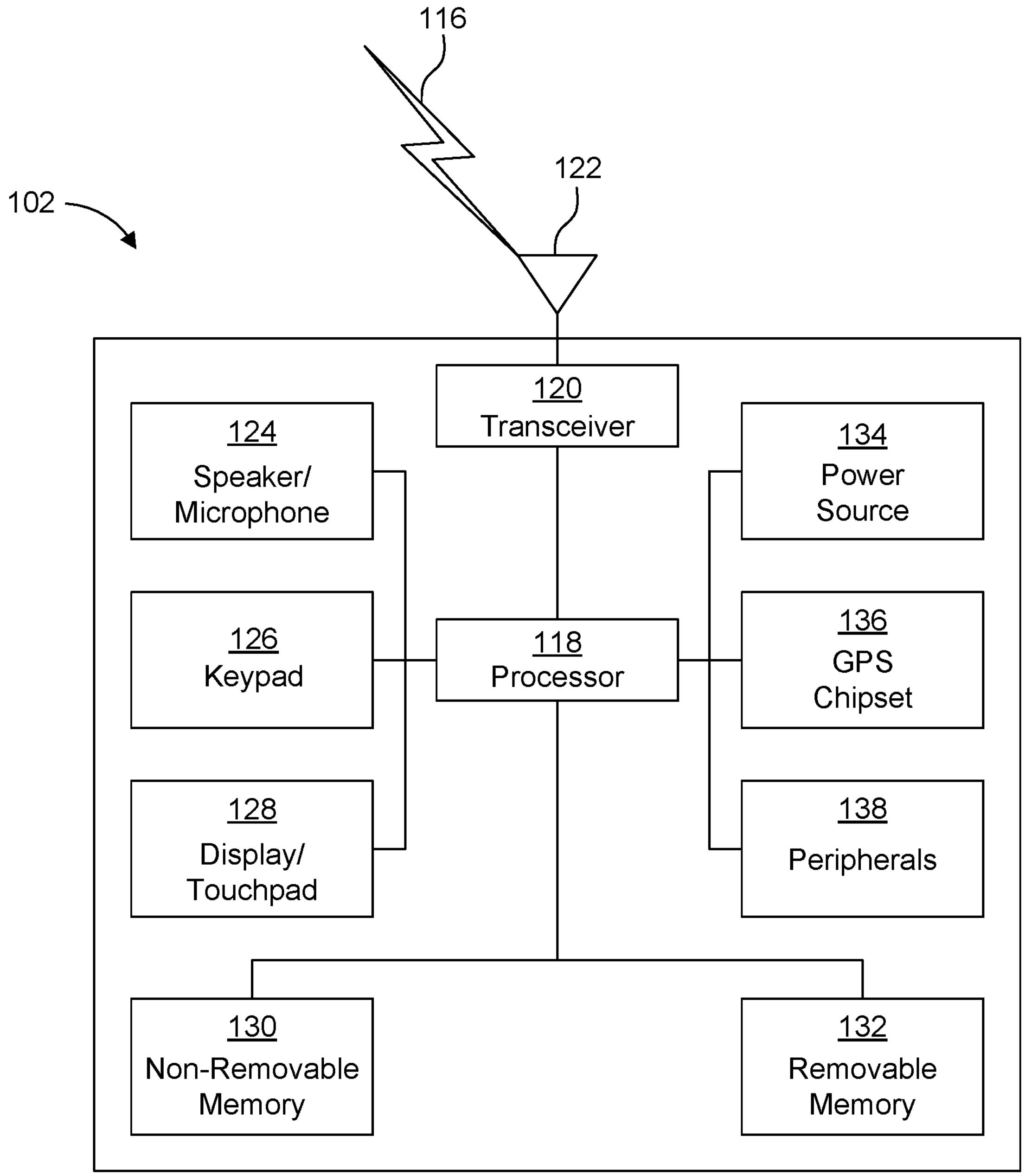
FIG. 1B is a system diagram illustrating an example wireless transmit/receive unit (WTRU) that may be used within the communications system illustrated in FIG. 1A.

FIG. 1B is a system diagram of an example WTRU 102. Example WTRU 102 is provided for the purpose of illustration only and is not limiting of the disclosed embodiments. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. For example, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules/units that provide additional features, functionality and/or wired or wireless connectivity. For example, the peripherals 138 may include an accelerometer, an e-compass, a satellite transceiver, a digital camera (e.g., for photographs or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
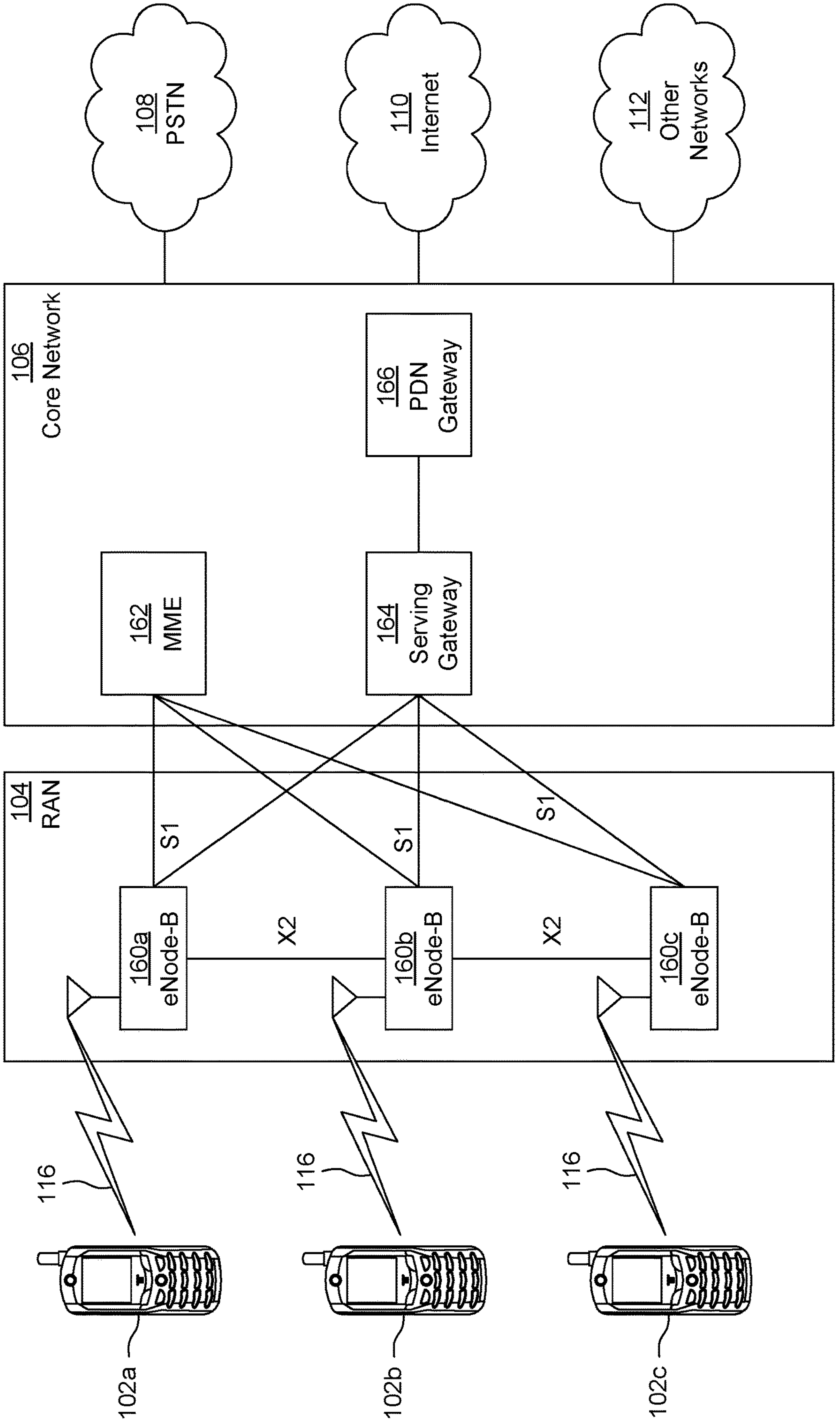
FIG. 1C is a system diagram illustrating an example radio access network (RAN) and an example core network (CN) that may be used within the communications system illustrated in FIG. 1A.

FIG. 1C is a system diagram of the RAN 104 and the CN 106 according to another embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The core network 106 shown in FIG. 1C may include a mobility management gateway (MME) 162, a serving gateway (SGW) 164, and a packet data network (PDN) gateway 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may also provide a control plane function for switching between the RAN 104 and other RANs (not shown) that employ other radio technologies, such as GSM or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may also perform other functions, such as anchoring user planes during inter-eNode-B handovers, triggering paging and/or mobile termination when DL data is available for the WTRUs 102*a*, 102*b*, 102*c*, managing and storing contexts of the WTRUs 102*a*, 102*b*, 102*c*, and the like.

The SGW 164 may also be connected to the PDN gateway 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to a Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
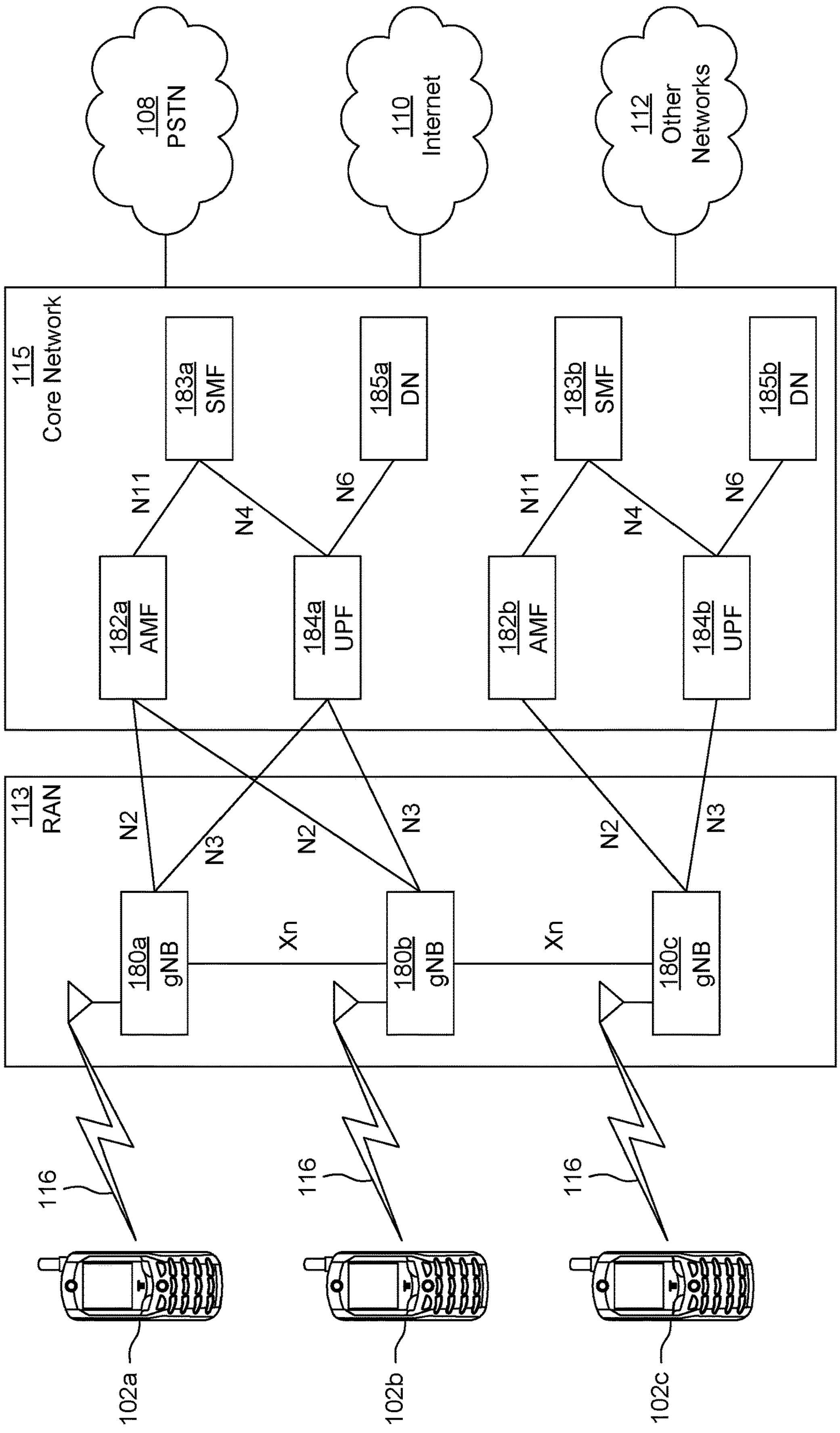
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 180*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different packet data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

Blockchain Technology

Blockchain technology jointly uses and builds on top of various existing techniques, such as cryptography, hashing, Merkle tree, distributed ledgers, peer-to-peer (P2P) networking and consensus protocols. Blockchain technology innovatively combines such existing technologies to enable a system that can provide advanced features such as decentralization, immutability, transparency, and security.

A blockchain system is one in which blockchain technology is used. Applications supported by a blockchain system are referred to as blockchain applications. A blockchain system is underpinned by one or more underlying blockchain networks. Each blockchain network may include a plurality (e.g., many) participating blockchain nodes (BCN). Each BCN may host one or more distributed blockchains (a form of distributed ledgers), broadcast blocks using P2P networking, and perform consensus protocols with the other BCNs of the blockchain network to reach distributed trust and data consensus without relying on a centralized party.

A blockchain transaction may be any of a digital representation of a real-world transaction, a digital record of physical assets, a digital record of a physical event, a digital record of any action in an information system, a digital payment and a digital smart contract. A block groups multiple blockchain transactions together. A blockchain is a data structure to chain a growing number of blocks.

For simplicity of exposition, the terms "blockchain technology" are used herein. It should be understood that such terms also represent much broader distributed ledger technology. As such, the various embodiments are applicable to any specific blockchain technology and/or distributed ledger technology.

Figure 2:
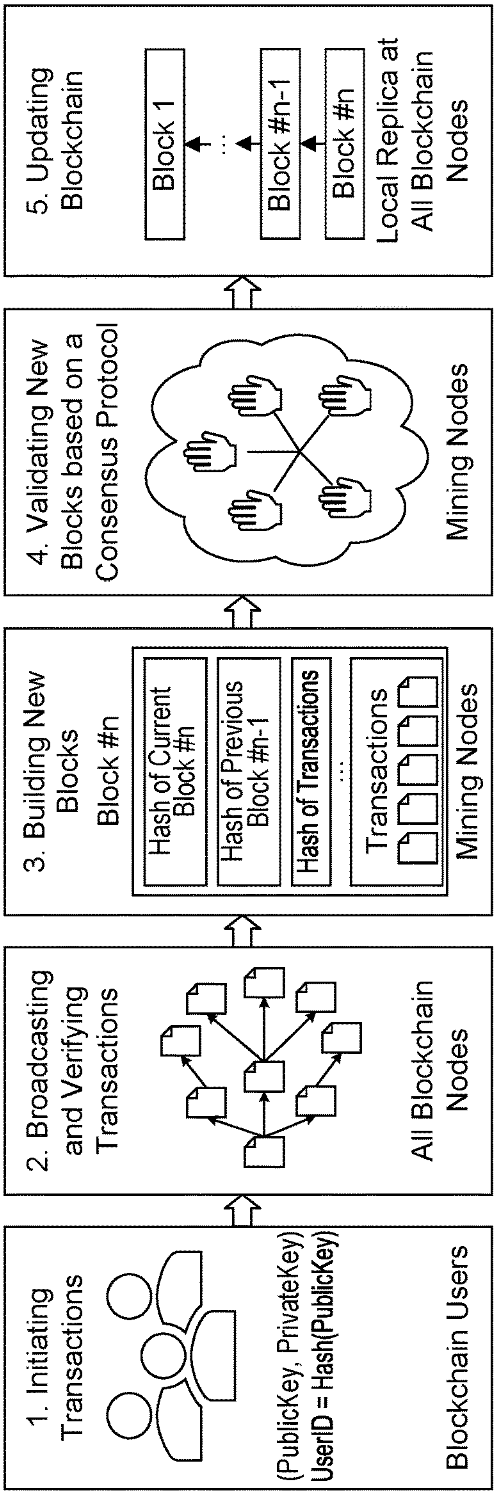
FIG. 2 illustrates an example workflow of a blockchain system.

FIG. 2 illustrates an example workflow of a blockchain system. The workflow may include initiating transactions (1), broadcasting and verifying transactions (2), building new blocks (3), validating new blocks based on a consensus protocol (4) and updating a blockchain (5).

Initiating transactions: Each participating user may generate new transactions independently. Each user may have a user identifier and/or account identifier. The user identifier and/or account identifier may be a hash of a public key of a user ("user's public key"). Each new transaction is signed using the user's private key. After a new transaction is generated, the user may send it to the blockchain network.

Broadcasting and verifying transactions: A new transaction may be received by some BCNs. The transaction may include the user's public key. The BCNs may verify its integrity using the user's public key After verification and if the new transaction is valid, it may be relayed and/or broadcasted within the blockchain network. Eventually, all blockchain nodes receive and possess a copy of any newly generated and valid transactions.

Building new blocks: Some BCN (referred to as mining nodes) start to group many newly generated and pending transactions together to generate a new block. The new block may include a block header and a block body. The block header may include a hash of the current block, a hash of the previously confirmed block, and a hash of all included transactions (e.g., Merkle tree). Dependent on the consensus protocol used, the block header may include other and/or additional information. The block body may include the content of all included transactions. Each mining node may independently attempt to create a new block.

Validating new blocks based on a consensus protocol. Under the Building New Blocks task, mining nodes may independently attempt to create a new block. They may run the same consensus protocol (e.g., Proof-of-Work in Bitcoin system) and may reach an agreement on who (i.e., a winner) may be allowed to insert a block into the existing blockchain. The winner of the consensus protocol may send its newly generated block to the blockchain network. This new block may be broadcasted; allowing all mining nodes to receive and/or verify it.

Updating the blockchain. After the newly generated block is verified, it may be successfully appended to the existing blockchain, since it includes a hash of the previous blockchain.

Figure 3:
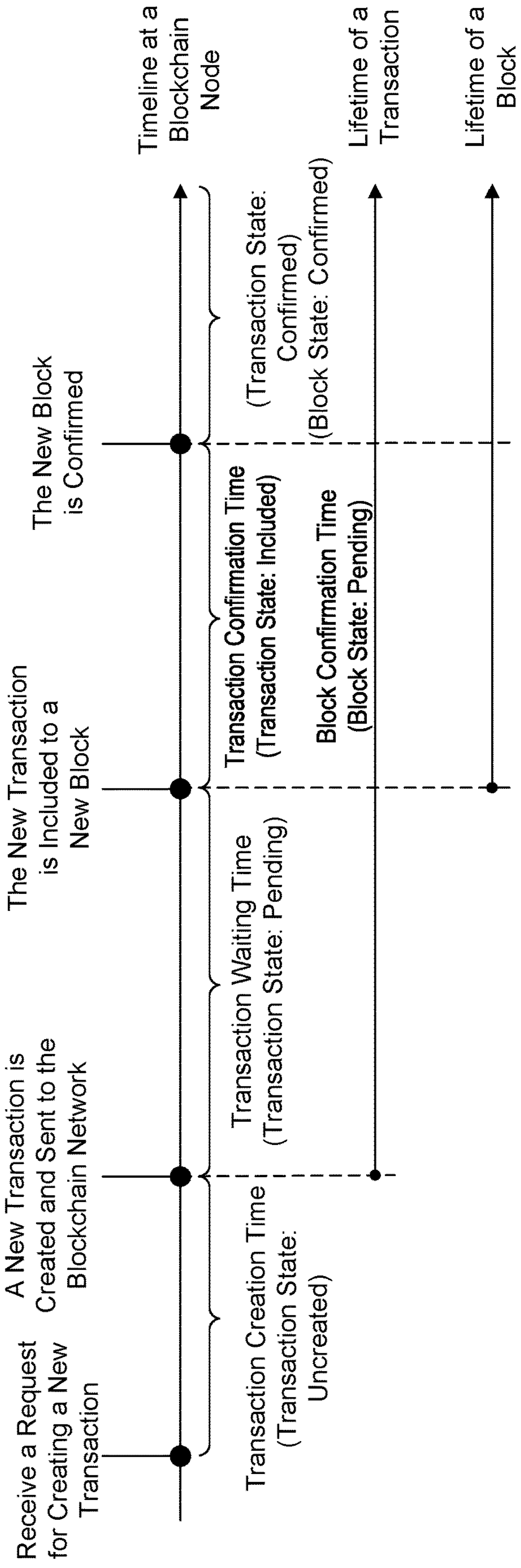
FIG. 3 illustrates example timeline at a blockchain node in connection with a processing a new transaction.

FIG. 3 illustrates example timeline at a BCN in connection with a processing a new transaction. Shown in connection with the timeline are transaction states and block states during periods between various stages of processing the new transaction. The periods may include a transaction creation time, a transaction waiting time, and a transaction confirmation time (or blockchain confirmation time).

The transaction creation time may refer to the period between a time at which a request for creating a new transaction is received and a time at which the new transaction is created. During the transaction creation time, the transaction state may be "uncreated".

The transaction waiting time may refer to the period between the time at which a new transaction is created and a time at which the new transaction is included in a new block. The duration of the transaction waiting time may depend on the underlying P2P networking and consensus mechanism. During the transaction waiting, both the transaction and block states may be "pending".

The transaction confirmation time (or blockchain confirmation time) may denote a period between the time at which a new transaction is included in a new block and a time at which the new block is confirmed. The duration of the transaction confirmation time (or blockchain confirmation time) may depend on the underlying P2P networking and consensus mechanism. During the transaction confirmation time (or blockchain confirmation time), the transaction state may be "included", and the block state may be "pending". Following confirmation of the block, its state may be "confirmed".

The speed of a transaction may be estimated as a sum of the transaction waiting time and transaction confirmation time.

Figure 4:
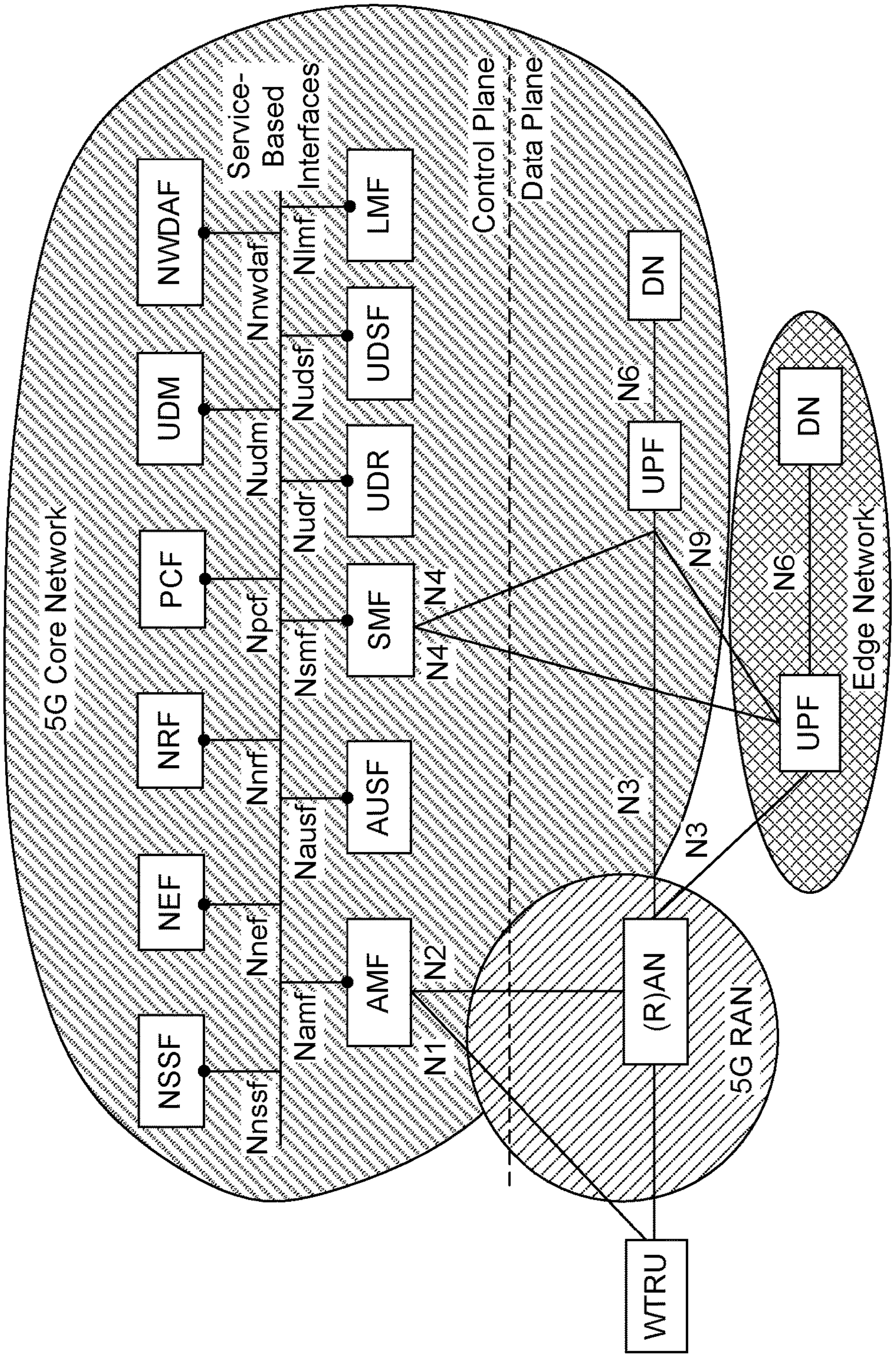
FIG. 4 is a block diagram illustrating a communications system configured as a 5G system (5GS)

FIG. 4 is a block diagram illustrating the communications system 100 (FIG. 1) configured as a (e.g., 3GPP defined) 5G system (5GS). The communications system 100 may include a RAN 113 and CN 115. One of design principles for 5GS architecture is service-centric or service-based.

The CN 115 may include various network functions. The network functions may work together to fulfill and/or provide services to the RAN 113, a WTRU 102 and/or an application server/service provider. The network functions may include a network repository function (NRF), an access and mobility management function (AMF), a session management function (SMF), an authentication server function (AUSF), a policy control function (PCF), a user plane function (UPF), a network exposure function (NEF), a unified data management (UDM), a unified data repository (UDR), an unstructured data storage function (UDSF), a network data analytics function (NWDAF) and a network slice selection function (NSSF).

A network function may access another network function. The network functions may access and/or interact with one another in any of a request/response mode and a subscription/notification mode. A network function may register with the NRF. Registering with the NRF may make the network function discoverable to the other network functions.

The AMF may manage access to, and mobility of, WTRUs 102 in the communications system 100. The SMF may be responsible for establishing sessions between a WTRU 102 and the CN 115. The AUSF may be in charge of authentication of users (e.g., WTRUs). The PCF may create and/or provide one or more policy rules for and/or to other control plane network functions and WTRUs 102. The PCF may assign identifiers for the created policy rules, and other control plane network functions and WTRUs 102 may use the identifiers to refer to (e.g., look up or otherwise obtain) the corresponding policy rules.

The UPF may be a function for the user plane. The UPF may monitor, manage, control and redirect user plane traffic flows, such as between a WTRU and an application server. The NEF may expose control plane functions to entities (e.g., network applications) that are outside of the 5GS and/or not in the same trusted domain.

The CN may provide data storage and analytics services through functions, such as any of the UDM, the UDR, the UDSF and the NWDAF. The communications system may support network slicing. Network slicing may be facilitated by the NSSF.

Although the network functions may be defined as separate logical entities, some or all of the network functions may be combined. One or more than one of the network functions may be invoked and/or used in connection with a particular procedure or operation. By way of example, the AMF, AUSF and SMF may be involved in WTRU mobility. One or more than one instance of a network function may be instantiated. The NRF may maintain the information of each network function instance. Although shown within a single cloud, one or more of network functions may be deployed in an edge network, such as one that supports edge computing and/or that is in close proximity to and/or co-located with the RAN 113. It may be advantageous to deploy the UPF and/or the NEF in an edge network that supports edge computing, which can save certain communication costs since the policy control can be applied to the event/data directly at the edge (i.e., where data/events are generated).

Figure 5:
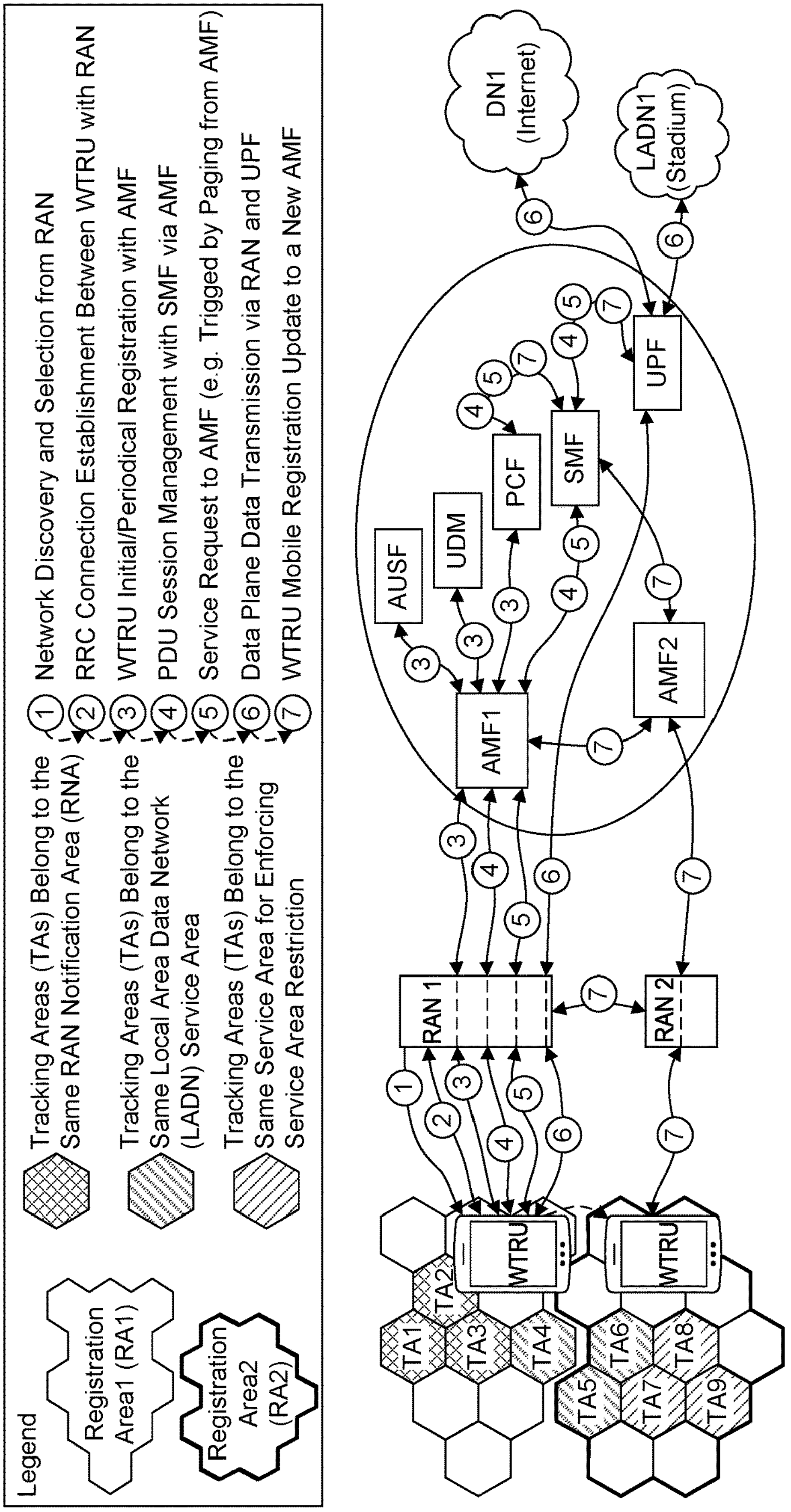
FIG. 5 illustrates various procedures in a 5GS.

FIG. 5 illustrates various procedures in a 5GS. The various procedures are described with reference to the communications system 100 of FIG. 4 for convenience. The various procedures may be carried out using other architectures, as well. For convenience and simplicity of exposition, the refs. in the disclosures accompanying FIG. 5 are shown with the prefix "5:".

As denoted at (5:1), a WTRU may discover and/or may select a network (e.g., a PLMN, a RAN, a cell, etc.) based on received system information block (SIB) broadcast by one or more RAN nodes. As denoted at (5:2), the WTRU may establish a radio resource control (RRC) connection with a selected RAN (e.g., RAN1). The WTRU may communicate with the 5GS CN via the selected RAN. As denoted at (5:3), the WTRU may initiate registration towards an AMF. The selected RAN may determine/select, from one or more AMFs, a serving AMF for the WTRU. As denoted at (5:3), the serving AMF may check with the AUSF for primary access authentication and authorization, request subscription data from the UDM, check with the PCF for access and mobility policies, and/or contact the SMF to activate any existing PDU session (e.g., if indicated by the WTRU).

A registration area (RA) may be defined within the 5GS. The RA may be formed from one or more tracking areas (TAs); each of which may cover one or more cells. An advantage of the RA is that it reduces signaling overhead by not requiring registration updates with the serving AMF while within the RA unless a periodic registration timer expires. If the WTRU moves from one RA (e.g., RA1) to another RA (e.g., RA2), then the WTRU may perform a new registration, such as, for example, with a registration type set to mobility registration update (as described herein and denoted at (5:7)). A larger RA may reduce registration overhead, but it may increase paging signaling overhead due to the serving AMF having to page the WTRU in a larger number of TAs (or cells).

After successful registration, the WTRU may enter RM-REGISTERED state and/or may access and/or interact with other control plane NFs via the serving AMF. In various embodiments, the serving AMF might be the only entry point for the WTRU to access and interact with the CN control plane. The procedures denoted at (5:3), (5:5) and (5:7), for example, may be related to connection management.

As denoted at (5:4), the WTRU may establish a PDU session for a DN with an SMF. The serving AMF may determine/select the serving SMF for the PDU session. As denoted at (5:4), the SMF may check with the PCF for PDU session policies and/or may select a UPF as an anchor for the PDU session ("PDU session anchor"). The WTRU may access the DN and/or exchange packets with the DN via the PDU session anchor (PSA). The PCF may retrieve subscription data of the WTRU from a UDR in connection with the SMF checking with the PCF for session policies and may provide it to the SMF. The SMF may perform primary session authentication using the WTRU's subscription data as retrieved from the UDM, and may perform secondary authentication between the WTRU and a DN-AAA server, e.g., using an extensible authentication protocol (EAP), such as defined in RFC3748 and RFC5247. The procedure denoted at (5:4) and the procedure denoted at (5:5) may be jointly performed.

As denoted at (5:5), the WTRU may be in a CM-IDLE state (e.g., after connection with the serving AMF is released), and may initiate a service request procedure to reestablish a connection with the serving AMF and enter a CM-CONNECTED state. The WTRU may be in mobile initiated connections only (MICO) mode when it initiates the service request procedure to reestablish the connection with the serving AMF. If the WTRU is not in MICO mode, then the serving AMF may page and/or trigger the WTRU to initiate service request procedure, for example, to receive any downlink packets. A non-access-stratum (NAS) connection may be established between the WTRU and the serving AMF in connection with the service request.

The service request may be carried out together with WTRU registration, in which case, the WTRU may enter CM-CONNECTED state. The WTRU may move within the RA without notifying the serving AMF while in CM-CONNECTED state. If WTRU remains within the RA but moves out of a RAN notification area (RNA), then the WTRU may perform a RAN update to trigger the RAN to update the WTRU context and the corresponding RRC connection maintained by the RAN. The RNA may be smaller than the RA. For example, the RNA may include a subset of TAs forming the RA (e.g., TA1, TA2, and TA3, as shown).

As denoted at (5:6), the WTRU may carry out data transmission (data plane) with the DN via RAN 113 and the UPF as the PSA. The DN may have a data network name (DNN). Although not shown, the 5GS may include and/or be communicatively coupled with more than one DN, and the DN may have respective DNNs.

As denoted at (5:7), the WTRU may detect when it moves from RA1 to RA2. For example, the WTRU may detect such event by checking a list of TAs for each RA configured by the serving AMF. As denoted at (5:7), the WTRU may perform a mobile registration update with a new serving AMF. As denoted at (5:7), a (e.g., Xn-based or N2-based) inter-RAN handover from the current RAN to a new RAN with a serving AMF change may be performed. A new serving AMF may contact the old serving AMF for transferring WTRU's context information. As denoted at (5:7), the SMF may contact the PCF and/or the UPF to update existing PDU sessions with the WTRU.

As shown in FIG. 5, multiple TAs can be grouped together as a local area data network (LADN) service area to support LADN service. As an example, TA4, TAS, and TA6 may form a LADN service area. The WTRU may be allowed to access LADN1 if (e.g., if and only if) the WTRU remains within TA4, TAS, or TA6.

A set of TAs may be grouped as a service area. The 5GS may specify and/or enforce service area restrictions for a WTRU. For example, the 5GS may configure a WTRU for service area restriction for a service area formed from TA7, TA8, and TA9, where the WTRU may be allowed to access 5GS if (e.g., if and only if) the WTRU remains within TA7, TA8, or TA9.

The various procedures disclosed herein and denoted in FIG. 5 need not be carried out in the order shown or described, and not all of the procedures need to be performed. For example, the procedures denoted at (5:7) may be performed before the procedures denoted at (5:6), and the procedure denoted at (5:5) need not be performed.

Representative Policy Control Function (PCF)

Figure 6:
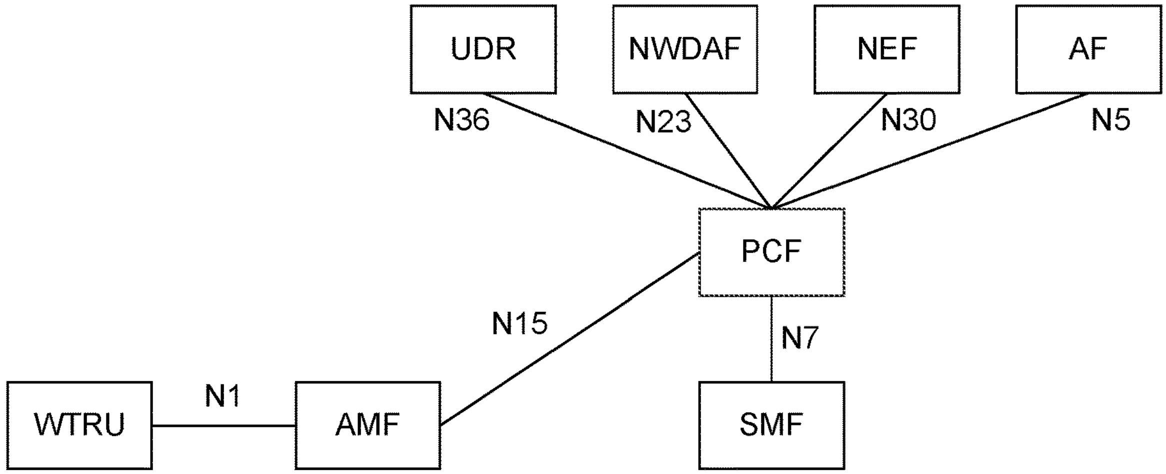
FIG. 6 illustrates an example policy control reference architecture for non-session management related policy control.
Figure 7:
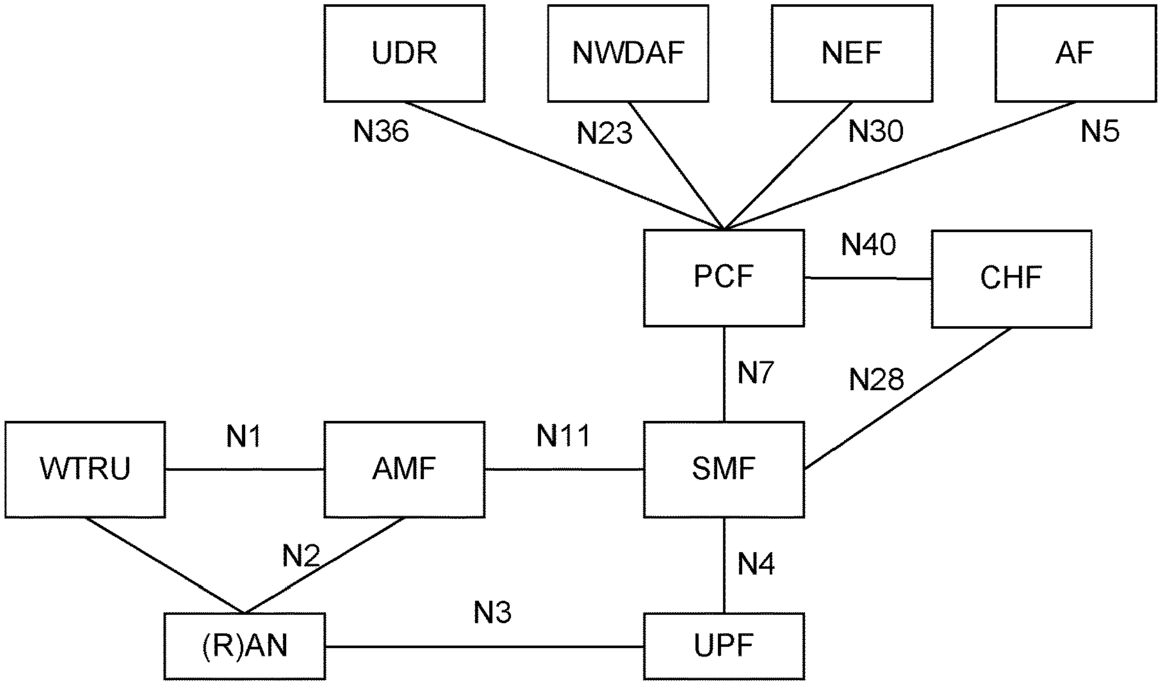
FIG. 7 illustrates an example policy control reference architecture for session management related policy control.

Policy control in a 5GS may include non-session management related policy control and session management related policy control. FIG. 6 illustrates an example policy control reference architecture for non-session management related policy control. FIG. 7 illustrates an example policy control reference architecture for session management related policy control. A Charging Function (CHF) is introduced in FIG. 7.

Examples of non-session management related policy control include access and mobility related policy control, WTRU access selection and PDU session selection related policy (WTRU policy) control, management of Packet Flow Descriptions (PFD), and network status analytics information requirement. Examples of session management related policy control include QoS control for PDU sessions and Service Data Flows (SDFs), charging control for PDU sessions and SDFs, reporting PDU session events to an AF, usage monitoring control, application detection policy control, service capability exposure policy control, and traffic steering policy control.

The PCF may provide various functionalities for both non-session management related policy control and session management policy control. The PCF may provision different policies to control plane functions (e.g., AMF, SMF, NEF), WTRUs, and AFs, at which the provisioned policies may be enforced. The PCF may retrieve subscription data from a UDR to create new policies. An operator can configure policies at the PCF. The policies may be stored at a UDR. The policies may be dynamically, semi-statically and/or statically configured at various entities, devices, etc., such as to any of an AMF, an SMF and a WTRU.

For example, access and mobility related policy control may provide any of management of service area restrictions, management of RAT/frequency selection priority (RFSP) functionalities, and management of SMF selection. A serving AMF and a PCF may perform "AM Policy Association Establishment" for a WTRU (e.g., when the WTRU performs an initial registration and selects (e.g., only selects) the serving AMF). The serving AMF and PCF may exchange access and mobility related policies, e.g., following the AM Policy Association Establishment.

Based on operator-defined policies, a PCF can modify service area restrictions for a WTRU as a part of subscription data. Operator-defined policies in the PCF may depend on input data such as WTRU location, time of day, the information provided by other NFs, etc. When a WTRU registers with a serving AMF, the serving AMF may retrieve its service area restrictions from a UDM as a part of its subscription data. The serving AMF may report the service area restrictions to a PCF. The PCF may modify the service area restrictions and/or may send the modified service area restrictions to the serving AMF. The AMF may store the modified service area restrictions and/or may enforce the modified service area restrictions to determine the mobility restrictions for the WTRU.

A RFSP index may be used by a serving AMF to manage radio resources for a WTRU. A PCF may modify the RFSP index, e.g., based on operator-defined policies. For example, operator-defined policies in the PCF may depend on input data such as accumulated usage, load level information per network slice instance etc. When a WTRU registers with the serving AMF, the serving AMF may retrieve the RFSP index from a UDM, e.g., as a part of subscription data. The serving AMF may report the RFSP index to the PCF. The PCF may modify the RFSP index and/or may send it to the serving AMF. The AMF may send the modified RFSP index to a (R)AN node. The RAN node may enforce the modified RFSP index.

A PCF may configure a WTRU with various policies via a serving AMF. The policies may include an access network discovery and selection policy (ANDSP) for non-3GPP access, and a WTRU Route Selection Policy (URSP) related to applications and PDU sessions. The WTRU may use URSP rules to determine whether to use an already established PDU session and/or trigger an establishment of a new PDU session for an application, e.g., according to a traffic descriptor specifying matching criteria included in a (e.g., each) URSP rule. If the WTRU is in CM-IDLE state, the serving AMF may send a paging message to the WTRU to trigger the WTRU to perform a WTRU-initiated service request procedure so that the serving AMF may deliver ANDSPs and URSPs (received from the PCF) to the WTRU.

Application detection as a type of session management related policy control may be provided through interactions among a PCF, a SMF, and a UPF. The PCF may install (or activate) one or more policy and charging control (PCC) rules including enforcement actions to the SMF. The SMF may instruct the UPF to detect events in specific application traffic. The UPF may apply configured enforcement actions on specific application traffic, such as gating control (e.g., blocking application traffic), QoS control (e.g., bandwidth limitation), and traffic redirection.

The UPF may detect an event, and may report the detected event to the PCF via the SMF. The PCF may modify the PCC rules and/or install modified PCC rules to the SMF based on one or more reported events.

Representative Data Storage Architecture

Figure 8:
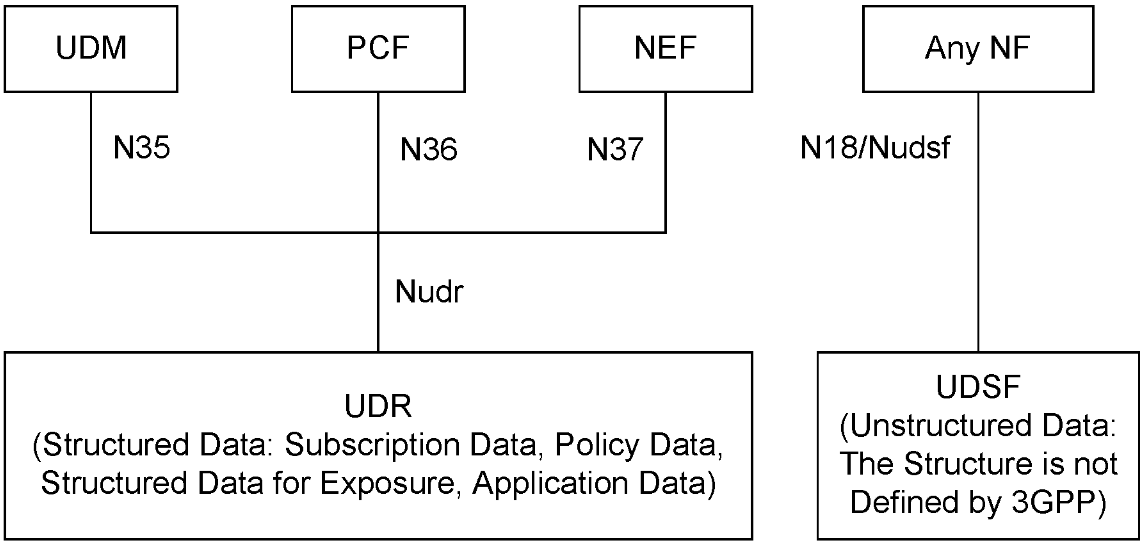
FIG. 8 illustrates an example data storage architecture.

FIG. 8 illustrates an example data storage architecture, e.g., for a 5GS. The data storage may include a UDM, a UDR, and a UDSF. The UDR may be implemented in (e.g., as a part of) a UDM, a PCF, or an NEF. The UDR may serve multiple UDMs, PCFs, and NEFs. The UDSF may be implemented in (e.g., as a part of) an NF. The UDSF may serve multiple NFs. The UDR and the UDSF may be co-located.

Data in communications system may be classified into unstructured data and structured data. The unstructured data may be any type of data. The structured data may include subscription data, policy data, structured data for exposure, and application data, such as packet flow descriptions (PFDs) for application detection and AF request information for multiple WTRUs.

Examples of data storage functions that may be provided may include: (i) a UDM may store subscription data to a UDR and/or may retrieve subscription data from the UDR; (ii) a PCF may store policy data to a UDR and/or may retrieve policy data from the UDR; (iii) a NEF may store structured data for exposure and/or application data to a UDR and/or may retrieve such data from the UDR; (iv) an NF may store unstructured data to a UDSF and/or may retrieve unstructured data from the UDSF; (v) a UDR may allow an NF consumer to retrieve, create, update, subscribe for change notifications, unsubscribe for change notifications, and/or delete data stored in the UDR, e.g., based on the set of data applicable to the NF consumer; and (vi) a UDSF may allow a NF consumer to retrieve, create, update, and delete data stored in the UDSF.

The UDM may provide any of the following functionalities: (i) generate (e.g., 3GPP) authentication and key agreement (AKA) authentication credentials and/or send the AKA authentication credentials to a serving AMF (e.g., when a WTRU registers with the serving AMF); (ii) handle user identification (e.g., storage and/or management of subscription permanent identifier (SUPI) of each subscriber in the 5GS); (iii) support de-concealment of privacy-protected subscription concealed identifier (SUCI), which may be based on a SUPI with privacy protection; (iv) authorize WTRU access to the 5GS based on its subscription data, such as roaming restrictions; (v) manage a WTRU's serving NFs (e.g., storing the serving AMF for a WTRU, storing the serving SMF for a WTRU's PDU session); (vi) support service and session continuity (e.g., storing SMF/DNN assignment of ongoing sessions); and (vii) handle 5G LAN group management.

Representative Network Analytics Architecture

Figure 9:
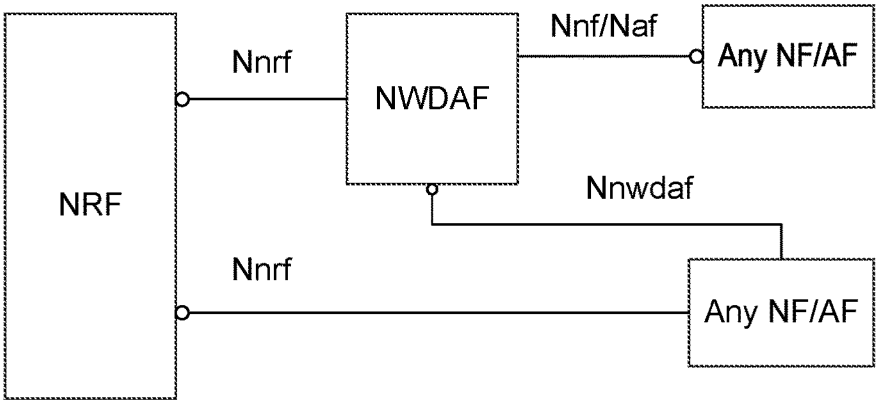
FIG. 9 illustrates an example network analytics architecture.

The 5GS may provide network analytics via a network data analytics function (NWDAF). FIG. 9 illustrates an example network analytics architecture. The NWDAF may perform a set of analytics (e.g., statistical information about past events and/or predictive information). The set of analytics may be represented as a list of analytics IDs. The NWDAF may be deployed to serve certain areas (i.e., a list of tracking area identities (TAIs)). Multiple NWDAF instances may be deployed within a 5GC and/or each NWDAF instance may provide different analytics IDs.

The NWDAF may register its capabilities (i.e., the list of analytics IDs) to an NRF to be discovered by any other NFs/AFs. Before calculating analytics results, the NWDAF may need to collect data from other NFs/AFs as data sources. The NWDAF may execute corresponding algorithms for each of the analytics to obtain the analytics results. An NF/AF may discover the NWDAF's Analytics IDs from NRF or directly from the NWDAF. The NF/AF may retrieve a specific analytics result from the NWDAF and/or may subscribe to a specific analytics from the NWDAF. The following phases may be needed for providing network analytics.

Registration of Analytics: When registering itself to an NRF, a NWDAF may send a list of its analytics IDs, e.g., as a part of the NWDAF profile, to be stored in the NRF. The list of analytics IDs may be discovered by other NFs/AFs. An NF/AF may discover the NWDAF from the NRF, and may discover its analytics IDs directly from the NWDAF.

Data Collection: A NWDAF may needs to retrieve and collect data from various NF/AF entities as data sources, such as any of an AMF, a SMF, a UDM, a PCF, an NRF, an NEF and an AF (possibly via NEF). The NWDAF may collect relevant management data (e.g., any of NG RAN or 5GC performance measurements, 5G end-to-end KPIs) from services in the OAM as configured by the PLMN operator. The NWDAF may skip data collection if the required data for a particular analytics request is available at the NWDAF.

The NWDAF may collect behavior data for one or a group of WTRUs (e.g., WTRU reachability) and/or global WTRU information (e.g., a number of WTRUs present in a geographical area), potentially from a UDM, an AMF, an SMF, a binding support function, and an NEF. The NWDAF may determine the UDM, the binding support function, and the NEF from an NRF, may determine the AMF and the SMF from the UDM, and/or may determine the PCF from the binding support function.

Calculation of Analytics Results: After collecting the (e.g., necessary) data required by an analytics ID, the NWDAF may perform corresponding analytics algorithms over the collected data to obtain the analytics result for the analytics ID. If an NF/AF has already subscribed to the analytics ID, the NWDAF may send the newly calculated analytics result to the NF/AF whenever the analytics result is updated.

Retrieval of Analytics Results: An NF/AF may send a request to the NWDAF for an analytics ID. The NWDAF may send the result of the requested analytics to the NF/AF. If the result is not available, the NWDAF may collect related data and calculate the analytics result.

3GPP TS 23.288 V16.3.0 (2020-03); Architecture enhancements for 5G System (5GS) to support network data analytics services; (Release 16) has defined procedures to support the following network analytics: (i) slice load level related network data analytics; (ii) observed service experience related network data analytics; (iii) NF load analytics; (iv) network performance analytics; and (v) UE related analytics (e.g., UE mobility analytics, UE communication analytics, expected UE behavior parameters related network data analytics, and abnormal behavior related network data analytics).

Figure 10:
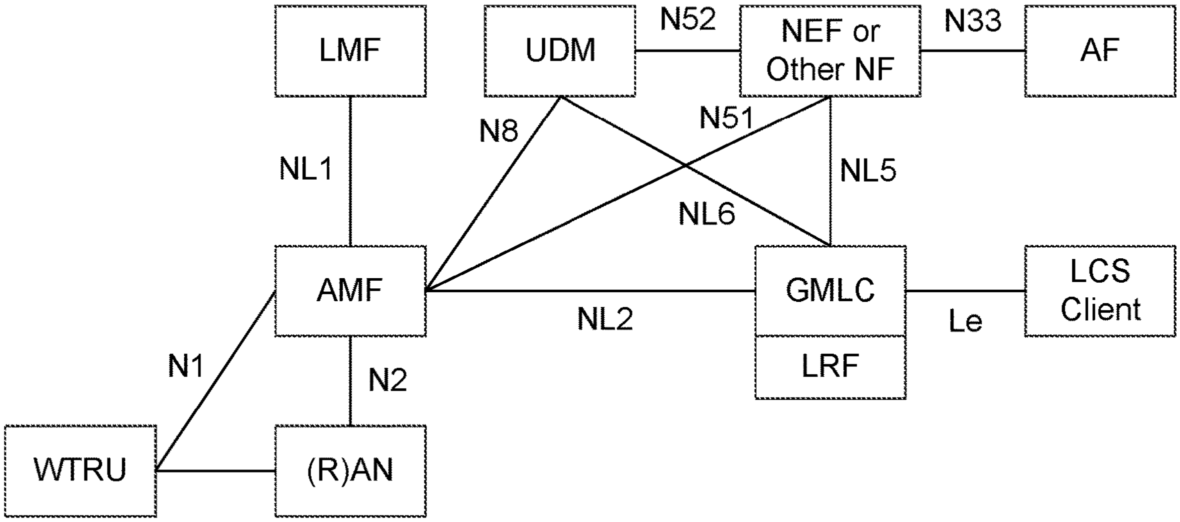
FIG. 10 illustrates an example non-roaming 5G location services architecture.

FIG. 10 illustrates an example non-roaming 5G location services architecture.

TABLE 1

Reference Points to Support Location Services

| Reference Points | Involved Entities | Function Description |
|---|---|---|
| Le | GMLC (or LRF) ↔ LCS Client | An LCS Client may send location requests via Le to a GMLC (or LRF). |
| N1 | UE ↔ AMF | A target UE may send location event reports or positioning protocol messages to an LMF via a serving AMF.<br>A serving AMF and the target UE transfer privacy notification and verification and change of UE privacy preference related to location services.<br>All messages over N1 for location services are included in NAS signaling messages. |
| N2 | (R)AN ↔ AMF | An LMF and a RAN node transfer positioning messages via an AMF over N2. An LMF can send a RAN node some assistance data to be broadcast by the RAN node. |
| N51 | AMF ↔ NEF/NF | An NEF or other NF may send queries to a serving AMF for the location of a target UE. |
| N52 | UDM ↔ NEF/NF | An NEF/NF may send queries to a UDM for privacy subscription information for a target UE and routing information (i.e., a serving AMF) for a target UE. |
| NL1 | AMF ↔ LMF | A serving AMF may send location requests for a target UE to an LMF. Location requests could be for immediate location and for the deferred location for periodic or triggered location events for a target UE. |
| NL2 | AMF ↔ GMLC | A GMLC may send location requests to a serving AMF for a target UE. |
| NL5 | GMLC ↔ NEF/NF | An NEF or other NF may send location requests to a GMLC. |
| NL6 | UDM ↔ HGMLC | An HGMLC may send queries to a UDM for privacy subscription information for a target UE and routing information (i.e., a serving AMF) for a target UE. |

A target WTRU may have one or more privacy requirements on sharing and/or exposing its location to other entities. WTRU LCS privacy is a feature that allows a WTRU and/or AF to control whether location requests from which LCS Clients or AFs are allowed or disallowed. WTRU LCS privacy information may be provided and/or maintained, for example:

via subscription data: The privacy preferences for a target WTRU may be included in a WTRU LCS privacy profile as part of WTRU subscription data to be stored in a UDM (or a UDR). Other entities such as a GMLC and/or a NEF may query the LCS privacy profile of the target WTRU via the UDM.

via dynamic update: The target WTRU and/or an AF may update part of the WTRU privacy profile and/or may store the update to the UDR.

The LCS may provide the following approaches to protect location privacy.

A target WTRU may send updated privacy requirements to a serving AMF (for transfer to a UDR via UDM).

The serving AMF may receive updated privacy requirements from a target WTRU and transfer them to a UDR via a UDM.

A UDR may store privacy data information for target WTRUs, which may be updated by a serving AMF via UDM with new privacy information received from a target WTRU.

A UDM may include a WTRU LCS privacy profile. The UDM may be accessible from an AMF, a GMLC and/or an NEF. The UDM may provide the WTRU LCS privacy profile to a GMLC and/or an NEF, where the authorization of location requests from LCS Clients or AFs may be performed.

A GMLC may provide an access to a PLMN for LCS Clients and/or it may be accessed by AFs and NFs directly or via an NEF. The GMLC may query routing information and/or target WTRU privacy information from a UDM, and based on which, the GMLC may performs authorization of a location request from an external LCS client and/or an AF and/or verifying the target WTRU privacy. The GMLC may forward the location request to a serving AMF (or to another GMLC for roaming case). The GMLC may store information for external LCS Clients that may be permitted to request location information for target WTRUs.

An NEF may request the target WTRU's privacy information from a UDM. The NEF may support WTRU LCS privacy profile provision from an AF. For a direct NEF query to a serving AMF without any GMLC involved (and/or for an NEF query via the UDM), the NEF may determine whether the AF is authorized to retrieve WTRU location, based on the WTRU LCS privacy profile that the NEF received from the UDM.

A typical flow for an AF to request the location of a target WTRU may include any of the following:

An AF may send an LCS location request to an NEF, which may indicate higher than cell-ID level location accuracy is required.

The NEF may forward the location request to a GMLC.

The GMLC may contacts a UDM of the target WTRU to get routing information (i.e., a serving AMF) and LCS privacy profile of the target WTRU.

The GMLC may use the retrieved LCS privacy profile from the UDM to authenticate the location request. If the location request is allowed, the GMLC may forward the location request to the serving AMF to request the current location of the target WTRU.

The serving AMF may perform a network-triggered service request to contact the target WTRU, e.g., if it is in CM IDLE state.

The serving AMF may use NAS signaling to notify the target WTRU of the location request from the AF, e.g., if its privacy profile requires such a notification.

The target WTRU may notify the WTRU user of the location request. After the user grants or withholds the permission of the location request, the target WTRU may send a notification result to the serving AMF.

The serving AMF may select an LMF, for example using an NRF query.

The serving AMF may send a request to the selected LMF to request the current location of the target WTRU.

The LMF may perform some positioning procedures to calculate the current location of the target WTRU. The LMF, for example, may send a positioning related N1 message to the target WTRU via the serving AMF, and/or send a network positioning message to a RAN node via the serving AMF.

The LMF may send a location response to the serving AMF indicating the current location of the target WTRU, which may include the location estimate, its age, and accuracy and may include information about the positioning method.

The serving AMF may forward the location response to the GMLC.

If the notification (verification) based on the current location of the target WTRU is needed (as specified by LCS privacy profile), the GMLC may send a notification to the target WTRU via the serving AMF and/or may wait for the confirmation from the target WTRU and/or the WTRU user.

The GMLC may forward the location response to the NEF.

The NEF may forward the location response to the AF.

Methods, apparatuses, systems, etc. directed to transaction management in distributed ledger (e.g., blockchain) enabled wireless systems are disclosed herein. In various embodiments, methods for, and/or for use in connection with, transaction management in a distributed ledger (e.g., blockchain) enabled wireless system may be implemented in a device comprising circuitry, including a transmitter, a receiver and a processor, such as any of a wireless transmit and receive unit (WTRU), a base station or other network element. Among the methods is a first method that may include any of obtaining (i) information from one or more sources and (ii) one or more parameters from at least one of the one or more sources; generating a transaction for the information based at least in part on the one or more parameters; determining a node of a distributed ledger based at least in part on the one or more parameters; and sending the transaction to the node of a distributed ledger.

Among the methods is a second method that may include any of obtaining information and/or one or more parameters from any of one or more sources; generating a transaction for the information based at least in part on the one or more parameters; determining a node of a distributed ledger based at least in part on the one or more parameters; and sending the transaction to the node of a distributed ledger.

Among the methods is a third method that may include any of obtaining (i) information from one or more sources and (ii) one or more parameters from at least one of the one or more sources; sending at least a first portion of the information to a data store; generating a transaction for at least a second portion of the information and a hash value of the at least a first portion of the information based at least in part on the one or more parameters; determining a node of a distributed ledger based at least in part on the one or more parameters; and sending the transaction to the node of a distributed ledger.

Among the methods is a fourth method that may include any of obtaining information and/or one or more parameters from any of one or more sources; sending at least a first portion of the information to a data store; generating a transaction for at least a second portion of the information and a hash value of the at least a first portion of the information based at least in part on the one or more parameters; determining a node of a distributed ledger based at least in part on the one or more parameters; and sending the transaction to the node of a distributed ledger.

In various embodiments of at least the third and fourth methods, each of the methods may include receiving second information indicating a storage location of the at least a first portion of the information.

In various embodiments of at least the third and fourth methods, each of the methods may include partitioning the information into the at least a first portion of the information and the at least a second portion of the information.

In various embodiments, the node of the distributed ledger may be first node of the distributed ledger, and in at least one of the first through fourth methods, the method may include receiving a confirmation of successful insertion of the transaction into the distributed ledger, wherein the confirmation is received from any of the first node of the distributed ledger, a second node of the distributed ledger and a second device associated with at least one of the first node and the second node.

In various embodiments, the device may include at least one service-based function, and wherein the at least one service-based function may carry out generating a transaction and determining a node of a distributed ledger.

In various embodiments, the method may include notifying one or more recipients of a status of the transaction. In various embodiments, the recipients may include at least one of a first service-based function of the device, a second service-based function of the device, and a third service-based function of a network. In various embodiments, the first service-based function may be a client of the third service-based function. In various embodiments, the second service-based function may be a client of the third service-based function. In various embodiments, the status may be any of pending, confirmed and rejected.

In various embodiments, generating a transaction for the data based at least in part on the one or more parameters may include generating the transaction for the data based at least in part on the one or more parameters and one or more policy rules.

In various embodiments, the method may include generating a transaction for at least a second portion of the data and a hash value of the at least a first portion of the data based at least in part on the one or more parameters may include generating the transaction for at least a second portion of the data and a hash value of the at least a first portion of the data based at least in part on the one or more parameters and one or more policy rules.

In various embodiments, the policy rules comprise any of a first policy rule to regulate whether the data is to be added to the distributed ledger and a second policy rule to regulate how the data is to be added in the distributed ledger.

In various embodiments, determining a node of a distributed ledger may include determining the node of the distributed ledger based at least in part on a proximity of the device to the node of the distributed ledger.

In various embodiments, the method may include the parameters may include a first location associated with the first device and a second location associated with the node of the distributed ledger, the method further comprising: determining the proximity of the device to the node of the distributed ledger based at least in part on the first and second locations.

In various embodiments, the parameters may include any of (i) a number of transactions to be created, (ii) an application category associated with each of the one or more sources, (iii) an identifier associated with each of the one or more sources, (iv) an application name associated with each of the one or more sources, (v) security credential information for each of the one or more sources, (vi) an address of the node of the distributed ledger, (vii) an identifier the node of the distributed ledger, (viii) a category of transaction to be created, (ix) a maximum transaction creation time; (x) a maximum transaction waiting time; (xi) a transaction creation priority; (xii) a transaction inclusion priority; (xiii) one or more addresses at which some or all of the data is stored; (xiv) an address of each of the one or more recipients to be notified of a status of the transaction, (xv) an identifier of each of the one or more recipients to be notified of the status of the transaction, (xvi) a type of the distributed ledger, (xvii) an address of the distributed ledger, (xviii) an identifier of the distributed ledger, (xix) a hash function, (xx) an indication of at least one of the one or more policy rules and (xxi) security credential information of the device.

1 In various embodiments, the method may include obtaining data may include requesting and receiving information from at least one of the sources.

In various embodiments, the information may include any of (i) third information for submission to the distributed ledger and (ii) fourth information indicating any of an address and an identifier to use to obtain fifth information for submission to the distributed ledger.

In various embodiments, the information may lack one or more of (i) sixth information for submission to the distributed ledger and (ii) seventh information indicating any of an address and an identifier to use to obtain eighth information for submission to the distributed ledger.

In various embodiments, the method may include receiving transaction record information.

In various embodiments, the method may include any of sending, to the data store, at least a portion of the transaction record information and the second information indicating the storage location of the at least a first portion of the information; and receiving, from the data store, ninth information indicating the at least a portion of the transaction record information is stored in association with the at least a first portion of the information.

In various embodiments, the method may include sending at least a portion of the information to a data store, at least a portion of the information; and receiving tenth information indicating a storage location of the at least a portion of the information.

In various embodiments, the method may include sending, to the data store, at least a portion of the transaction record information and the tenth information indicating the storage location of the at least a portion of the information; and receiving, from the data store, eleventh information indicating the at least a portion of the transaction record information is stored in association with the at least a portion of the information.

In various embodiments, the method may include obtaining one or more transaction policy rules from one or more sources, including any of a first entity and a second entity.

In various embodiments, obtaining the one or more transaction policy rules comprises any of requesting and/or receiving the one or more transaction policy rules from the one or more sources.

In various embodiments, determining a node of the distributed ledger may include selecting the node based on at least one of the one or more transaction policy rules.

In various embodiments, the information may include data associated with a blockchain transaction.

Among such methods is a fifth method that may be implemented a blockchain transaction manager (BTM) and may include any of: receiving, from a first entity, a blockchain transaction initiation (BCTI) request; obtaining data associated with the blockchain transaction from one or more sources, including any of the BCTI request and a second entity; generating a blockchain transaction comprising at least a portion of the obtained data and/or a hash, wherein the hash identifies at least a portion of the obtained data and/or an indicator/locator for obtaining a portion of the obtained data; sending the blockchain transaction to a blockchain node (BCN) (e.g., on behalf of the first entity); and receiving, from the BCN, a status of the blockchain transaction.

In various embodiments, the status may be any of pending, confirmed and rejected.

In various embodiments, obtaining data associated with the blockchain transaction may include requesting and/or receiving data associated with the blockchain transaction.

In various embodiments, the BCTI may include any of (i) data associated with the blockchain transaction, and (ii) an indicator/locator for obtaining data associated with the blockchain transaction.

5 In various embodiments, the BCTI may lacks any of (i) data associated with the blockchain transaction, and (ii) an indicator/locator for obtaining data associated with the blockchain transaction.

In various embodiments, the method may include selecting the BCN from among a plurality of BCNs. In various embodiments, the method may include selecting the BCN based on the obtained data. In various embodiments, the method may include any of storing at least a portion of the obtained data in a repository; and causing at least a portion of the obtained data to be stored in a repository.

In various embodiments, causing at least a portion of the obtained data to be stored in a repository may include any of: requesting a third entity to store the at least a portion of the obtained data to be stored in a repository; and sending, to a third entity, the at least a portion of the obtained data to be stored in a repository.

In various embodiments, the method may include sending, to the first entity, the status of the blockchain transaction. In various embodiments, the method may include receiving, from the BCN, blockchain transaction record information.

In various embodiments, the method may include any of storing at least a portion of the blockchain transaction record information in a repository; and causing at least a portion of the blockchain transaction record information to be stored in a repository.

In various embodiments, the method may include any of receiving, from the BCN, blockchain transaction record information; storing at least a portion of the blockchain transaction record information in the repository in connection with (e.g., in a record with) the at least a portion of the obtained data; and causing at least a portion of the blockchain transaction record information to be stored in the repository in connection with (e.g., in a record with) the at least a portion of the obtained data.

14 In various embodiments, causing at least a portion of the blockchain transaction record information to be stored in the repository may include any of requesting a third entity to store the at least a portion of the blockchain transaction record information in the repository in connection with the at least a portion of the obtained data; and sending, to a third entity, the at least a portion of the blockchain transaction record information to be stored in the repository.

In various embodiments, the method may include configuring the BTM with one or more blockchain transaction policy rules. In various embodiments, wherein configuring the BTM with one or more blockchain transaction policy rules may include any of dynamically and semi-statically configuring the one or more blockchain transaction policy rules.

In various embodiments, configuring the BTM with one or more blockchain transaction policy rules may include obtaining the one or more blockchain transaction policy rules from one or more sources, including any of the second entity and a fourth entity.

In various embodiments, the method may include obtaining the one or more blockchain transaction policy rules may include any of requesting and/or receiving the one or more blockchain transaction policy rules from the one or more sources. In various embodiments, the method may include selecting the BCN based on at least one of the one or more blockchain transaction policy rules.

In various embodiments, the method may include determining, based on at least one of the one or more blockchain transaction policy rules, whether data associated with the blockchain transaction is to be requested and/or received from any of the second entity and a fifth entity.

In various embodiments, the method may include selecting the BCN based on at least one of the one or more blockchain transaction policy rules.

In various embodiments, the method may include storing at least a portion of the obtained data in a repository based on at least one of the one or more blockchain transaction policy rules; and causing at least a portion of the obtained data to be stored in a repository based on at least one of the one or more blockchain transaction policy rules.

In various embodiments, causing at least a portion of the obtained data to be stored in a repository may include any of requesting a third entity to store the at least a portion of the obtained data to be stored in a repository; and sending, to a third entity, the at least a portion of the obtained data to be stored in a repository.

In various embodiments, the method may include determining, based on at least one of the one or more blockchain transaction policy rules, whether a portion of the data associated with the blockchain transaction is to be stored in a repository.

In various embodiments, the method may include determining, based on at least one of the one or more blockchain transaction policy rules, whether at least a portion of the blockchain transaction record information is to be stored in a repository.

In various embodiments, the method may include determining, based on at least one of the one or more blockchain transaction policy rules, whether at least a portion of the blockchain transaction record information is to be stored in a repository in connection within the repository in connection with (e.g., in a record with) the at least a portion of the obtained data.

In various embodiments, the BCTI may include data associated with the blockchain transaction. In various embodiments, the BCTI may include an indicator/locator for obtaining data associated with the blockchain transaction.

In any of the various embodiments including BTM, the BTM may be deployed in any of a RAN node, a CN node, a server, a gateway and a WTRU. In any of the various embodiments including BTM, the BTM may be a control plane network function.

In any of the various embodiments including a first entity, the first entity may be deployed in any of RAN node, CN node, a server, a gateway and a WTRU. In any of the various embodiments including a first entity, the first entity may be any of a blockchain client application (BCA), a blockchain transaction client (BTC) and a blockchain network application (BNA).

In various embodiments including a BNA, the BNA may be implemented as or combined with an application function (AF). In various embodiments including a BTM and a first entity, the BTM and first entity are deployed in the same device. In various embodiments, the one or more sources from which to obtain data associated with the blockchain transaction may include any of a data and policy provider (DPP), a blockchain network application (BNA), an unstructured data storage function (UDSF) and a unified data repository (UDR). In various embodiments including a second entity, the second entity may be a DPP. In various embodiments including third entity, the third entity may be an external data storage (EDS). In various embodiments including a fourth entity, the fourth entity may be a Policy Control Function (PCF). In various embodiments including a fifth entity, the fifth entity may be any of a blockchain network application (BNA), unstructured data storage function (UDSF) and a unified data repository (UDR). In various embodiments including a first entity, the method may include sending the blockchain transaction record information to the first entity.

Among such methods is a sixth method that may be implemented a deice and that may include any of sending a blockchain transaction initiation (BCTI) request to a blockchain transaction manager (BTM); receiving one or more statuses of the blockchain transaction from the BTM; and receiving blockchain transaction record information from any of the BTM and another BTM.

In various embodiments, one or more statuses may include any of pending, confirmed and rejected. In various embodiments, the one or more statuses may include an indication that the BCTI has been successfully processed.

In various embodiments, the BCTI may include any of (i) data associated with the blockchain transaction, and (ii) an indicator/locator for obtaining data associated with the blockchain transaction. In various embodiments, the BCTI may lacks at any of (i) data associated with the blockchain transaction, and (ii) an indicator/locator for obtaining data associated with the blockchain transaction.

In various embodiments of at least the sixth method, the method may include receiving a notification that at least a portion of the obtained data in stored in a repository.

In various embodiments of at least the sixth method, the method may include configuring the device with one or more blockchain transaction policy rules. In various embodiments of at least the sixth method, configuring the device with one or more blockchain transaction policy rules may include any of dynamically and semi-statically configuring the one or more blockchain transaction policy rules.

In various embodiments of at least the sixth method, configuring the device with one or more blockchain transaction policy rules may include obtaining the one or more blockchain transaction policy rules from one or more sources, including any of the BTM and a second entity.

In various embodiments of at least the sixth method, obtaining the one or more blockchain transaction policy rules may include any of requesting and/or receiving the one or more blockchain transaction policy rules from the one or more sources.

In various embodiments of at least the sixth method, the method may include determining, based on at least one of the one or more blockchain transaction policy rules, whether to send the BCTI.

In various embodiments of at least the sixth method, the method may include determining, based on at least one of the one or more blockchain transaction policy rules, whether to provide data associated with the blockchain transaction and/or an indicator/locator for obtaining data associated with the blockchain transaction in or with the BCTI.

In various embodiments of at least the sixth method, the BTM may be deployed in any of a RAN node, a CN node, a server, a gateway and a WTRU. In various embodiments of at least the sixth method, the BTM may be a control plane network function. In various embodiments of at least the sixth method, the device is any of a RAN node, a CN node, a server, a gateway and a WTRU. In various embodiments of at least the sixth method, the device may include one or more entities configured to perform various embodiments of at least the sixth method, and the entities may be any of a blockchain client application (BCA), a blockchain transaction client (BTC) and a blockchain network application (BNA).

In various embodiments of at least the sixth method, the BNA may be implemented as or combined with an application function (AF). In various embodiments of at least the sixth method, the BTM may be deployed in the device. In various embodiments of at least the sixth method, the second entity may be a DPP. In various embodiments of at least the sixth method, the BCTI request may include any of an address of a blockchain node (BCN), a type or the category of the transaction to be created, a maximum transaction creation time, a maximum transaction waiting time, a blockchain transaction creation priority, a blockchain transaction inclusion priority, an application category of a requester, and an identifier of the requester.

Among the apparatuses, is an apparatus, which may include any of a receiver, transmitter, a processor and memory, configured to perform a method as in at least one of the preceding methods.

Representative Use Case 1— Internet of Vehicles

Figure 11:
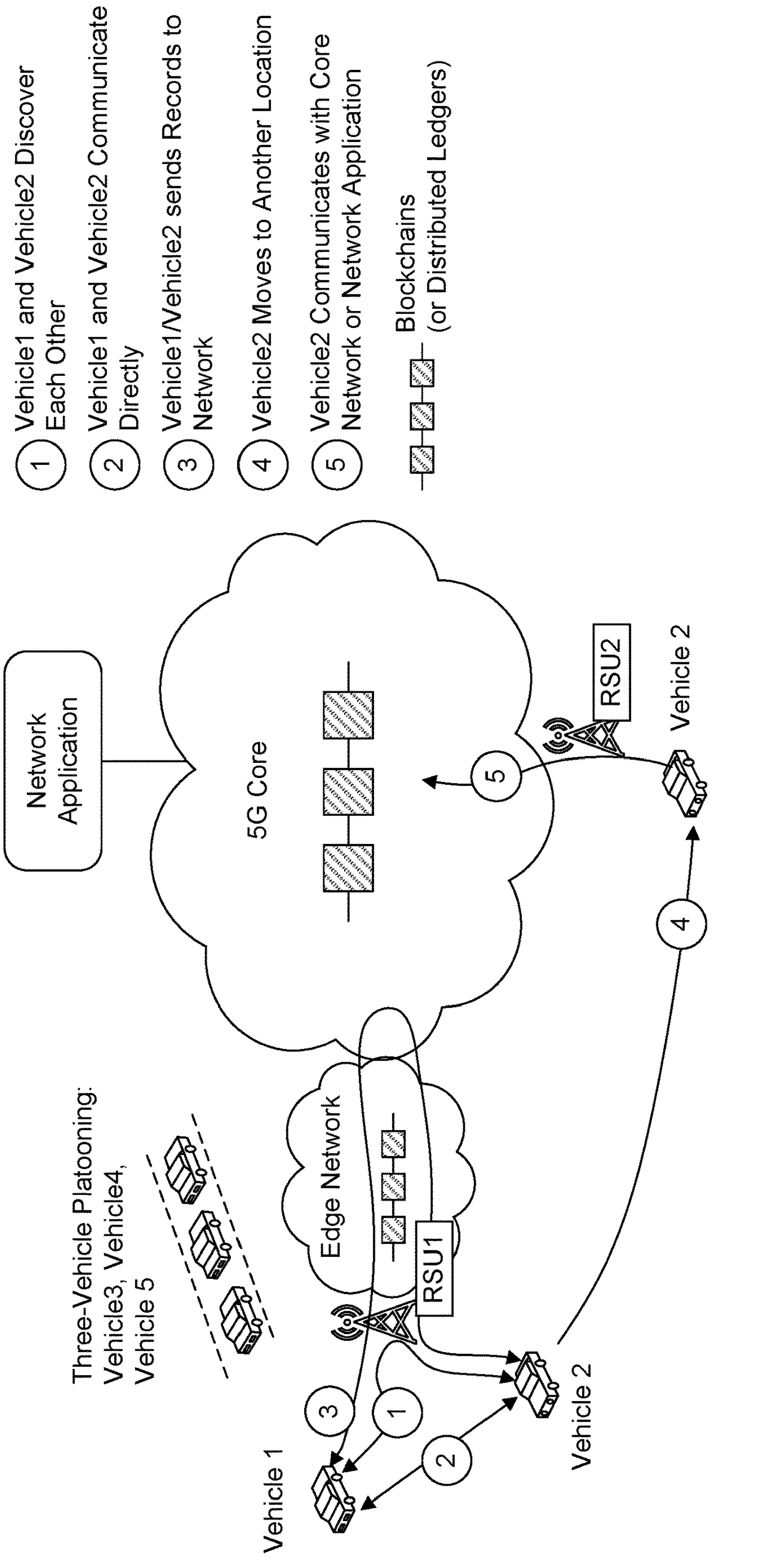
FIG. 11 illustrates an example use case for an internet of vehicles.

FIG. 11 illustrates an example use case for an internet of vehicles (IoV). Each vehicle may have a connection to the internet via at least a wireless connection (e.g., 5G) with a roadside unit (RSU) (or a base station). The RSU may include or have access to a local edge network with computing and storage resources.

A vehicle may move from one RSU to another RSU. A vehicle can communicate with another vehicle, an RSU, an edge network, a core network, and/or an application server. For example, Vehicle1 may discover Vehicle2 and may find that both are under the same RSU1. Vehicle1 and Vehicle2 may engage in direct communications (e.g., Vehicle-to-Vehicle). Following the direct communications, Vehicle1, Vehicle2 and/or 5GS may need to keep a record of their communications to the network to maintain the history. Vehicle2 may move out of coverage of the RSU1 and/or may associate with a new RSU, RSU2. Vehicle2 may engage in communications with any of the CN and a network application via RSU2.

In this use case, there may be various scenarios where blockchain transactions may be created and stored on a designated blockchain. Examples of the various scenarios may include any of the following.

- The event that Vehicle1 and Vehicle2 meet each other under the same RSU1 can be recorded in a blockchain transaction The blockchain transaction may include, for example, location information of both vehicles.
- Direct communications between Vehicle1 and Vehicle2 may be coordinated and enabled through the blockchain system in a decentralized fashion.
- The record of communications between Vehicle1 and Vehicle2 may be recorded in a blockchain transaction. The blockchain transaction may include, for example, the time length and total data volume of the communications.
- When Vehicle2 moves from RSU1 to RSU2, the new location of Vehicle2 may be recorded in the blockchain system.
- RSU1 may store Vehicle2's context information to a blockchain system. As such, when Vehicle2 moves from RSU1 to RSU2, RSU2 may access Vehicle2's context information directly from the blockchain system without contacting RSU1.
- A platooning event involving a plurality of vehicles may be recorded in a blockchain transaction. An example of a platooning scenario with three vehicles: Vehicle3, Vehicle4, and Vehicle5 is shown in FIG. 11.

3.2 Use Case 2—Smart Manufacturing and Logistics

Figure 12:
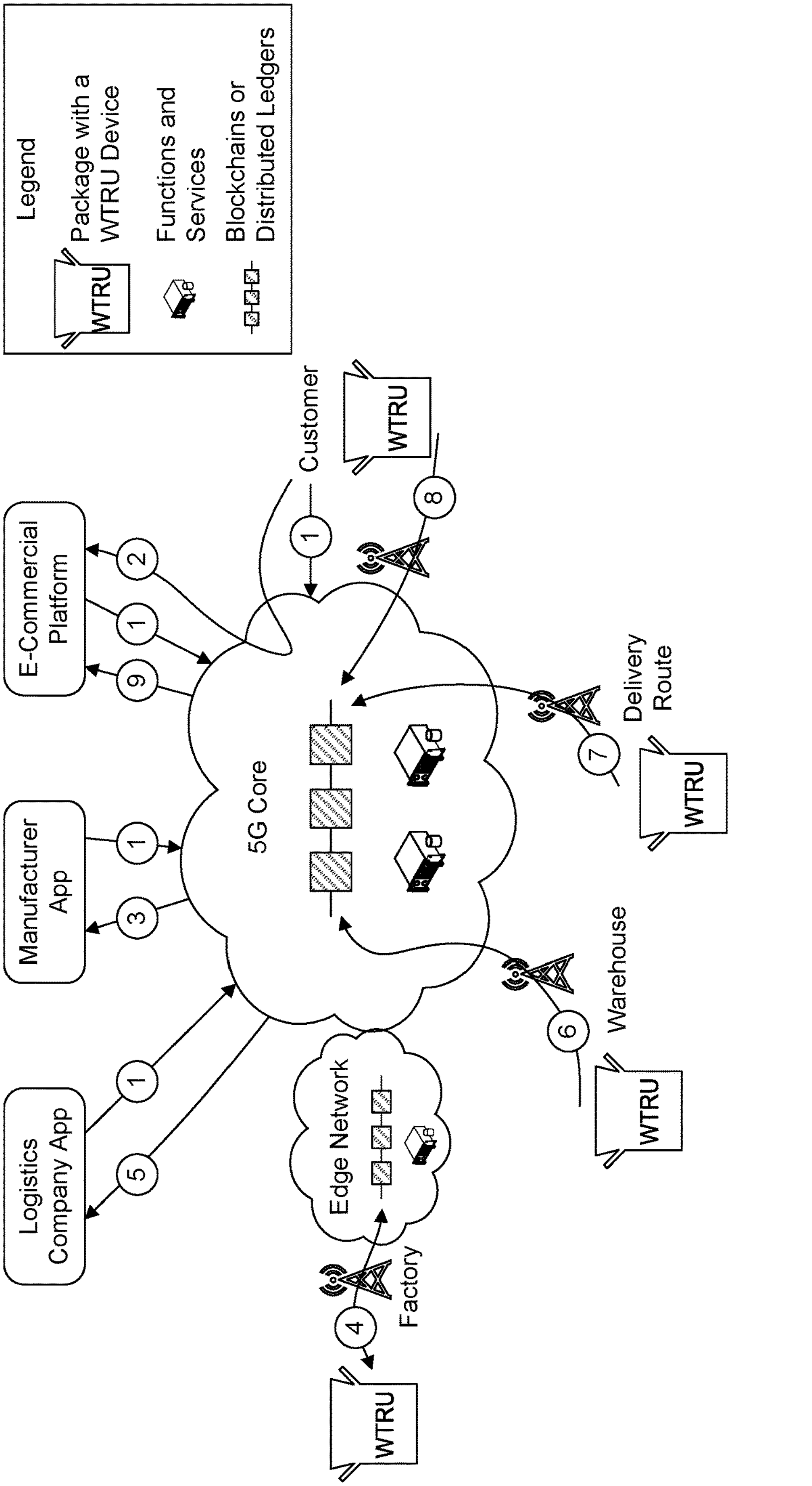
FIG. 12 illustrates a smart manufacturing and logistics use case.

FIG. 12 illustrates a smart manufacturing and logistics use case. For convenience and simplicity of exposition, the refs. in the disclosures accompanying FIG. 12 are shown with the prefix "12:". The smart manufacturing and logistics use case may include four participating parties: a customer, an e-commercial company, a manufacturer, and a logistics company. These four parties may use an internet of things (IoT) and/or 5G technologies to enable a smart manufacturing and logistics process. The smart manufacturing and logistics process may include any of the following:

- Step or operation 1: Each party may register to a 5GS (or a cloud system) as an application (12:1).
- Step or operation 2: The customer may submit a purchase request to an e-commercial platform (application of the e-commercial company) (12:2). For the sake of simplicity, the purchase request may be for a single product item.
- Step or operation 3: The manufacturer application may receive the list of product items ordered by the customer (12:3), likely from the e-commercial platform.
- Step or operation 4: The manufacturer application may send the list to the factory, where the ordered product item is produced and ready for shipping to the customer (12:4).
- Step or operation 5: The logistics company may receive a notification to pick up the produced item from the factory and ship it towards the customer (12:5).
- Step or operation 6: The shipped item arrives at a warehouse (12:6), which may be owned or rented by the logistics company.
- Step or operation 7: The item may be sent for delivery on route towards the customer (12:7).
- Step or operation 8: The item may arrive and be received by the customer (12:8).
- Step or operation 9: The e-commercial platform may receive a notification (12:9).

In this case, each step or operation may trigger one or more actions for the corresponding party, and any (e.g., each) of such events may be created as a blockchain transaction and be stored onto a designated blockchain. However, the WTRU attached to each package may be very resource-constrained for the sake of cost reduction. The WTRU might not have the capability to create transactions and/or to participate in the blockchain system (e.g., to store the blockchain, to perform consensus mechanism, etc.). As used herein, the term "step" is understood to encompass "one or more operations", and thus, for convenience and simplicity of exposition, the terms "step and "operation(s)" may be used interchangeably herein.

Embodiments address the following key issues described with reference to the use cases disclosed herein.

Key Issue #1— a blockchain system and a 5GS are two separate systems and currently not well integrated together, which make it inefficient and challenging to add 5GS-related data onto a blockchain. A WTRU may directly generate a transaction including some data and send the transaction into a blockchain network using over-the-top approach. However, the WTRU is not a standalone entity but controlled, managed, and served by 5G network functions. On one hand, the WTRU by itself may not be able to make a sound decision on whether to sending its data into the blockchain network, because such a decision may be guarded by 5G network functions such as PCF. On the other hand, a transaction to be added into a blockchain may include some joint information from multiple WTRUs, a RAN node, and 5G core network. As a result, the over-the-top approach cannot work efficiently for WTRUs.

Key Issue #2— Machine-Type Communication (MTC) devices in 5GS usually have limited resources and it is infeasible (and in some instances impossible) for them to maintain an entire blockchain or participate in the consensus process. The limited resources do not allow an MTC device to directly participate in blockchain systems. If an MTC device needs to create transactions to a blockchain system, new functions such as blockchain application enablement as disclosed herein may be used to assist the MTC device with interacting with a blockchain system, including, for example, creating blockchain transactions to the blockchain system.

Key Issue #3— Due to the broadcast nature of P2P networking adopted by a blockchain system, transaction creation and block generation will generate high-volume traffic within 5GS, referred to as blockchain traffic, especially when a massive number of MTC devices attempt to create transactions onto a blockchain or when a WTRU acts as a BCN directly participating in a blockchain network. Such blockchain traffic needs to be appropriately regulated.

Key Issue #4— An event to be added onto a blockchain may be related to multiple WTRUs (e.g., vehicles in V2X vertical application). These WTRUs need to be coordinated when generating a blockchain transaction for this event.

Key Issue #5— A malicious WTRU may attempt to generate many useless transactions to a blockchain system, which may not only hurt the blockchain system but congest the 5GS as well. An effective authentication and authorization on transaction creation should be provided.

Key Issue #6— A blockchain application may need to include selective transactions in a new block, for example, to avoid long waiting times for a transaction to be successfully included in a block. The blockchain application might directly inform the corresponding blockchain system of such requirements each time when creating a new transaction, but this approach may cause high overhead at the blockchain application side.

Key Issue #7— A blockchain application may need to store data to multiple standalone or dependent blockchains. The blockchain application may store data to each standalone blockchain one-by-one, but this way may introduce a high burden to the blockchain application.

Representative Integrated Blockchain and Wireless System Architecture

Figure 13:
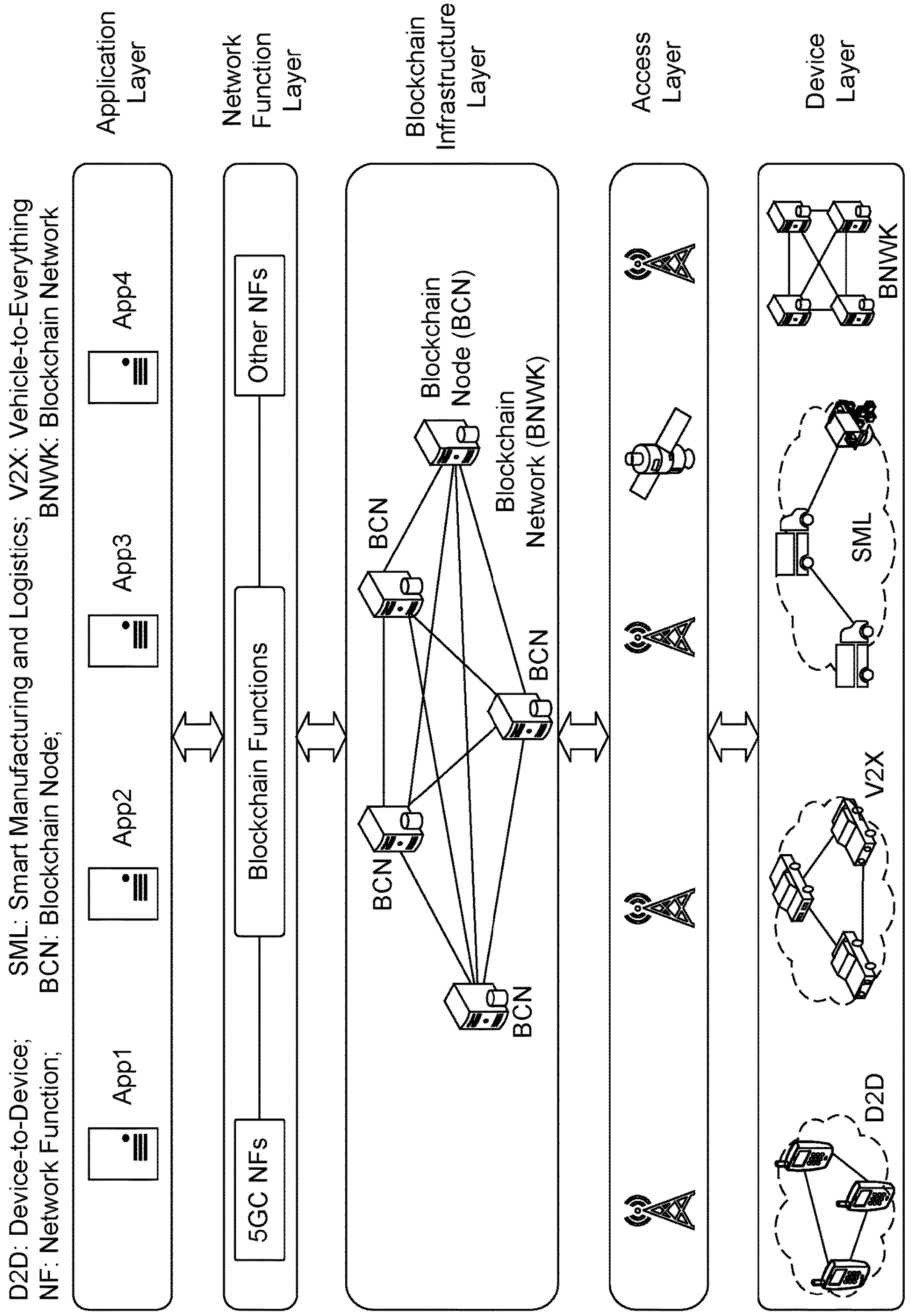
FIG. 13 illustrates an integrated blockchain and wireless system architecture.

FIG. 13 illustrates an integrated blockchain and wireless system architecture. The integrated blockchain and wireless system architecture may include the following logical layers.

Device Layer: The device layer may include end devices, which may support different applications such as device-to-device (D2D) communications, vehicle-to-everything (V2X) communications, and smart manufacturing and logistics (SML). In addition, some powerful devices may be participants of a blockchain network (BNWK), such as miners in Bitcoin system.

Access Layer: The access layer such as a 5G and beyond RAN or satellites may provide connectivity to end devices. This layer may include distributed edge networks, which may host any of local storage, local computing, and local applications.

Blockchain Infrastructure Layer: This layer may include different blockchain networks. Each blockchain network may have different protocols and/or support different types of blockchains. A blockchain network may have a set of BCNs. As a participant of the blockchain network, each BCN may have storage and computing resources and may maintain a local copy of the full blockchain (i.e., ledger). All BCNs of a blockchain network logically form a P2P overlay network in order to broadcast new transactions and blocks among them.

Network Function Layer: This layer may provide various network functions such as 5G core network functions, transaction-related blockchain functions and other traditional network functions. A BCN may use these network functions. Also, blockchain functions may interact with 5G core network functions and other network functions to better serve and/or manage BCNs. The blockchain functions may function to glue blockchain system and wireless system; for example, a 5G core network function may access a BCN and accordingly the full blockchain via blockchain functions.

Application Layer: Various network applications may use network functions to access blockchain networks. Devices and network applications may interact with each other via network functions and blockchain networks.

Representative Blockchain Transaction Management Architectures

Figure 14:
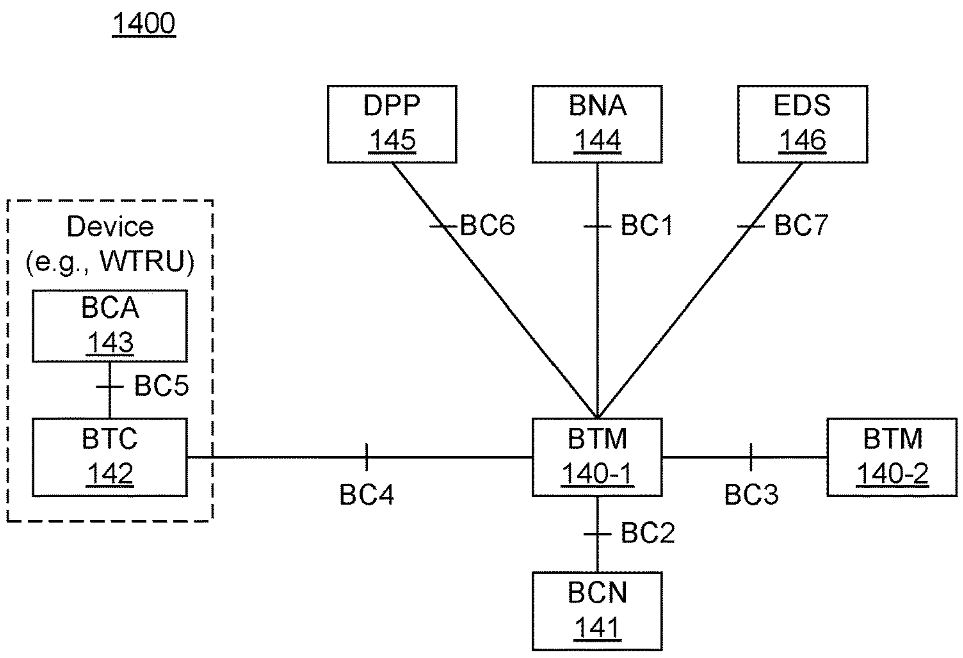
FIG. 14 illustrates an example functional architecture for blockchain transaction management.

FIG. 14 illustrates a functional architecture 1400 for blockchain transaction management. The blockchain transaction management may include blockchain transaction creation, blockchain transaction query, blockchain transaction subscription, and blockchain transaction access control. The functional architecture 1400 may include a BTM 140-1, a BCN 141, a BTC 142, a BCA 143, a BNA 144, a DPP 145, and EDS 146. Although only a single BCN, a single BTC, a single BCA, a single BNA, a single DPP and a single EDS are shown in FIG. 14, the functional architecture 1400 may include more than one of each. And although two BTMs are shown in FIG. 14, the functional architecture 1400 may include more or fewer BTMs. For simplicity of exposition, the BTM 140-1 may be referred as BTM 140.

The BTM 140 may play an important role in the entire architecture. The BTM 140 may interface with the BCN 141 and the underlying blockchain networks (not shown). The BTM 140 may obtain input data from the BNA 144 and/or the BCA/BTC 143/142 and optionally other input data from the DPP 145. The BTM 140 may generate a transaction according to a selected BCN 141. The BTM 140 may send the transaction to the selected BCN 141. In some cases, the BTM 140 may split the input data into two parts: one part to be stored in a blockchain network via the BCN 140 and the second part to be stored in the EDS 146. There may be cases where the BNA 144 and/or the BCA/BTC 143/142 do not send data to the BTM 140 directly, and may indicate a type and address of data which the BTM 140 may retrieve from the DPP 145. The BTM 140 may send the retrieved data in the form of blockchain transaction(s) to the BCN 141. The BTM 140 may choose and/or assign one or multiple appropriate BCNs and corresponding blockchain systems for other entities (e.g., a BCA, a BTC, and/or a BNA), for example based on some indication or requirements from them. The BTM 140 may maintain such assigned BCNs for these entities; as such, these entities might not need to explicitly indicate a BCN each time they request the BTM 140 to request a new transaction for them. This approach may reduce signaling overhead between the BTM 140 and such entities and may simplify the operations at the entities.

The BCN 141 may behave as a regular blockchain node of a blockchain network and may support corresponding blockchain protocols (e.g., transaction format, blockchain structure, consensus protocol, etc.). The BCN 141 may be responsible for sending any transaction from the BTM 140 into the blockchain network in which the BCN 141 participates. After a transaction has been successfully inserted to a blockchain, the BCN 141 may send a notification back to the BTM 140. The BTM 140 may send a request to the BCN 141 to query, discover, and/or retrieve any existing transactions on the blockchain.

The BTC 142 may send to the BTM 140, on behalf of one or multiple BCAs, data to be added to a designated blockchain. Alternatively, the BTC 142 may indicate to the BTM 140 the type and/or address of data (not the data itself), and the BTM 140 may retrieve the data and may add it to the designated blockchain. The BTC 142 may use transaction management related functionalities provided by the BTM 140.

The BCA 143 may be an end application and it may register to the BTC 142. The BCA 143 may interact with BTC 142. Alternatively, a BCA 143 may discover an available BTM (e.g., BTM 140) via a BTC, and may communicate with the BTM directly for adding data to a blockchain.

As an application, the BNA 144 may be similar to the BCA 143. The BNA 144 may communicate with the BTM 140 directly for adding a data to a blockchain. The BNA 144 may be a server-side application entity for a particular blockchain application (e.g., a blockchain-based V2X application, a blockchain-based SML application, etc.) and may interact with zero or more (a set of) BCAs, which may be client-side application entities for the same blockchain application. As an example, for a blockchain-based V2X application, there may be one BNA 144 residing in the cloud or 5GS, while each vehicle hosts a BCA 143.

The DPP 145 may provide data to be added to a blockchain and/or policies related to accessing that data and/or accessing the blockchain network via the BCN 141. For example, the BTM 140 may retrieve data from DPP 145 based on an indication from the BNA 144 and/or the BTC/BCA 142/143. When the BNA 144 and/or the BTC/BCA 142/143 requests the BTM 140 to add data to a blockchain, the BTM may check with the DPP 144 for, and/or obtain from the DPP 144, any policy for the request. The BTM 140 may enforce such policies, if any.

In some cases, the BNA 144 and/or the BTC/BCA 142/143 may need or want the BTM 140 to store at least a portion of the data onto a blockchain and/or store a least a portion of the data (e.g., the same or differing portion) on an external repository. For such a scenario, the BTM 140 may contact the EDS 146 to store the data as such, and may store a hash of the externally stored data to a blockchain.

Figure 15:
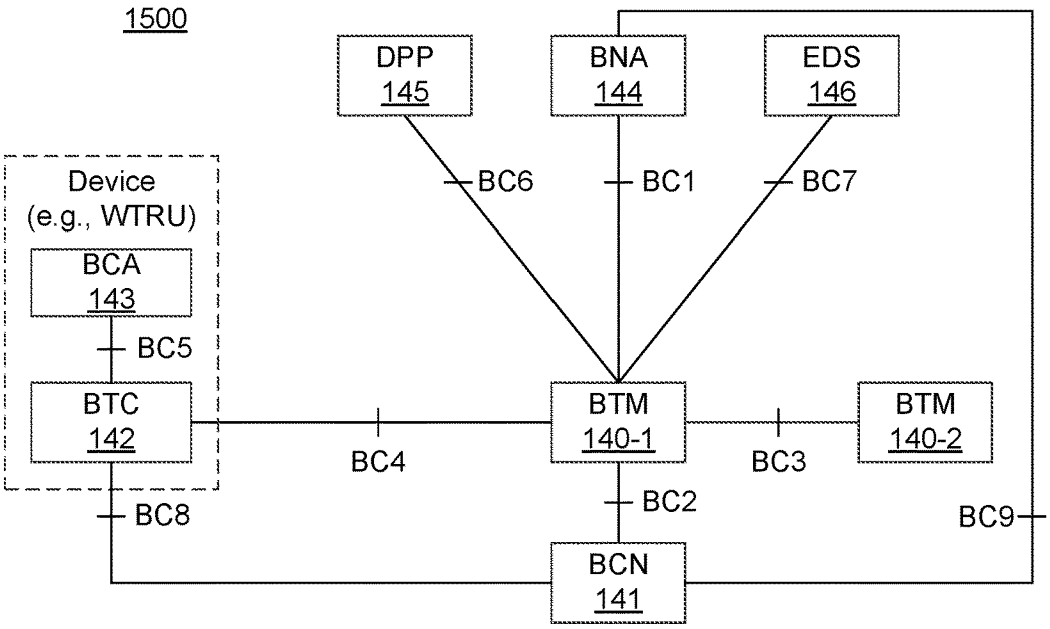
FIG. 15 illustrates an example functional architecture for blockchain transaction management.

FIG. 15 illustrates an example architecture 1500 for blockchain-enabled wireless applications. The example architecture 1500 of FIG. 15 is similar to the example architecture 1400 of FIG. 14, except as described herein. The BTC 142 may discover the BCN 141 from the BTM 140 or the BTM 140 may assign the BCN 141 to the BTC 142. After being apprised of the BCN 141, the BTC 142 may interact with the BCN 141 directly. For example, the BTC 142, on behalf of one or more BCAs 143, may send data from the BCAs 143 to the BCN 141 and/or may request the BCN 141 to store the data onto the blockchain which the BCN 141 supports. The BNA 144 may discover the BCN 141 from the BTM 140 or the BTM 140 may assign the BCN 141 to the BNA 144. After being apprised of the BCN 141, the BNA 141 may interact with the BCN 141 directly. For example, the BNA 144 may send its data to the BCN 141 and/or may request the BCN 141 to store the data onto the blockchain which the BCN supports.

Representative Transaction and Block Creation

Representative BTM-Controlled Transaction Creation

In BTM-controlled transaction creation, all requests for creating blockchain transactions may be sent to a BTM. The BTM may be responsible for authenticating the requests, processing the requests by obtaining any additional information, selecting a BCN of a designated blockchain network, and/or forwarding the processed request to the BCN. The BCN may create blockchain transactions as requested and/or may send them to the designated blockchain network. The BTM may interact with the BCN and the designated blockchain network on behalf of other entities, such as a BCA, a BTC, and/or a BNA. Examples of BTM-controlled transaction creation include (i) BCA/BNA-triggered BTM-controlled transaction creation, (ii) BTC-triggered BTM-controlled transaction creation, and (iii) BNA-subscribed BTM-controlled transaction creation.

The BCA/BNA-triggered BTM-controlled transaction creation may be suitable (used) for scenarios in which a BCA and/or a BNA may request and/or may trigger a BTM to create blockchain transactions. The BTC-triggered BTM-controlled transaction creation may be suitable (used) for scenarios in which a BTC may request and/or may trigger a BTM to create blockchain transactions. The BNA-subscribed BTM-controlled transaction creation may be suitable (used) for scenarios in which (i) one or more entities (e.g., a BCA, a BTC and/or a BTM) may expose one or more subscribable events that trigger the BTM to create blockchain transactions, facilitate creation of blockchain transactions and/or facilitate storage of information in an EDS, and (ii) a BNA subscribes to one or more of the events exposed by the entities.

Representative BCA/BNA-Triggered BTM-Controlled Transaction Creation

Figure 16:
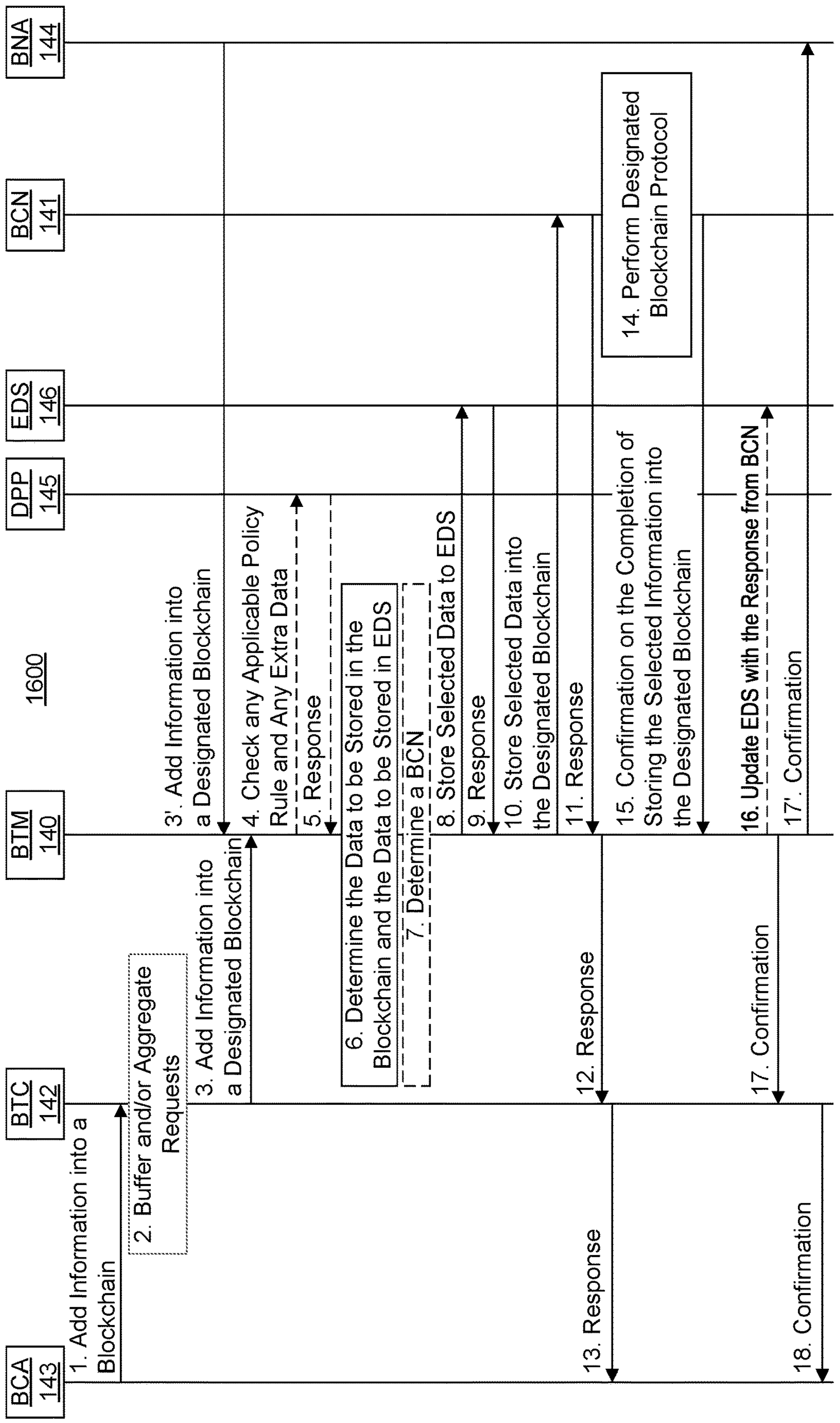
FIG. 16 illustrates an example procedure for transaction manager controlled transaction creation.

FIG. 16 illustrates a procedure 1600 for BCA/BNA-triggered BTM-controlled transaction creation. The procedure 1600 is described with reference to the transaction management architecture 1400 (FIG. 14) and the communications system 100 (FIGS. 1 and 5) for convenience and simplicity of exposition. The procedure 1600 may be carried out using different architectures as well. The procedure 1600 may be suitable (used) for scenarios in which a BCA 143 and/or a BNA 144 may send (issue) a request to add information into a blockchain via a BTM 140.

The term "step" as set forth in the disclosures accompanying FIGS. 16-26 and 29-36 (along with the rest of the disclosure) is understood to encompass "one or more operations" and the terms "step and "operation(s)" may be used interchangeably herein. Reference numerals accompanying operations set forth in the disclosures accompanying FIGS. 16-26 and 29-36 may include a prefix consisting of the figure number and a colon.

Pre-conditions: The BCA 143 may be registered to or associated with a BTC 142. The BTC 142 may be registered to or associated with the BTM 140. The BTM 140 has the address of the BCN 141 and may be provisioned and/or configured communicate with it. The BCN 141 is a participant of a designated blockchain system and maintains a designated blockchain (or a distributed ledger). The BNA 144 may be registered to or associated with the BTM 140. Optionally, there may be a DPP 145 and an EDS 146, which the BTM 140 can access. The BCA 143 may be provisioned and/or configured to use functionalities provided by the BTC 142. The BTC 142 may be provisioned and/or configured to access functionalities of the BTM 140. The BTM 140 may be provisioned and/or configured to interact with the designated blockchain system via the BCN 141. The BTM 140 may provisioned and/or configured to interact with the designated blockchain system on behalf of the BTC 142 and/or the BCA 143. The BCA 143 and the BTC 142 may be co-located, for example, within the same device (e.g., a smartphone, a vehicle, a drone, a sensor) or hosted by two different devices. The BTM 140, as a function, may reside (be disposed) in a device, a gateway, an element of an edge network, an element of a 5G core network, and/or an element of a data center. The BCN 141, as a function, may reside (be disposed) in a device, a gateway, an element of an edge network, an element of a 5G core network, and/or an element of a data center.

Before step 1, the BTM 140 may have informed the BCA 143 and/or the BTC 142 (or the BNA 144) of one or more (e.g., a list of) parameters ("transaction-creation parameters") to send to the BTM 140 when requesting to add information to a blockchain in step 1 and step 3 (or step 3'). The BCA 143 and/or the BTC 142 (or the BNA 144) may include a set of the transaction-creation parameters ("transaction-creation parameter set") in a request sent by the BCA 143 in step 1 and/or a request sent by the BTC 142 in step 3 (or a request sent by the BNA 144 in step 3').

Alternatively, and/or additionally, the BTM 140 may create and may assign a transaction description for each or both of the BCA 143 and the BTC 142 (or the BNA 144). The transaction description (or each transaction description) may describe the transaction-creation parameters to be included in a new transaction, how a new transaction should (may) be created, which entities the transaction description can be applied to, and/or other information. The BCA 143 and the BTC 142 (or the BNA) may include information indicating applicable transaction descriptions in requests sent thereby in step 1 and step 3, respectively (or sent by the BNA 144 step 3'). The BTM 140 shall (or may) use the transaction description(s) to create new transactions for the BCA 143 and/or the BTC 142 (or the BNA 144) accordingly. Alternatively, and/or optionally, after step 3 (or step 3'), the BTM 140 may select a transaction description for the BCA 143 and the BTC 142 (or the BNA 144) or for each of the BCA 143 and the BTC 142 (or the BNA 144). The BTM 140 may use the transaction description(s) to create new transactions for the BCA 143 and/or the BTC 142 (or the BNA 144). This approach simplifies and eases the operations at the BCA 143 and/or the BTC 142 (or the BNA 144).

Step 1: the BCA 143 may generate and send a first request to add information into a blockchain to the BTC 142 (16:1). The BTC 142 (or the BTM 140) may have already installed one or more blockchain policy rules to the BCA 143. The BCA 143 may generate the first request based on the installed blockchain policy rules. For example, a blockchain policy rule may instruct the BCA 143 to generate such a request every T1 seconds. The BCA 143 may include information indicating the appropriate transaction indication and/or the transaction-creation parameter set in the first request when generating the first request. The transaction-creation parameter set may include any of the transaction-creation parameters: (i) a number of transactions to be created, (ii) an application category of the BCA 143, (iii) an identifier of the BCA 143, (iv) an application name of the BCA 143, (v) security credential information of the BCA 143 (e.g., a digital signature of the BCA 143 that is applied to the request (or each request)) and (vi) content for each transaction. The content for each transaction may include the following parameters:

- an address and/or an identifier of a BCN that participates in the designated blockchain system;
- a category of transaction to be created: A BTM and/or a BCN can use this parameter to group the same category of pending transactions to create a new block, or to select transactions with different categories when creating a new block for balancing purposes. Including the same type of transactions within a block will (may) make it more efficient to later query or retrieve transactions of a particular category;

- a maximum transaction creation time: This parameter indicates the deadline, before which the requested transaction should be created;
- a maximum transaction waiting time: The parameter indicates a time duration, which the transaction can wait before it is included in a new block. In other words, after this transaction is created, it should (may) be included in a new block without waiting to exceed the lifetime indicated by this parameter. The BCN 141 and other BCNs may use this parameter to influence how this transaction is forwarded within the blockchain network and how it will (may) be selected to be included in a new block. A transaction with a shorter transaction waiting time will (may) likely be forwarded faster and may be selected earlier;
- a transaction creation priority: This parameter may indicate importance and/or latency requirement for creating the transaction. For example, the transaction creation priority may indicate a high importance requirement or a low latency requirement for creating the transaction to cause the transaction to be created and/or sent to the blockchain network sooner than a request indicating a lower transaction creation priority;
- a transaction inclusion priority: This parameter may indicate incentive and/or latency requirements for including the transaction into a new block. For example, the transaction inclusion priority may indicate a lower latency requirement or a higher incentive to cause the transaction to be included in a new block earlier;
- first information ("information1") and/or an address at which the information1 is stored; the information1 may be added onto a designated blockchain;
- second information ("information2") and/or an address at which the information2 is stored; the information2 will (might) not be added onto a designated blockchain, but a hash value of thereof will (may) be added into a designated blockchain;
- an address of extra data to be added together with the information1 into the designated blockchain; and/or
- an address of the recipient which shall (may) receive, know, and/or be notified of the transaction. The recipient may be another BCA, another BNA, and/or another BTC.

Step 2: The BTC 142 may receive the first request the BCA 143. The BTC 142 may authenticate and authorize the first request using the context and/or the security credential information of the BCA 143 (e.g., the public key of the BCA 143), which the BTC 142 may maintain locally. If the first request passes the authentication, the BTC 142 may buffer the first request and/or may aggregate the first request with one or more other requests for adding information into the blockchain (16:2). The other requests may be from the same BCA 143 and/or one or more other BCAs. The BTC 142 may receive (i) all of the other requests before or after reception the first request or (ii) some of the other requests before and some after reception the first request. If authentication fails, the BTC 142 may discard the first request and may skip all remaining steps other than step 13.

Step 3: The BTC 142 may send the first request or the first request aggregated with the other requests to the BTM 140 (16:3). For convenience and simplicity of exposition, the first request aggregated with the other requests may be referred to as "the first request". The BTM 140 may have already installed one or more blockchain policy rules to the BTC 142. The BTC 142 may send the first request based on the installed blockchain policy rules. For example, a blockchain policy rule may instruct that the BTC 142 must send such a request with a speed below a threshold. The first request sent by the BTC 142 may include (i) the same transaction-creation parameter set as disclosed above in connection with step 1 and (ii) one or more additional transaction-creation parameters. If the transaction-creation parameter set disclosed above in connection with step 1 was not included in the first request received from the BCA 143, the BTC 142 may append them into the first request before forwarding the first request to the BTM 140. The additional transaction-creation parameters may include any of the following: (i) an identifier of the policy rule which may be used and enforced by the BTM 140 to regulate whether/how the information and the extra data may be added in the designated blockchain; (ii) a type, an address or an identifier of the designated blockchain, from which the address of the BCN 141 may be deduced; (iii) an identifier of the BTC 142; (iv) a hash function or any relevant keys which may be used by the BTM 140 to hash data to be stored in the EDS 146 (in step 8); (v) a trigger or an indication that may require the BTM 140 to periodically obtain data from a designated place and store them onto the designated blockchain; and/or (vi) security credential information (e.g., a digital signature of the request) of the BTC 142.

Step 3': The BNA 144 may send to the BTM 140 a second request to add information and data into the blockchain (16:3'). The BTM 140 may have already installed one or more blockchain policy rules to the BNA 144. The BNA 144 may generate the second request based on the installed blockchain policy rules. For example, a blockchain policy rule may instruct the BNA 144 to generate such a request at most every T2 seconds. The second request may include (i) the transaction-creation parameter set, (ii) the additional transaction-creation parameters, and (iii) one or more of the following transaction-creation parameters ("other transaction-creation parameters"): (i) an identifier of the BNA 141; and/or (ii) security credential information (e.g., a digital signature of this request) of the BCA 143.

Step 4: The BTM 140 may send to the DPP 145 a third request to check for any applicable blockchain policy rules and any extra data (16:4). In various embodiments, the BTM 140 may have been configured by the DPP 145 with one or more blockchain policy rules and may have passively stored one or more blockchain policy rules. The BTM 140 may use locally available blockchain policy rules before requesting and/or retrieving any from the DPP 146.

For example, an identifier of a blockchain policy rule may be included in one or more of the first request from the BTC 142 (Step 3) and/or the second request from the BNA 144 (Step 3'). The BTM 140 may submit this identifier to the DPP 145 to retrieve the content of the corresponding blockchain policy rule. The blockchain policy rule may specify: 1) a type, an address, and/or an identifier of the designated blockchain to be applied to one or more (each) of the requests from the BNA 144, the BTC 142, and/or the BCA 143; 2) whether is there any extra data to be jointly added together with any designated information into the designated blockchain; 3) where to retrieve such extra data if not provided by the DPP 145.

In another example, one or more of the first request from the BTC 142 and/or the second request from the BNA 144 may include an address from which to retrieve extra data. The BTM 140 may use the address to retrieve the extra data from the DPP 145.

In another example, one or more of the first request from the BTC 142 and/or the second request from the BNA 144 may not include any information content, but may include an address of the information to be added into the designated blockchain. The BTM 140 may use the address to retrieve the information from the DPP 145.

In another example, the BTM 140 may submit an identifier of the BTC 143, an identifier of the BCA 142, and/or an identifier the BNA 144 to the DPP 145 to retrieve any relevant blockchain policy rules and extra data.

Step 5: The DPP 145 may send a first response to the BTM 140 (16:5). The first response may include the content of blockchain policy rules, the information to be added into the designated blockchain, and/or the extra data to be added together with the information to be added into the designated blockchain. In addition, whenever retrieving a blockchain policy rule, the BTM 140 may store it locally for future use and to avoid future retrieval, or the costs involved with future retrieval, from the DPP 145, which may be indicated and instructed by the DPP 145. The DPP 145 may indicate to the BTM 140 if a returned blockchain policy rule can or should be stored locally or not. Step 6: Based on the first response from the DPP 145 and one or more of the first and/or second requests from the BTC 142 and/or from the BNA 144, the BTM 140 can determine the data to be added into the designated blockchain (referred to as data1) and the data to be stored in the EDS 146 (referred to as data2) (16:6). If there is no requirement to store any data in the EDS 146, then step 8 and step 9 may not be carried out.

Before step 6 (but after step 5), the BTM 140 may contact an auditor (e.g., another BTM, another BTC, another BCA, another BNA, or a third-party such as a 5G core network function) to get a confirmation or any more additional data from the auditor. For example, if the BCA 143 issued the first request and the BCA is managed by another BNA of the same blockchain application, the auditor may be this other BNA. The BTM 140 may send a fourth request to the auditor. The fourth request may include partial or full information as included in the first request from the BTC 142 and/or second request from the BNA 144. The fourth request may include the an identifier of the BTM 140, security credentials related to the BCA/BTC 143/142 or BNA 144 (e.g., a token, a certificate or signature thereof), and/or a type and address of additional data to be retrieved. Based on evaluation of all information as included in the fourth request, the auditor may authorize the request. If the authorization passes, the auditor may send a first confirmation response to the BTM 140. The first confirmation response may include additional data from the auditor (assuming the BTM 140 had requested it). If the authorization fails, the auditor may send a rejection response to the BTM 140. Responsive to the rejection response, the BTM may not perform step 6 and the rest steps. After receiving the first confirmation response from the auditor, the BTM 140 may continue with the procedure 1600.

Step 7: The BTM 140 may select a designated blockchain and the BCN 141 for the designated blockchain (16:7). If the BTM 140 has been provisioned or configured with the designated blockchain and the BCN 141, this step may be skipped or the BTM 140 may again select a designated blockchain and a BCN 141 for the designated blockchain.

In an embodiment, a blockchain policy rule (e.g., as retrieved from the DPP 144 in step 4 and/or step 5) may include the designated blockchain and corresponding BCN 141. As such, this step may be skipped or the BTM 140 may again select any of a designated blockchain and a BCN 141 for the designated blockchain. In addition, if one or more of the first and/or second requests from the BTC 142 and/or from the BNA 144 indicated the designated blockchain and corresponding BCN 141, this step can be skipped as well.

The BTM 140 may perform such BCN selection for the BCA 143 and/or the BNA 144 only once and may maintain information indicating the selected BCNs for the BCA 143 or the BNA 144 locally. The locally-maintained information indicating the selected BCNs for the BCA 143 or the BNA 144 may be used when the BTM 140 receives from the BCA 143 or the BNA 144 a subsequent request to create a transaction. As another alternative, during a system setup and configuration phase, the BTM 140 may have selected and assigned one or more BCNs for the BCA 143 or the BNA 144 based on one or more indications and/or requirements from the BCA 143 or the BNA 144. As such, step 7 need not be carried out and the first and/or second requests from the BCA 143 (step 1) and/or the request from the BNA 144 (step 3') need not include or indicate BCN information.

Step 8: The BTM 140 may send the data2 to the EDS 146 and may instruct the EDS 146 to store the data2 (16:8).

Step 9: The EDS 146 stores the data2. The EDS 146 may send a second response to the BTM 140 (16:9). The second response may include an address from which to retrieve the data2.

Step 10: The BTM 140 may send data1 and a hash of data2 ("hash(data2)") to the BCN 141 asking to store data1 and hash(data2) into the designated blockchain (16:10). The BTM 140 may use any additional hash-related information included in one or more of the first and/or second requests from the BCA 143 and/or from the BNA 144 or from blockchain policy rules to compute hash(data2). If data2 is not presented or required as a result of step 6, the BTM 140 will (might) not compute hash(data2), but may send (e.g., only send) data1 to the BCN 141. If data1 is not presented or required as a result of step 6, the BTM 140 may send (e.g., only send) hash(data2) to the BCN 141.

Step 11: The BCN 141 may send a third response to the BTM 140 (16:11). The third response may be an immediate response to confirm the reception of the data1, the hash (data2) and/or the request from the BTM 140, and/or to indicate the requested blockchain transactions have been created (but not confirmed within the blockchain network yet). This step may be optional.

Step 12: The BTM 140 may send a fourth response to the BTC 142 indicating whether the requested information has been created in blockchain transactions (but not confirmed within the blockchain network yet) and/or stored to the EDS 146 (16:12).

Step 13: The BTC 142 may forward the fourth response to the BCA 143 (16:13).

Step 14: The BCN 141 may perform the designated blockchain protocol to store data1 and/or hash(data2) into the designated blockchain (16:14). For example, the BCN 141 may generate a blockchain transaction including data1 and/or hash(data2). The BCN 141 may send the blockchain transaction to the designated blockchain network.

Step 15: After the blockchain transaction including data1 and/or hash(data2) has been successfully added into the designated blockchain, the BCN 141 may send a notification to the BTM 140. In an embodiment, the transaction may have a transaction number, TranNumX, and it may be included in a block with a sequence number equal to BlockNumY. One or more of the first and/or second requests from the BCA 143 and/or from the BNA 144 may include a recipient (a BCA, a BTC, or a BNA). The recipient may connect to another BTM ("BTM-X") (not shown). The BTM-X may interact with another BCN ("BCN-X") that participates in the same blockchain system as the BCN 141. The BCN-X should (may) receive the transaction as a result of it being propagated through the blockchain system. The BCN-X may send the transaction to the BTM-X. The BTM-X may forward the transaction to the recipient.

Step 16: Optionally, the BTM 140 may send a fifth request to update the EDS 146 with the block sequence number (e.g. BlockNumY), and/or the transaction sequence number (e.g., TranNumX) (16:16). The EDS 146 may associate the block sequence number (e.g. BlockNumY), and/or the transaction sequence number (e.g. TranNumX), with the data2 previously stored at the EDS 146. If data2 was not previously stored at the EDS 146, step 16 should (may) be skipped.

Step 17: The BTM 140 may send a second confirmation response to the BTC 142 (16:17). This response may include the address of data2 stored at EDS 146, the hash(data2), the block sequence number (e.g., BlockNumY), and/or the transaction sequence number (e.g., TranNumX). If the BCA 143 is managed by one or more BNAs other than BNA 144 ("BNA-X") of the same blockchain application, the BTM 140 may send the same second confirmation to the BNA-X.

Step 17': The BTM 140 may send a third confirmation response to the BNA 144 (16:17') if the BTM 140 received the second request from the BNA 144 (step 3') or if the BNA 144 manages the BCA 142. The third confirmation response may include the address of data2 stored at EDS 146, the hash(data2), the block sequence number (e.g., BlockNumY), and/or the transaction sequence number (e.g., TranNumX).

Step 18: The BTC 142 may forward the third confirmation received from the BTM 140 to the BCA 143.

The procedure 1600 may be used to support, but not limited to, the following scenarios:

- Scenario 1: A requestor may send data3 to a BTM and may request the BTM to store data3 into a designated blockchain. The BTM may store data3 to the designated blockchain via a BCN. The requestor may be a BCA, a BTC, or a BNA.
- Scenario 2: A requestor may send data4 and data5 to a BTM. The BTM may store data4 into a designated blockchain via a BCN, while storing data5 to an EDS. The requestor may be a BCA, a BTC, or a BNA.
- Scenario 3: A requestor may send data6 and the address of data7 to a BTM. The BTM may retrieve data7 from a DPP. The BTM may store data6 into a designated blockchain while storing data7 to an EDS. The requestor may be a BCA, a BTC, or a BNA.
- Scenario 4: A requestor may send data8 and the address of data9 to a BTM. The BTM may retrieve data9 from a DPP. The BTM may store data9 into a designated blockchain while storing data8 to an EDS. The requestor may be a BCA, a BTC, or a BNA.
- Scenario 5: A requestor may send data10 and the address of data11 to a BTM. The BTM may retrieve data11 from a DPP. The BTM may store both data10 and data11 into a designated blockchain. The requestor may be a BCA, a BTC, or a BNA.
- Scenario 6: A requestor may send the address of data12 to a BTM. The BTM may retrieve data12 from a DPP. The BTM may store data12 into a designated blockchain. The requestor may be a BCA, a BTC, or a BNA.
- Scenario 7: A requestor may send the address of data13 and the address of data14 to a BTM. The BTM may retrieve data13 and data14 from a DPP. The BTM may store data13 into a designated blockchain while storing data14 to an EDS. The requestor may be a BCA, a BTC, or a BNA.
- Scenario 8: A requestor may send an event notification to a BTM. The BTM may use the event notification to locate a blockchain policy rule (either from locally stored blockchain policy rules or to retrieve from a DPP). The BTM may retrieve any required data and add it into a designated blockchain as described and specified by both the event notification and the blockchain policy rule. The requestor may be a BCA, a BTC, or a BNA.

Representative BTC-Triggered BTM-Controlled Transaction Creation

In various embodiments, a BTC may manage one or more BCAs. The BTC may monitor statuses of the BCAs and may actively decide and request a BTM to create a new transaction for one or more of the BCAs based on one or more of the respective statuses and without any explicit request or indication from the corresponding BCAs. In various embodiments, a BTC may request a BTM to create a transaction to store its current status or a particular event to a blockchain. For example, when a particular BCA or a particular type of BCA registers to the BTC, the BTC may request the BTM to create a transaction to record such BCA registration.

Figure 17:
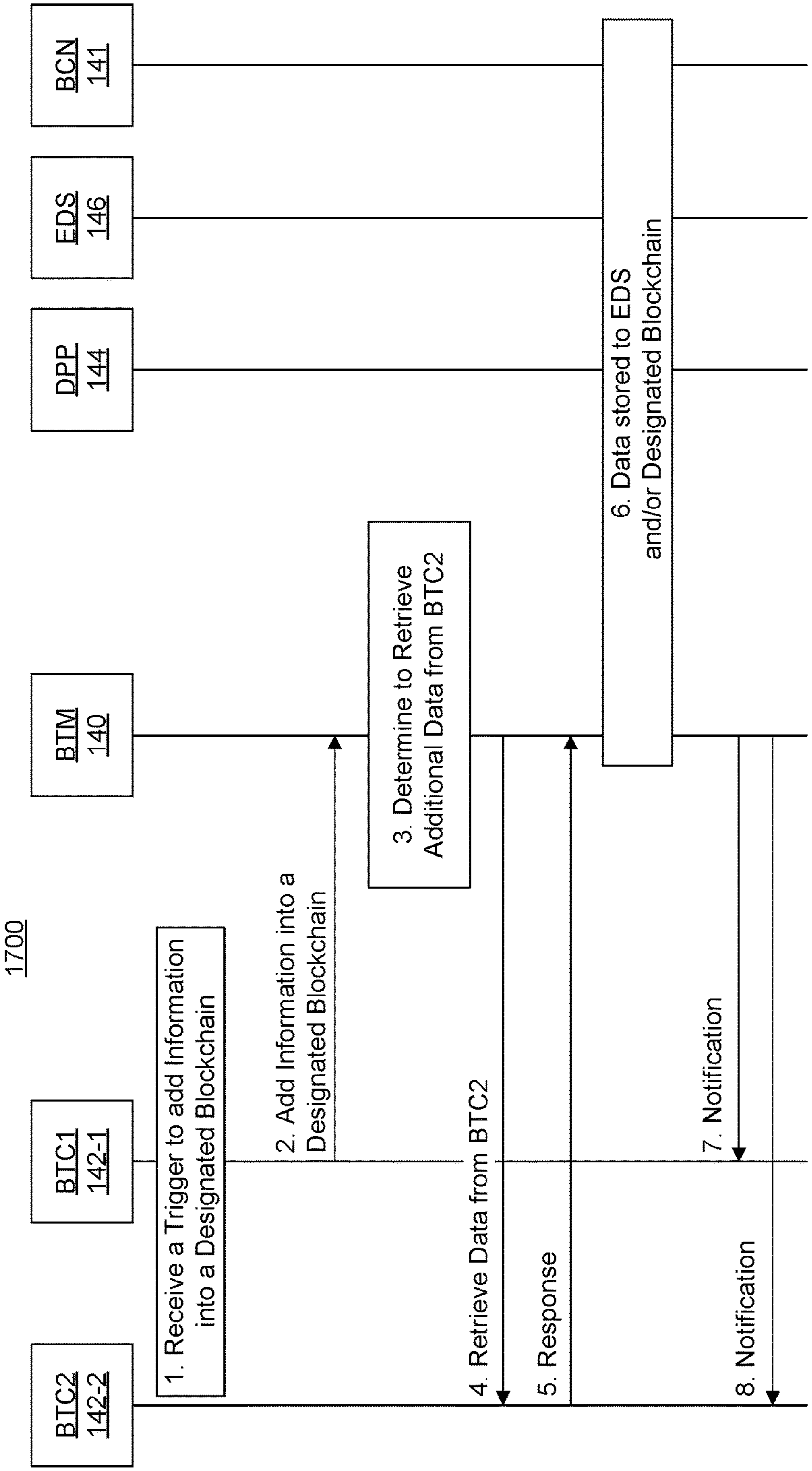
FIG. 17 illustrates an example procedure for transaction manager controlled transaction creation.

FIG. 17 illustrates a procedure 1700 for BTC-triggered BTM-controlled transaction creation. The procedure 1700 is described with reference to the transaction management architecture 1400 (FIG. 14) and the communications system 100 (FIGS. 1 and 5) for convenience and simplicity of exposition. The procedure 1700 may be carried out using different architectures as well. The procedure 1700 may be suitable (used) for scenarios in which a first BTC 142-1 may request to add information into a blockchain via a BTM 140, and in which multiple BTCs, such as a second BTC 142-2 may be involved.

Pre-Conditions: The BTC 142-1 and the BTC 142-2 may be registered to or associated with the BTM 140. The BTM 140 has the address of the BCN 141 and is able to communicate with it. The BCN is a participating node of a designated blockchain system and maintains a designated blockchain (or a distributed ledger). Optionally, there may be a DPP 144 and an EDS 146, which the BTM 146 can access. The BTC 142-1 and the BTC 142-2 may be provisioned and/or configured to access functionalities of the BTM 140. The BTM 140 may be provisioned and/or configured to interact with the designated blockchain system via the BCN 141. The BTM 140 may be provisioned and/or configured to interact with the designated blockchain system on behalf of the BTCs 142-1, 142-2. The BTCs 142-1, 142-2 may reside (be disposed) within a device (e.g., a smartphone, a vehicle, a drone, a sensor) or respective devices. The BTM 140 as a function may reside (be disposed) in a device, a gateway, an element of an edge network, an element of a 5G core network, and/or an element of a data center. The BCN 141 as a function may reside (be disposed) in a device, a gateway, an element of an edge network, an element of a 5G core network, and/or an element of a data center.

Step 1: The BTC 142-1 may receive a trigger to add information into a designated blockchain (17:1). The trigger may be generated by the BTC 142-1 based on its local blockchain policy rules, or if requested by a BCA (not shown) and/or a BNA (not shown).

Step 2: The BTC 142-1 may send a first request to add information into a blockchain to the BTM 140 (17:2) and operations similar to the other operations denoted in step 3 of procedure 1600 (FIG. 16) may be carried out, as well. The first request may include the transaction-creation parameter set (as disclosed above), the additional transaction-creation parameters (as disclosed above) and additional information. The additional information may indicate to the BTM 140 that the BTM 140 may need to contact the BTC 142-2. The additional information may include an identifier of the BTC 142-1 or any other relevant information from which the BTM 140 can use to deduce an address and/or the identifier of the BTC 142-1. The additional information and/or the request message may include a name, an address and/or an identifier of additional data. The BTM 140 may use the additional information to retrieve the additional data from the BTC 142-2. The additional information and/or the request message may include an identifier (BTC group identifier) of a group of BTCs (e.g., the BTC 142-1 and the BTC 142-2). The group of BTCs and the corresponding BTC group identifier may be created at the BTM 140 by the BTM 140, by a member of the group of BTCs (e.g., the BTC 142 and/or the BTC 142-2), and/or by other entities/elements.

Step 3: The BTM 140 may receive the first request from the BTC 142-1. Based on the transaction-creation parameter set, the additional transaction-creation parameters and additional information, the BTM 140 may determine whether to retrieve additional data from the BTC 142-2 (17:3). The BTM 140 may determine that it may need to contact the BTC 142-2 to obtain either a confirmation or the additional data. For example, if the request from the BTC 142-1 includes a BTC group identifier for a BTC group including the BTCs 142-1, 142-2, the BTM 140 may determine to contact the BTC 142-1 and any other member of the BTC group except the BTC 142-1.

Step 4: The BTM 140 may send to the BTC 142-2 a second request to retrieve additional data or to obtain a confirmation from the BTC 142-2 (17:4). The second request may include an identifier of the BTC 142-1; an identifier of the BTC 142-2; an identifier of a group of BTCs including BTC 142-1 and BTC 142-2 and/or the name, the address, and/or the identifier of the additional data to be retrieved. Alternatively, the BTM 140 may retrieve additional data from other places (e.g., one or more BNAs and/or one or more BCAs).

Step 5: The BTC 142-2 may send a first response to the BTM 140 (17:5). The first response may include the additional data or a confirmation.

Step 6: The BTM 140 may carry out operations to cause data to be stored in any of the EDS 146 and the blockchain (17:6). For example, operations similar to the operations of procedure 1600 starting from step 4 (FIG. 16) may be carried out to cause selected data to be stored at the EDS 146 and/or other selected data to be stored in the designated blockchain via the BCN 141.

Step 7: The BTM 140 may send a first notification to the BTC 142-1 (17:7). The BTM 140, for example, may carry out operations similar to the operations denoted by step 17 of process 1600 (FIG. 16).

Step 8: Optionally, the BTM 140 may send a second notification to the BTC 142-2 (17:8).

Representative BNA-Subscribed BTM-Controlled Transaction Creation

Figure 18:
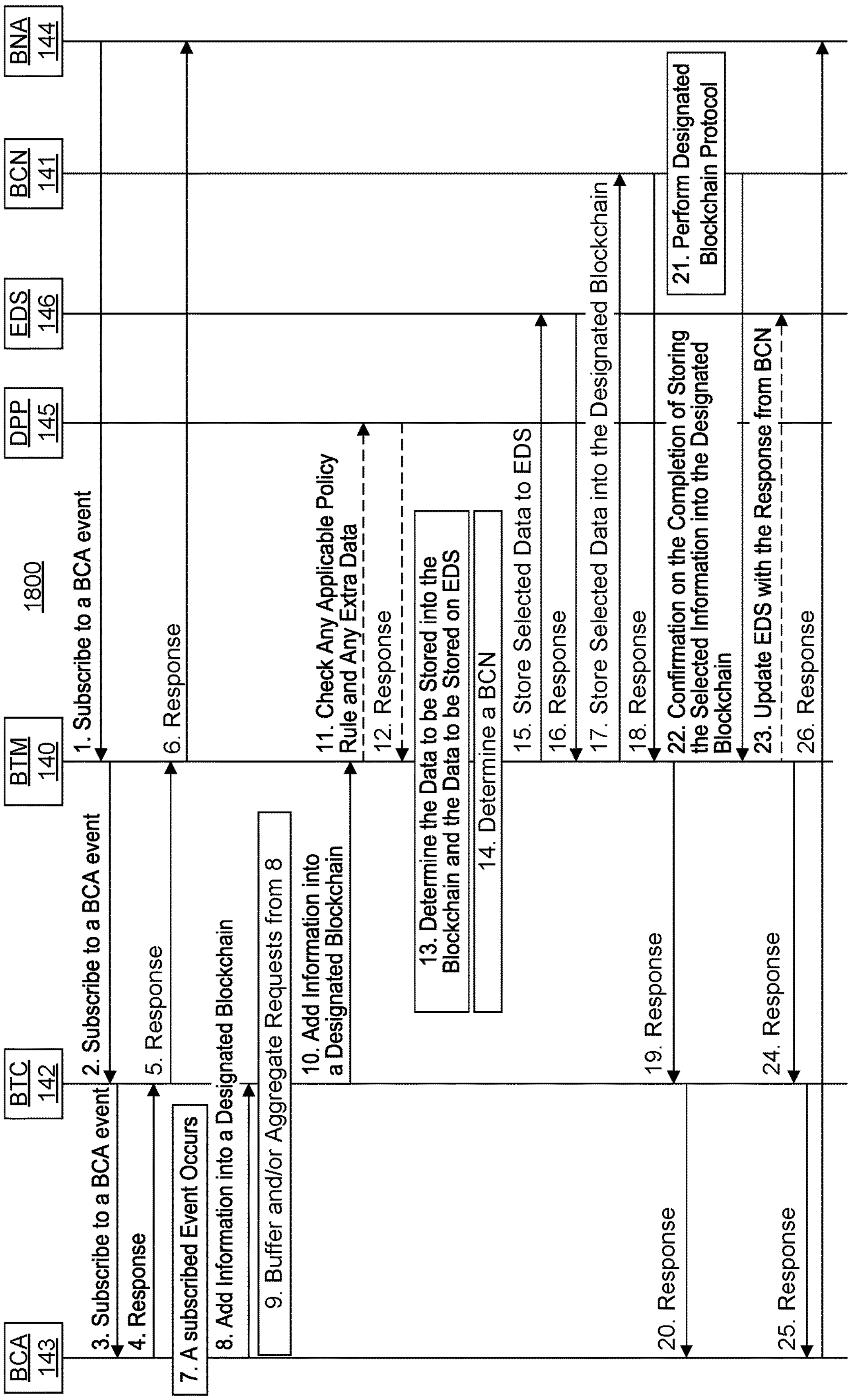
FIG. 18 illustrates an example procedure for transaction manager controlled transaction creation.

FIG. 18 illustrates a procedure 1800 for BNA-subscribed BTM-controlled transaction creation. The procedure 1800 is described with reference to the transaction management architecture 1400 (FIG. 14) and the communications system 100 (FIGS. 1 and 5) for convenience and simplicity of exposition. The procedure 1800 may be carried out using different architectures as well. The procedure 1800 may be suitable (used) for scenarios in which (i) one or more entities (e.g., a BCA 143, a BTC 142 and/or a BTM 140) may expose one or more subscribable events that trigger the BTM 140 to create blockchain transactions, facilitate creation of blockchain transactions and/or facilitate storage of information in an EDS, and (ii) a BNA 144 may subscribe to one or more of the events exposed by the entities.

Pre-Conditions: A BCA 143 may be registered to or associated with a BTC 142. The BTC 142 may be registered to or associated with the BTM 140. The BTM 140 has the address of the BCN 141 and can communicate with it. The BCN 141 is a participating node of a designated blockchain system and maintains a designated blockchain (or a distributed ledger). The BNA 144 may be registered to or associated with the BTM 140. Optionally, there may be a DPP 145 and an EDS 146, which the BTM 140 can access. The BCA 143 may be provisioned and/or configured to use functionalities provided by the BTC 142. The BTC 142 may be provisioned and/or configured to access functionalities of the BTM 140. The BTM 140 may be provisioned and/or configured to interact with the designated blockchain system via the BCN 141. The BTM 140 may be provisioned and/or configured to interact with the designated blockchain system on behalf of the BCA/BTC 143/142. The BCA 143 and the BTC 142 may be co-located, for example, within the same device (e.g., a smartphone, a vehicle, a drone, a sensor) or hosted by two different devices. The BTM 140 as a function may reside (be disposed) in a device, a gateway, an element of an edge network, an element of a 5G core network, and/or an element of a data center. The BCN 141 as a function may reside (be disposed) in a device, a gateway, an element of an edge network, an element of a 5G core network, and/or an element of a data center.

Step 1: The BNA 144 may send to the BTM 140 a subscription request to subscribe to an event exposed by the BCA 143 (18:1). The subscription request may include any of the following parameters: (i) an identifier of the BCA 143; When the event occurs at (is detected by) the BCA 143, the BCA 143 may trigger to initiate a request to add information into the designated blockchain. (ii) a condition or the event to subscribe to; (iii) a designated blockchain; and (iv) an identifier of the BNA 144.

Step 2: The BTM 140 may authenticate the subscription request as to whether the BNA 144 has the right to subscribe to the BCA 143 using identifiers of the BNA 144 and the BCA 143. If the authentication is successful, the BTM 140 may use the identifier of the BCA 143 to find the BTC 142. The BTM 140 may send (e.g., forward) the subscription request to the BTC 142 (18:2).

Step 3: The BTC 142 may send (e.g., forward) the subscription request to the BCA 143 (18:3). The BTC 142 may maintain one or more of the parameters from the subscription request locally.

Step 4: The BCA 143 may process the subscription request. the BCA 143 may send a first response (e.g., an immediate response) to the BTC 142 (18:4).

Step 5: The BTC 143 may send (e.g., forward) the first response to the BTM 140 (18:5).

Step 6: The BTM 140 may send (e.g., forward) the first response to the BNA 144 (18:6).

Step 7: The event occurs at (is detected by) the BCA 143 (18:6). The event may trigger the BCA 143 to send to the BTC 142 a request to add information into a blockchain (18:7) and/or to perform operations similar to the other operations denoted by step 1 of the procedure 1600 (FIG. 16).

Steps 8-25: Operations similar of the operations denoted by steps 2-18 of the procedure 1600 (FIG. 16) may be carried out to add the designated information into the designated blockchain and/or to the EDS 146.

Step 26: The BCA 143 may send a second response to the BNA 144 (18:26). The second response may be sent directly to the BNA 144 or it may be sent to the BTC 142 and thereafter relayed by the BTC 142 and/or the BTM 140 to the BNA 144.

In an embodiment, after the event occurs (step 7), the BCA 143 may send a notification to the BNA 144. The BNA 144 may decide to create a new transaction or not. If the BNA 144 decides to create a new traction, it may send a trigger or signal back to the BCA 143. The BCA 143 may send the request to add information into a blockchain to the BTC 142 and/or to perform operations similar to the other operations denoted by step 1 of the procedure 1600 (FIG. 16) in response to the trigger or the signal from the BNA 144. After step 7, step 8 to step 26 may be performed.

Representative BTC-Controlled Transaction Creation

In BTC-controlled transaction creation, all requests for creating blockchain transactions are sent to a BTC. The BTC, optionally aided by a BTM, may be responsible for authenticating the requests, processing the requests by obtaining any additional information, selecting a BCN of a designated blockchain network, and forwarding the processed request to the BCN. The BCN may create blockchain transactions as requested and may send them to the designated blockchain network. The BTC may interact with the BCN and the designated blockchain network on behalf of other entities, such as a BCA and/or another BTC. Examples of BTC-controlled transaction creation include (i) BCA-triggered BTC-controlled transaction creation; and (ii) BTM-subscribed BTC-controlled transaction creation. The BCA-triggered BTC-controlled transaction creation may be suitable (used) for scenarios in which a BCA may request and/or trigger a BTC to create blockchain transactions, facilitate creation of blockchain transactions and/or facilitate storage of information in an EDS. The BTM-subscribed BTC-controlled transaction creation may be suitable (used) for scenarios in which (i) a BTC may expose one or more subscribable events that trigger the BTC to create blockchain transactions, facilitate creation of blockchain transactions and/or facilitate storage of information in an EDS, and (ii) a BTM subscribes to one or more of the events exposed by the BTC.

Figure 19:
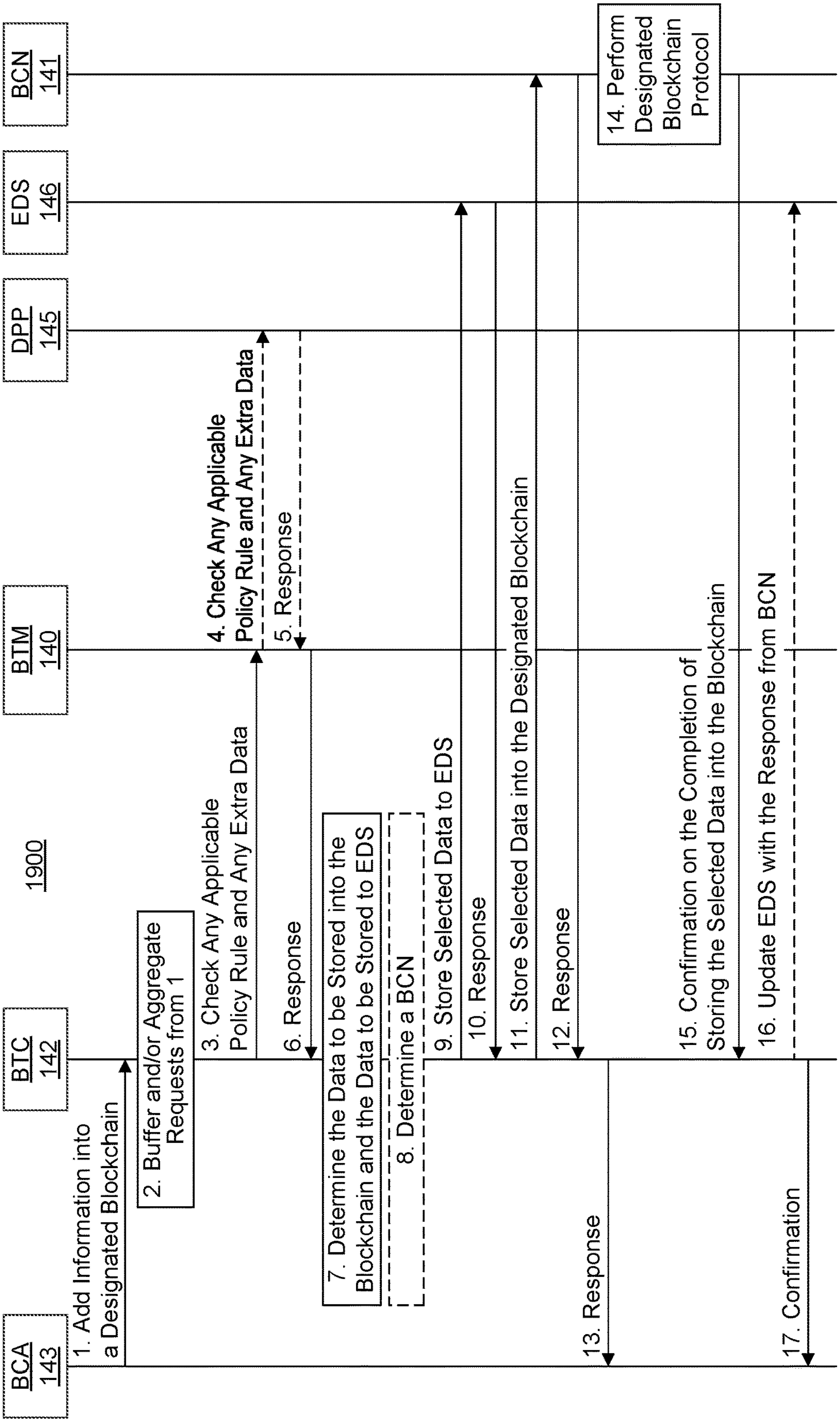
FIG. 19 illustrates an example procedure for transaction client controlled transaction creation.

FIG. 19 illustrates a procedure 1900 for BCA-triggered BTC-controlled transaction creation. The procedure 1900 is described with reference to the transaction management architecture 1500 (FIG. 15) and the communications system 100 (FIGS. 1 and 5) for convenience and simplicity of exposition. The procedure 1900 may be carried out using different architectures as well. The procedure 1900 may be suitable (used) for scenarios in which a BCA 143 may request and/or trigger a BTC 142 to (i) create blockchain transactions, (ii) facilitate creation of blockchain transactions and/or (iii) facilitate storage of information in an EDS 146.

Pre-Conditions: The BCA 143 may be registered to or associated with the BTC 142. The BTC 142 may be registered to or associated with a BTM 140. The BTM 140 has the address of a BCN 141 and can communicate with it. The BCN 141 is a participating node in a designated blockchain system and maintains a designated blockchain (or a distributed ledger). Optionally, there may be a DPP 145 and an EDS 146, which the BTM 140 can access. The BCA 143 may be provisioned and/or configured to use functionalities provided by the BTC 142. The BTC 142 may be provisioned and/or configured to access functionalities of the BTM 140. The BTC 142 may be provisioned and/or configured to interact with the designated blockchain system via the BCN 141. The BTC 142 may be provisioned and/or configured to interact with the designated blockchain system on behalf of the BCA 143. The BCA 143 and the BTC 143 may be co-located, for example, within the same device (e.g., a smartphone, a vehicle, a drone, a sensor) or hosted by two different devices. The BTM 140 as a function may reside (be disposed) in a device, a gateway, an element of an edge network, an element of a 5G core network, and/or an element of a data center. The BCN 141 as a function may reside (be disposed) in a device, a gateway, an element of an edge network, an element of a 5G core network, and/or an element of a data center.

Step 1: The BCA 143 may send to the BTC 142 a first request to add information into a blockchain (19:1) and/or may perform operations similar to the other operations denoted by step 1 of the procedure 1600 (FIG. 16).

Step 2: The BTC 142 may receive the first request the BCA 143. The BTC 142 may authenticate and authorize the first request using the context and/or the security credential information of the BCA 143 (e.g., the public key of the BCA 143), which the BTC 142 may maintain locally. If the first request passes authentication, the BTC 142 may buffer the first request and/or may aggregate the first request with one or more other requests for adding information into the blockchain (19:2). The other requests may be from the same BCA 143 and/or one or more other BCAs. The BTC 142 may receive (i) all of the other requests before or after reception the first request or (ii) some of the other requests before and some after reception the first request. If authentication fails, the BTC 142 may discard the first request and may skip all, but step 13.

Step 3: The BTC 142 may check with the BTM 140 for applicable policy rules and for any extra data (19:3). Alternatively, the BTC 142 may check for policy rules directly with the DPP 145 without going to the BTM 140 (not shown). Step 4 and step 6 may be skipped if the BTC 142 checks with the DPP 145 directly for the policy rules.

Step 4: The BTM 140 may send (forward) to the DPP 145 a second request to check for any applicable blockchain policy rules and any extra data (19:4). In various embodiments, the BTM 140 may have been configured by the DPP 145 with one or more blockchain policy rules and may have passively stored one or more blockchain policy rules. The BTM 140 may use locally available blockchain policy rules before requesting and/or retrieving any from the DPP 146.

Step 5: The DPP 145 may send a first response to the BTM 140 (19:5). The first response may include the content of blockchain policy rules, the information to be added into the designated blockchain, and/or the extra data to be added together with the information to be added into the designated blockchain. Whenever a blockchain policy rule is retrieved, the BTM 140 may store it locally for future use and to avoid future retrieval, or the costs involved with future retrieval, from the DPP 145, which may be indicated and instructed by the DPP 145. The DPP 145 may indicate to the BTM 140 if a blockchain policy rule can or should be stored locally or not. The DPP 145 may send the first response to the BTC 142 directly (without going through the BTM 140) if the DPP 145 received the first request (Step 3) from the BTC 142 directly.

Step 6: The BTM 140 may forward the first response to the BTC 142 (19:5). This response may include the extra data which the BTM 141 received from DPP in Step 5 or the BTM inserts by itself.

Step 7: Based on the first response from the DPP 145 and one or more of the first and/or second requests from the BCA 143 and/or from the BNA 144, the BTC 142 can determine the data to be added into the designated blockchain (referred to as data1) and the data to be stored in the EDS 146 (referred to as data2) (19:7). If there is no requirement to store any data in the EDS 146, then step 9 and step 10 may not be carried out.

Step 8: The BTC 142 may select a designated blockchain and the BCN 141 for the designated blockchain (19:8). If the BTC 142 has been provisioned or configured with the designated blockchain and the BCN 141, this step may be skipped or the BTC 142 may again select a designated blockchain and a BCN 141 for the designated blockchain.

In an embodiment, a blockchain policy rule (e.g., as retrieved from the DPP 144 in step 4 and/or step 5) may include the designated blockchain and corresponding BCN 141. As such, this step may be skipped or the BTC 142 may again select any of a designated blockchain and a BCN 141 for the designated blockchain. In addition, if the first request from the BCA 143 indicated the designated blockchain and corresponding BCN 141, this step can be skipped as well.

The BTC 142 may perform such BCN selection for the BCA 143 only once and may maintain information indicating the selected BCNs for the BCA 143 locally. The locally-maintained information indicating the selected BCNs for the BCA 143 may be used when the BTC 142 receives from the BCA 143 a subsequent request to create a transaction. As another alternative, during a system setup and configuration phase, the BTC 142 may have selected and assigned one or more BCNs for the BCA 143 based on one or more indications and/or requirements from the BCA 143. As such, step 8 need not be carried out and the first request from the BCA 143 (step 1) need not include or indicate BCN information. Alternatively, the BTC 142 may send a request to the BTM 140 to discover an appropriate BCN. The BTM 140 may have provisioned or configured the BTC 142 with one or multiple BCNs (e.g., even before Step 1).

Step 9: The BTC 142 may send the data2 to the EDS 146 and may instruct the EDS 146 to store the data2 (19:9).

Step 10: The EDS 146 store the data2. The EDS 146 may send a second response to the BTC 143 (19:10). The second response may include an address from which to retrieve the data2.

Step 11: The BTC 142 may send data1 and a hash of data2 ("hash(data2)") to the BCN 141 asking to store data1 and hash(data2) into the designated blockchain (19:11). The BTC 142 may use any additional hash-related information included in the first request from the BCA 143 or from blockchain policy rules to compute hash(data2). If data2 is not presented or required as a result of step 7, the BTC 142 will (might) not compute hash(data2), but may send (e.g., only send) data1 to the BCN 141. If data1 is not presented or required as a result of step 7, the BTC 142 may send (e.g., only send) hash(data2) to the BCN 141.

Step 12: The BCN 141 may send a third response to the BTC 142 (19:12). The third response may be an immediate response to confirm the reception of the data1, the hash (data2) and/or the request from the BTC 142, and/or to indicate the requested blockchain transactions have been created (but not confirmed within the blockchain network yet). This step may be optional.

Step 13: The BTC 142 may send a fourth response to the BCA 143 indicating whether the requested information has been created in blockchain transactions (but not confirmed within the blockchain network yet) and/or stored to the EDS 146 (19:13).

Step 14: The BCN 141 may perform the designated blockchain protocol to store data1 and hash(data2) into the designated blockchain (19:14). For example, the BCN 141 may generate a blockchain transaction including data1 and/or hash(data2). The BCN 141 may send the blockchain transaction to the designated blockchain network.

Step 15: After the blockchain transaction including data1 and/or hash(data2) has been successfully added into the designated blockchain, the BCN 141 may send a notification to the BTC 142. In an embodiment, the transaction may have a transaction number, TranNumX, and it may be included in a block with a sequence number equal to BlockNumY. The first request from the BCA 143 may include a recipient (a BCA, a BTC, or a BNA). The recipient may connect to another BTM ("BTM-X") (not shown). The BTM-X may interact with another BCN ("BCN-X") that participates in the same blockchain system as the BCN 141. The BCN-X should (may) receive the transaction as a result of it being propagated through the blockchain system. The BCN-X may send the transaction to the BTM-X. The BTM-X may forward the transaction to the recipient.

Step 16: Optionally, the BTC 142 may send a fifth request to update the EDS 146 with the block sequence number, BlockNumY, and the transaction sequence number, TranNumX (16:16). The EDS 146 may associate the block sequence number, BlockNumY, and the transaction sequence number, TranNumX, with the data2 previously stored at the EDS 146. If data2 was not previously stored at the EDS 146, step 16 should (may) be skipped.

Step 17: The BTC 142 may forward the notification as received from Step 15 as a confirmation to the BCA 143

The procedure shown in FIG. 19 may be used to support, but not limited to, the following scenarios:

- Scenario 1: A requestor may send data3 to a BTC and may request the BTC to store data3 into a designated blockchain. The BTC may store data3 to the designated blockchain via a BCN. The requestor may be a BCA or another BTC.
- Scenario 2: A requestor may send data4 and data5 to a BTC. The BTC may store data4 into a designated blockchain via a BCN, while storing data5 to an EDS. The requestor may be a BCA or another BTC.
- Scenario 3: A requestor may send data6 and the address of data7 to a BTC. The BTC may retrieve data7 from a DPP (may be facilitated by a BTM). The BTC may store data6 into a designated blockchain while storing data7 to an EDS. The requestor may be a BCA or another BTC.
- Scenario 4: A requestor may send data8 and the address of data9 to a BTC. The BTC may retrieve data9 from a DPP (may be facilitated by a BTM). The BTC may store data9 into a designated blockchain while storing data8 to an EDS. The requestor may be a BCA or another BTC.
- Scenario 5: A requestor may send data10 and the address of data11 to a BTC. The BTC may retrieve data11 from a DPP (may be facilitated by a BTM). The BTC may store both data10 and data11 into a designated blockchain. The requestor may be a BCA or another BTC.
- Scenario 6: A requestor may send the address of data12 to a BTC. The BTC may retrieve data12 from a DPP (may be facilitated by a BTM). The BTC may store data12 into a designated blockchain. The requestor may be a BCA or another BTC.

Scenario 7: A requestor may send the address of data13 and the address of data14 to a BTC. The BTC may retrieve data13 and data14 from a DPP (may be facilitated by a BTM). The BTC may store data13 into a designated blockchain while storing data14 to an EDS. The requestor may be a BCA or another BTC.

Scenario 8: A requestor may send an event notification to a BTC. The BTC may use the event notification to locate a blockchain policy rule (either from locally stored blockchain policy rules or to retrieve from a DPP). The BTC may retrieve any required data and may add it into a designated blockchain as described and specified by the blockchain policy rule. The requestor may be a BCA or another BTC.

Figure 20:
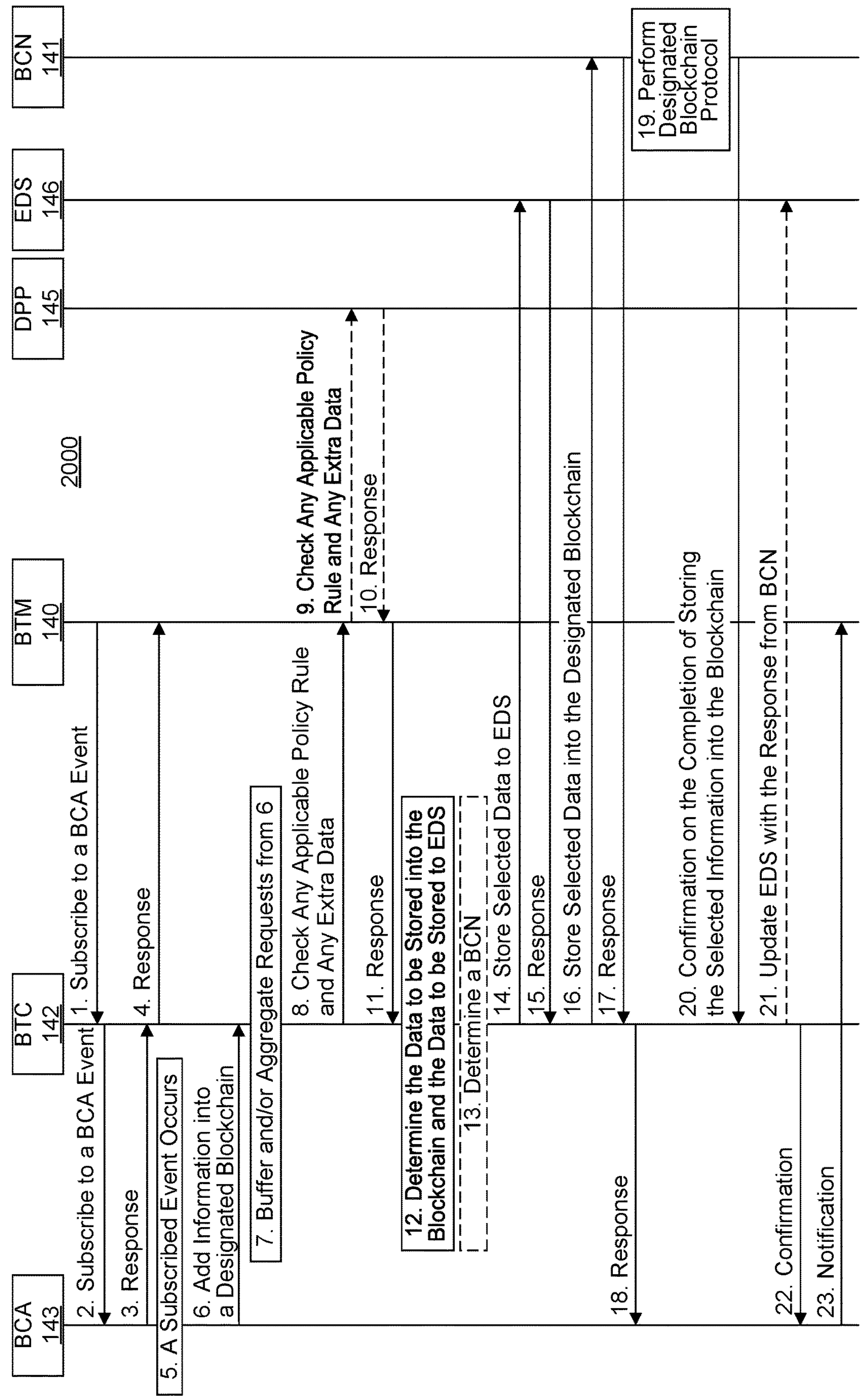
FIG. 20 illustrates an example procedure for transaction client controlled transaction creation.

FIG. 20 illustrates a procedure 2000 for BTM-subscribed BTC-controlled transaction creation. The procedure 2000 is described with reference to the transaction management architecture 1500 (FIG. 15) and the communications system 100 (FIGS. 1 and 5) for convenience and simplicity of exposition. The procedure 2000 may be carried out using different architectures as well. The procedure 2000 may be suitable (used) for scenarios in which (i) a BTC 142 may expose one or more subscribable events that trigger the BTC 142 to create blockchain transactions, facilitate creation of blockchain transactions and/or facilitate storage of information in an EDS, and (ii) a BTM 140 subscribes to one or more of the events exposed by the BTC.

Pre-Conditions: A BCA 143 may be registered to or associated with the BTC 142. The BTC 142 may be registered to or associated with the BTM 140; The BTM has the address of a BCN 141 and can communicate with it. The BCN 141 is a participant of a designated blockchain system and maintains a designated blockchain (or a distributed ledger). Optionally, there may be a DPP 145 and an EDS 146, which the BTM 140 can access. The BCA 143 may be provisioned and/or configured to use functionalities provided by the BTC 142. The BTC 142 may be provisioned and/or configured to access functionalities of the BTM 140. The BTC 142 may be provisioned and/or configured to interact with the designated blockchain system via the BCN 141. The BTC 142 may be provisioned and/or configured to interact with the designated blockchain system on behalf of the BCA 143. The BCA 143 and the BTC 142 may be co-located, for example, within the same device (e.g., a smartphone, a vehicle, a drone, a sensor) or hosted by two different devices. The BTM 140 as a function may reside (be disposed) in a device, a gateway, an element of an edge network, an element of a 5G core network, and/or an element of a data center. The BCN 141 as a function may reside (be disposed) in a device, a gateway, an element of an edge network, an element of a 5G core network, and/or an element of a data center.

Step 1: The BTM 140 may send a subscription request to the BTC 142 to subscribe to an event exposed by the BCA 143 (20:1). The subscription request may include any of the following parameters: (i) an identifier of the BCA 143. When the event occurs at the BCA 143, the BCA 143 may trigger to add information into a designated blockchain; (ii) a condition or the event to subscribes to; (iii) a designated blockchain which the BCA 143 may add information into; and (iv) an identifier of the BTM.

Step 2: The BTC 142 may send (forward) the subscription request to the BCA (20:2). The BTC 142 may maintain one or more parameters from the subscription request locally.

Step 3: The BCA 143 may process the subscription request. The BCA 143 may send a first response (e.g., an immediate response) to the BTC 142 (20:3).

Step 4: The BTC 142 may send (forward) the first response to the BTM 140 (20:4).

Step 5: The event occurs at (is detected by) the BCA 143 (20:5). This event may trigger the BCA 143 to send to the BTC 142 a request to add information into a blockchain (20:5) and/or to perform operations similar to the other operations denoted by step 1 of the procedure 1900 (FIG. 19).

Steps 8-22: Operations similar of the operations denoted by the steps 2-17 of the procedure 1900 (FIG. 19) may be carried out to store designated information into the designated blockchain and/or the EDS.

Step 23: The BCA 143 may send a notification to the BTM 140 via the BTC 142 to inform the BTM 140 that a transaction has been added into a designated blockchain and extra data has been stored to the EDS 146 (20:6). Alternatively, the BTC 142 may send such a notification to the BTM 140.

Representative BTM-Assisted Block Creation

Figure 21:
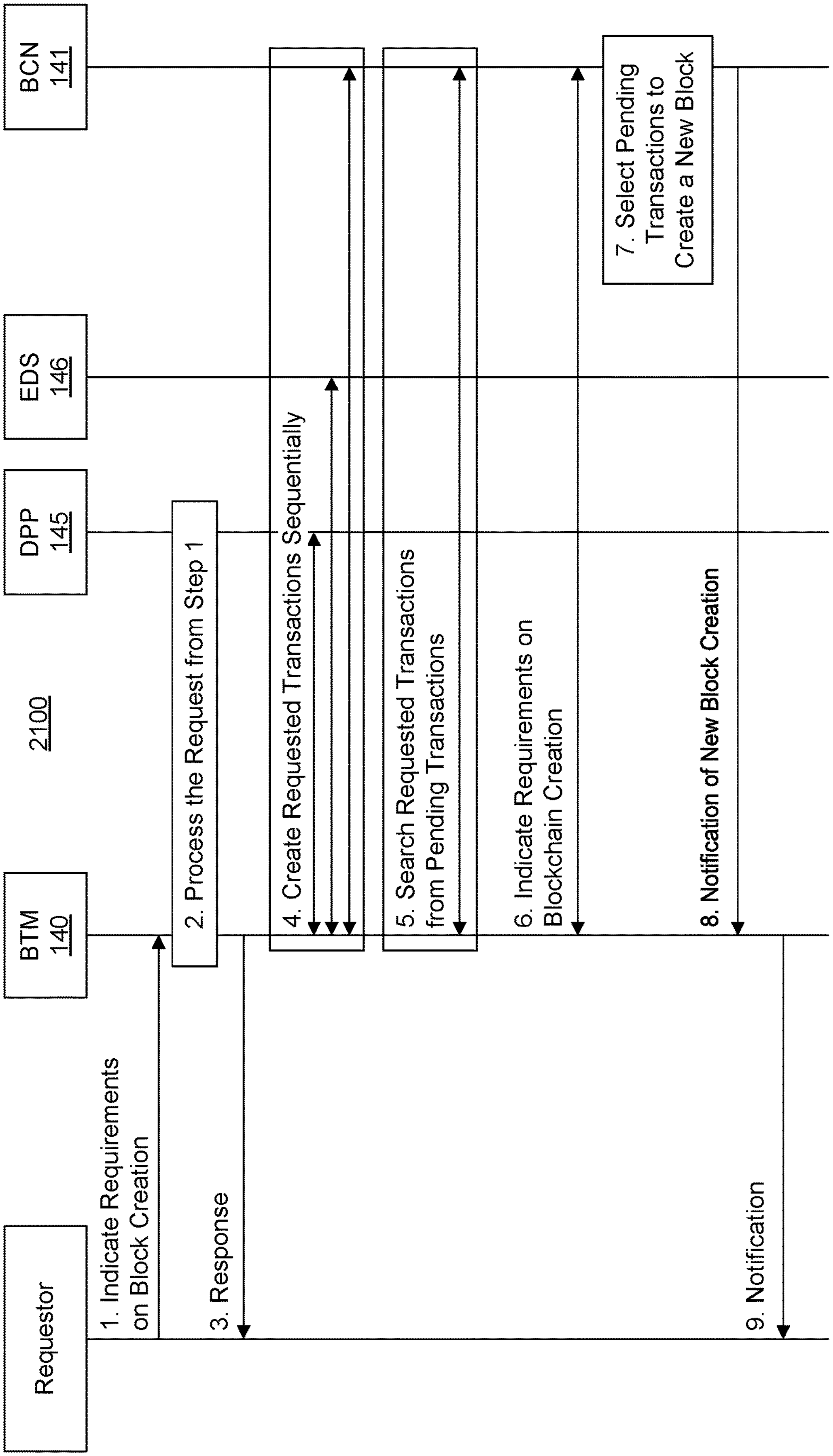
FIG. 21 illustrates an example procedure for transaction manager assisted blockchain creation.

FIG. 21 illustrates a procedure 2100 for BTM-assisted blockchain creation. The procedure 2100 is described with reference to the transaction management architecture 1400 (FIG. 14) and the communications system 100 (FIGS. 1 and 5) for convenience and simplicity of exposition. The procedure 2100 may be carried out using different architectures as well. The procedure 2100 may be suitable (used) for scenarios in which (i) a BTM 140 may send assistance information to a BCN 141, and (ii) the assistance information may be used by the BCN 141 to select appropriate pending transactions each time when creating a new block.

Pre-Condition: A requestor (a BTC, a BNA, or another BTM) may be registered to or associated with the BTM 140. The BTM 140 has the address of a BCN 141 and can communicate with it. The BCN 141 is a participant of a designated blockchain system and maintains a designated blockchain (or a distributed ledger). There may be a DPP 145 and an EDS 146, which the BTM 140 can access. The requestor may be provisioned and/or configured to access functionalities provided by the BTM 140. The BTM 140 may be provisioned and/or configured to interact with the designated blockchain system via the BCN 141. The BTM 140 may be provisioned and/or configured to interact with the designated blockchain system on behalf of the requestor. The BTC 140 may be located in a device (e.g., a smartphone, a vehicle, a sensor). The BTM 140 as a function may reside (be disposed) in a device, a gateway, an element of an edge network, an element of a 5G core network, and/or an element of a data center. The BCN 141 as a function may reside (be disposed) in a device, a gateway, an element of an edge network, an element of a 3GPP core network, and/or an element of a data center.

Step 1: The requestor may send to the BTM 140 a first request to indicate one or more requirements on block creation (21:1). The requestor may be the BNA 144, the BTC 142, and/or another BTM (not shown). Such block creation requirements may cover various scenarios, for example: (i) transactions to be included in a new block should (may) be from a specific set of BCAs, BTCs, and/or BNAs; (ii) transactions to be included in a new block should (may) belong to a specific set of transaction categories; (iii) transactions to be included in a new block should (may) have an average waiting time small than a value.

Step 2: The BTM 140 may receive one or more first block creation requirements from the requestor (21:2). The BTM 140 may check with the DPP 144 to verify if the first requirements from the requestor are allowed. During this step, the DPP 144 may provide one or more new ("second") block creation requirements to the BTM 140, which may overwrite or complement the first requirements.

Step 3: The BTM 140 may send a first response to the requestor confirming that the first block creation requirements have been received (21:3). If the BTM 140 retrieves the second block creation requirements from the DPP 145, the BTM 140 may include them in the first response to the requestor.

Step 4: According to block creation requirements, the BTM 140 may send to the BCN 141 a second request to create a set of transactions in a specific order (21:4). To facilitate this, the BTM 140 may contact DPP 145 to retrieve one or more policies and/or additional data and contact the EDS 146 to store extra data. In this process, the BTM 140 may piggyback and send one or more block creation requirements to the BCN 141. This step may be optional. For this step, all parameters introduced in BTM-controlled transaction creation procedures (e.g., a transaction-creation parameter set (step 3 of procedure 1600 of FIG. 16) and additional transaction-creation parameters (step 3' of procedure 1600 of FIG. 16)) can be applied.

Step 5: Optionally, the BTM 140 may search existing but pending transactions from the BCN 141 (or a different BCN) by providing (e.g., contents of) a transaction filter to the BCN 141. As a result, the BCN 141 may look up all pending transactions against the transaction filter and may provide the BTM 140 with a list of identifiers or sequence numbers of pending transactions that match the transaction filter (21:5). The BTM 140 may maintain the list locally.

Step 6: The BTM 140 may send block creation requirements to the BCN 141 (21:6). The BCN 141 may send a second response to the BTM (21:6). Block creation requirements may include the following scenarios and/or a combination of them: (i) a subset of the list of pending transactions as received from the BCN 141 (step 5), which may trigger the BCN 141 to create a new block to include all pending transactions as included in this subset; and (ii) the first and/or second block creation requirements.

Step 7: Based on the block creation requirements (step 6), the BCN 141 may select corresponding pending transactions, create a new block, and send the new block to the designated blockchain network (21:7).

Step 8: The BCN 141 may send to the BTM 140 a third response indicating the sequence number of the newly created block and the list of transactions included within the newly created block (21:8).

Step 9: The BTM 140 may forward the response to the requestor (21:9).

Not shown in FIG. 21 after Step 8 and when the new block has been fully confirmed in the designed blockchain system, the BCN 141 may send a notification to the BTM 140, which may forward the notification to the requestor.

Representative Transaction Creation to Multiple Designated Blockchains

Figure 22:
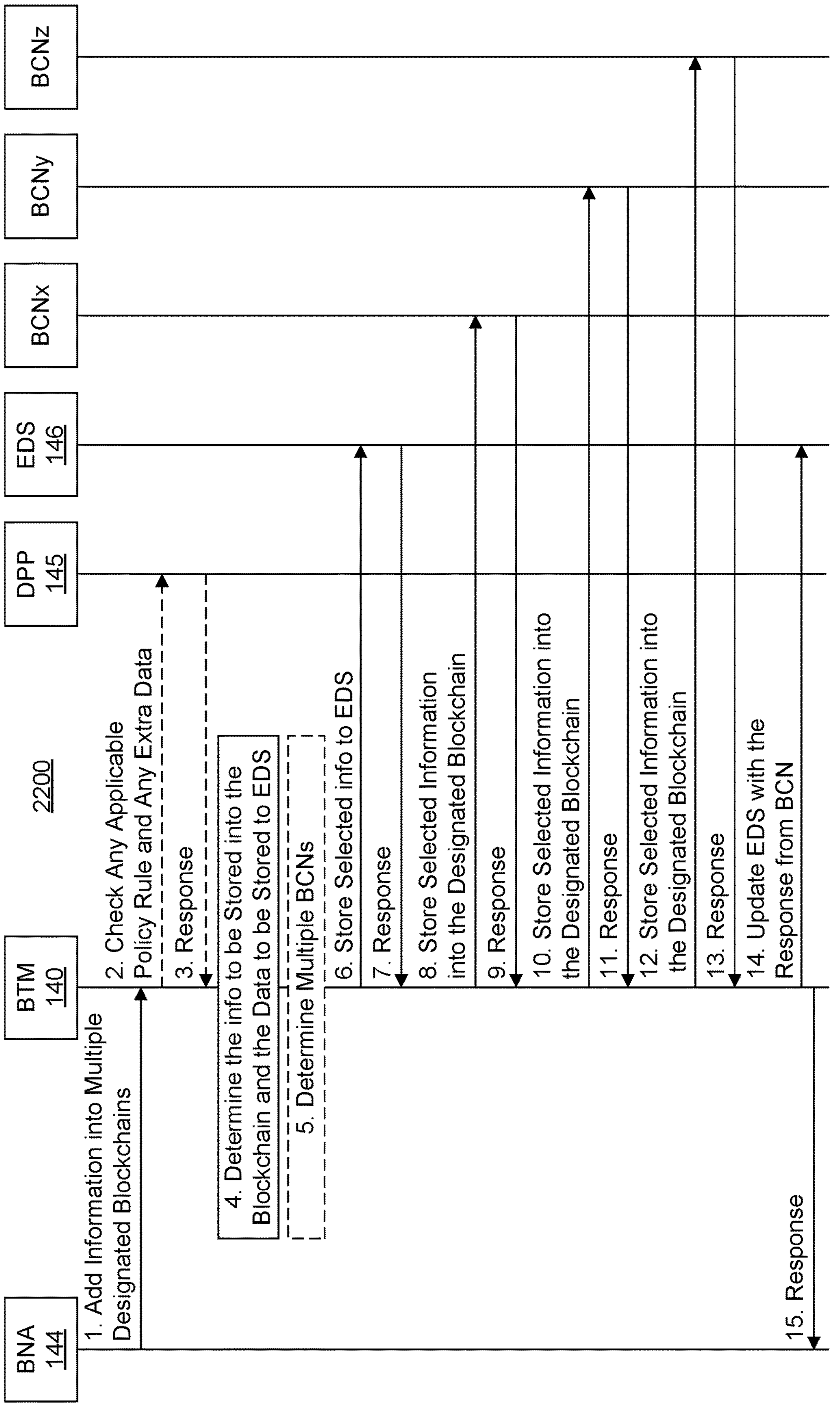
FIG. 22 illustrates an example procedure for transaction manager controlled transaction creation for multiple blockchains.

FIG. 22 illustrates a procedure 2200 for BTM-controlled transaction creation. The procedure 2200 is described with reference to the transaction management architecture 1400 (FIG. 14) and the communications system 100 (FIGS. 1 and 5) for convenience and simplicity of exposition. The procedure 2200 may be carried out using different architectures as well. The procedure 2200 may be suitable (used) for scenarios in which a BNA 144 (or a BCA/BTC 143/142 or a BTM 140) may send (issue) a request to store information into multiple designated blockchains. Each designated blockchain may have a different BCN (e.g., BCNx for Blockchain-X, BCNy for Blockchain-Y, and BCNz for Blockchain-Z).

The procedure 2200 may be suitable (used) in scenarios in which one BCN maintains and participates multiple designated blockchains (or distributed ledgers). For example, BCNx and BCNy may be the same BCN, and otherwise separate requests of step 8 and step 10 may be combined as a single request. The rationale for using multiple blockchains instead of one single blockchain may be to increase security furthermore. The procedure 2200 of FIG. 22 may cover, but is not limited to, the following two scenarios:

Scenario 1: The BNA 144 may request to add information to Blockchain-X and other information to Blockchain-Y. In this scenario, step 12 and step 13 for interactions with BCNz may be skipped. Note that the scenario may be extended to more than two designated blockchains.

Scenario 2: The BNA 144 may request to add information to Blockchain-X and other information to Blockchain-Y, (extendable to more than two designated blockchains). Either the BNA 144 or the BTM 140 may decide to use another designated blockchain (e.g., Blockchain-Z and BCNz) to maintain (memorialize) the fact that information from the BNA 144 has been added into Blockchain-X and Blockchain-Y. For this scenario, step 12 and step 13 for interactions with BCNz are required.

Scenario 3: The BNA 144 may request to add information to multiple blockchain systems. The BTM 140 may select Blockchain-X and Blockchain-Y (or more) to store the information from the BNA 144. In this case, the BNA 144 does not need to indicate designated blockchain systems but relies on the BTM 140 to make the decision.

Pre-Condition: The BNA 144 (or the BCA/BTC 143/142 or another BTM) may be registered to or associated with a BTM 140. The BTM 140 has the information (e.g., BCN address) about multiple designated blockchains and corresponding BCNs 141 and can communicate with the corresponding BCNs 141. There may be a DPP 145 and an EDS 146, which the BTM 140 can access. The BNA may be provisioned and/or configured to access functionalities provided by the BTM 140. The BTM 140 may be provisioned and/or configured to interact with multiple designated blockchains via the BCNs 141. The BTM 140 as a function may reside (be disposed) in a device, a gateway, an element of an edge network, an element of a 3GPP core network, and/or an element of a data center.

Step 1: The BNA 144 may send to the BTM 140 a first request to add information and data into the designated blockchain (22:1) and operations similar to the operations of step 3' of procedure 1600 (FIG. 16) may be carried out (where the first request corresponds to the second request in the operations of step 3' of procedure 1600). The first request in may include two groups of transaction-creation parameters ("transaction-creation parameter group"). Each group may include (i) the transaction-creation parameter set, (ii) the additional transaction-creation parameters, and (iii) the other transaction-creation parameters.

Both transaction-creation parameter groups are used for creating transactions, respectively, into Blockchain-X and Blockchain-Y. The BNA 141 may indicate if it needs the BTM 140 to create a new transaction to Blockchain-Z to maintain the fact that information from the BNA 144 has been added into Blockchain-X and Blockchain-Y (i.e., Scenario 2). Alternatively, the BNA 144 does not need to explicitly indicate Blockchain-X or Blockchain-Y but other parameters such as the raw data to be stored into blockchains. The BTM 140 may have determined the multiple blockchain systems and corresponding BCNs for the BNA 144 before step 1 (e.g., during system initialization, system setup, system provisioning and configuration, and/or BNA 144 registration to the BTM 140). As such, the BTM 140 may need only to receive other necessary information such as the raw data from the BNA 141 and decide which of the data should (may) be stored to in which of the multiple blockchain systems for the BNA 141.

Step 2: The BTM 140 may receive the first request. The BTM 140 may send to the DPP 145 a second request to check for any applicable blockchain policy rules and any extra data (22:2). In various embodiments, the BTM 140 may have been configured by the DPP 145 with one or more blockchain policy rules and may have passively stored one or more blockchain policy rules. The BTM 140 may use locally available blockchain policy rules before requesting and/or retrieving any from the DPP 145.

For example, an identifier of a blockchain policy rule may be included in the first request. The BTM 140 may submit this identifier to the DPP 145 to retrieve the content of the corresponding blockchain policy rule. The blockchain policy rule may specify: 1) a type, an address, and/or an identifier of the designated blockchain to be applied to one or more (each) of the requests from the BNA 144, the BTC 142, and/or the BCA 143; 2) whether is there any extra data to be jointly added together with any designated information into the designated blockchain; 3) where to retrieve such extra data if not provided by the DPP 145.

In another example, the first request may include an address from which to retrieve extra data. The BTM 140 may use the address to retrieve the extra data from the DPP 145.

In another example, the first request may not include any information content, but may include an address of the information to be added into the designated blockchain. The BTM 140 may use the address to retrieve the information from the DPP 145.

In another example, the BTM 140 may submit an identifier of the BNA 144 to the DPP 145 to retrieve any relevant blockchain policy rules and extra data.

Step 3: The DPP 145 may send a first response to the BTM 140 (22:3). The first response may include the content of blockchain policy rules, the information to be added into the designated blockchain, and/or the extra data to be added together with the information to be added into the designated blockchain. In addition, whenever retrieving a blockchain policy rule, the BTM 140 may store it locally for future use and to avoid future retrieval, or the costs involved with future retrieval, from the DPP 145, which may be indicated and instructed by the DPP 145. The DPP 145 may indicate to the BTM 140 if a returned blockchain policy rule can or should be stored locally or not.

Step 4: Based on the first response from the DPP 145 and the first request from the BNA 144, the BTM 140 can determine the data to be added into the designated blockchain (referred to as data-X1 for Blockchain X and data-Y1 for Blockchain Y) and the data to be stored in the EDS 146 (referred to as data-E) (22:4). If there is no requirement to store any data in the EDS 146, then step 6 and step 7 may not be carried out.

Step 5: The BTM 140 may select the designated blockchains, Blockchain-X and Blockchain-Y, and corresponding BCNs, BCNx and BCNy, (22:5). If the BTM 140 has been provisioned or configured with the designated blockchains and the BCNs, this step may be skipped or the BTM 140 may again select a designated blockchains and BCNs for the designated blockchain.

In an embodiment, a blockchain policy rule (e.g., as retrieved from the DPP 144 in step 4) may include the designated blockchains and corresponding BCNs. As such, this step may be skipped or the BTM 140 may again select any of a designated blockchains and the BCNs. In addition, if the first from the BNA 144 indicated the designated blockchains and corresponding BCNs, this step can be skipped as well.

The BTM 140 may perform such BCN selection for the BNA 144 only once and may maintain information indicating the selected BCNs locally. The locally-maintained information indicating the selected BCNs for the BNA 144 may be used when the BTM 140 receives from the BNA 144 a subsequent request to create a transaction. As another alternative, during a system setup and configuration phase, the BTM 140 may have selected and assigned one or more BCNs for the BNA 144 based on one or more indications and/or requirements from the BNA 144. As such, step 5 need not be carried out and the first request from the BNA 144 need not include or indicate BCN information.

Step 6: The BTM 140 may send the data-E to the EDS 146, and may instruct the EDS 146 to store the data-E (22:6).

Step 7: The EDS 146 store the data-E. The EDS 146 may send a second response to the BTM 143 (22:7). The second response may include an address from which to retrieve the data-E.

Step 8: The BTM may send data-X1 (or its hash) to the BCNx and ask it to store data-X1 (or its hash) into Blockchain-X (22:8).

Figure 23:
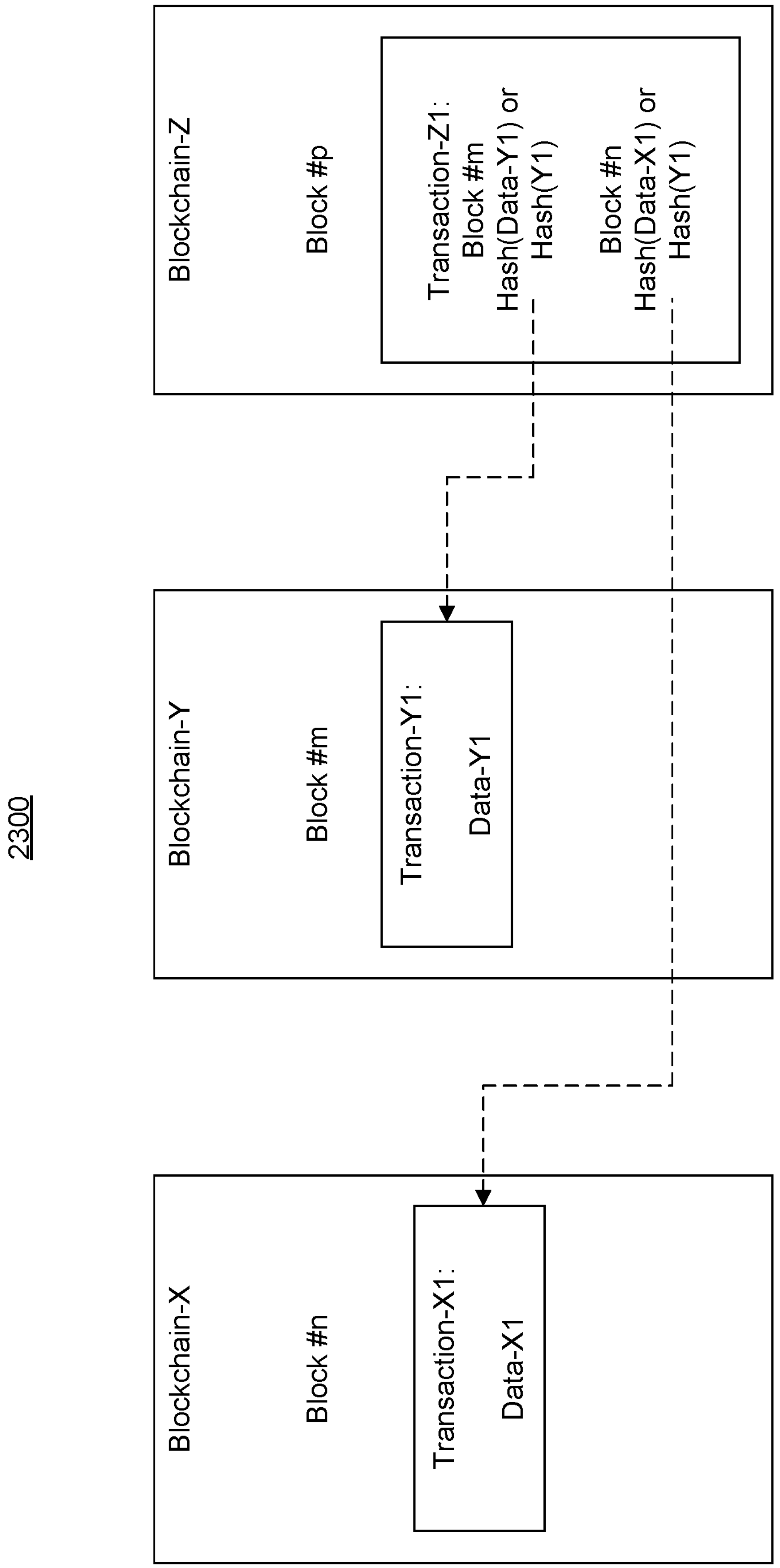
FIG. 23 illustrates an example of transaction creation to multiple blockchains.

Step 9: The BCNx may generate a transaction, transaction-X1, to include data-X1 and may send the transaction-X1 to the blockchain network X (22:9). Eventually, the transaction-X1 may be included in a new block #n (FIG. 23 illustrates an example). The BCNx may send a third response to the BTM 140.

Step 10: The BTM 140 may send data-Y1 (or its hash) to the BCNy and ask it to store data-Y1 (or its hash) into Blockchain-Y (22:10).

Step 11: The BCNy may generate a transaction, transaction-Y1, to include data-Y1 and may send the transaction, transaction-Y1 to the blockchain network Y. Eventually, the transaction-Y1 may be included in a new block #m (FIG. 23 illustrates an example). The BCNy may send a fourth response to the BTM 140 (22:11).

Step 12: As requested by the BNA 144 in step 1 or decided by the BTM 140 based on relevant blockchain policies, the BTM 140 may send a third request to the BCNz to store the record of the transaction-X1 and the transaction-Y1 into Blockchain Z (22:12). The third request may include the following parameters: (i) an address of BCNx; (ii) a sequence number of block #n; (iii) an identifier and/or a sequence number of the transaction X1; (iv) a hash of the transaction X1); (v) a hash of data-X1; (vi) an address of BCNy; (vii) a sequence number of block #m; (viii) an identifier and/or a sequence number of the transaction Y1; (ix) a hash of the Transaction Y1; and/or (x) a hash of data-Y1.

Step 13: The BCNz may generate a transaction, transaction-Z1, and may send the transaction-Z1 to the blockchain network Z. The transaction-Z1 may include all or a partial list of parameters included in the third request (step 12). Eventually, the transaction-Z1 may be included in a new block #p (FIG. 23 illustrates an example). The BCNz may send a fifth response to the BTM 140 (22:13).

Step 14: Optionally, the BTM 140 may send a fourth request to update the EDS 146 with the information about where data-X1 and data-Y1 have been stored (22:14). The fourth request may include the information about the block #p and the transaction-Z1 in Blockchain Z as illustrated in FIG. 23.

Step 15: The BTM 140 may send to the BNA 144 a sixth response indicating that the transactions, as requested in step 1, have been successfully created and stored into designated blockchains or not (22:15). The information shown in FIG. 23 may be included in the sixth response.

Representative Query Transactions from Blockchain Networks

Figure 24:
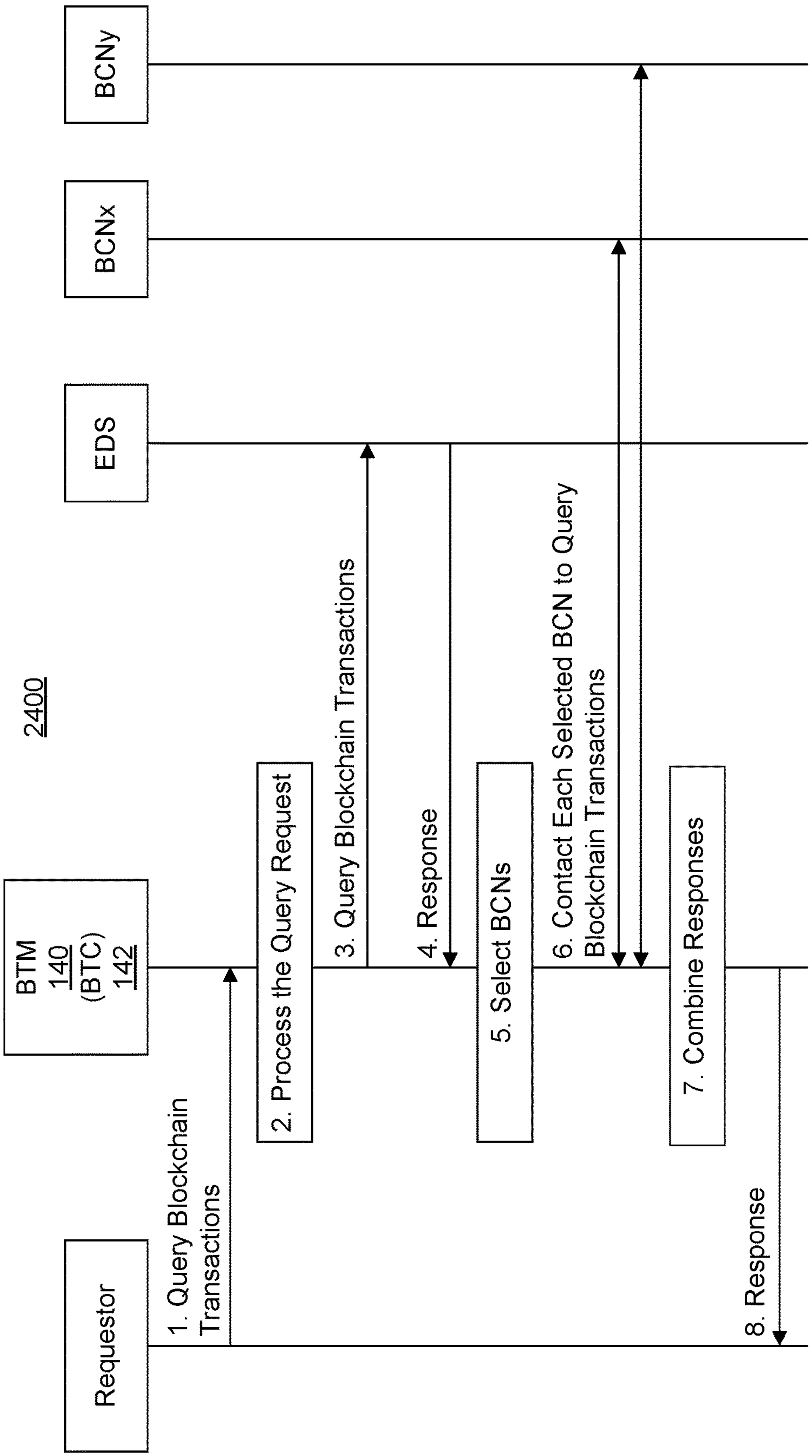
FIG. 24 illustrates an example procedure for querying existing transactions from one or multiple designated blockchains.

FIG. 24 illustrates a procedure 2400 for querying existing transactions (and/or blocks) from one or multiple designated blockchains. The procedure 2400 is described with reference to the transaction management architectures 1400, 1500 (FIGS. 14 and 15) and the communications system 100 (FIGS. 1 and 5) for convenience and simplicity of exposition. The procedure 2400 may be carried out using different architectures as well. The procedure 2400 may be suitable (used) for at least the following scenarios:

- Transaction-Query Scenario 1: When the requestor is the combination of a BCA 143 and a BTC 142, the BCA 143 may send a transaction query to the BTC 142. The BTC 142 may forward the transaction query to a BTM 140. This interaction between the BCA 143 and the BTC 142 is not shown in FIG. 24.
- Transaction-Query Scenario 2: The requestor may be a BCA 143. The BCA 143 may send a transaction query to a BTC 142. The BTC 142, if it previously created transactions directly via multiple BCNs, may contact the BCNs directly, without going through a BTM 140.
- Transaction-Query Scenario 3: The requestor may be a BNA 144, a BTC 142, and/or a BTM 140. The requestor may send a transaction query to another BTM. The other BTM may contact multiple BCNs to query for transactions.

Pre-Conditions: A requestor (a BTC, a BNA, and/or another BTM) may be registered to or associated with a BTM 140 (or the requestor (a BCA) may be registered to or associated with a BTC 142). The BTM 140 (or the BTC 142) has the addresses of multiple BCNs (e.g., BCNx, BCNy, etc.) and may be provisioned and/or configured communicate with them. There may be an EDS 146, which the BTM 140 (or the BTC 142) can access. The requestor may be provisioned and/or configured to access functionalities provided by the BTM 140 (or the BTC 142). The BTM 140 (or the BTC 142) may be provisioned and/or configured interact with designated blockchain systems via the BCNs. The BTM 140 (or the BTC 142) may be provisioned and/or configured interact with designated blockchain systems on behalf of the requestor. The requestor may be located in a device (e.g., a smartphone, a vehicle, a sensor). The BTM 140 (or the BTC 142) as a function may reside (be disposed) in a device, a gateway, an element of an edge network, an element of a 3GPP core network, and/or an element of a data center. Each of the BCNs as a function may reside (be disposed) in a device, a gateway, an element of an edge network, an element of a 3GPP core network, and/or an element of a data center.

Step 1: The requestor may send a first request to the BTM 140 (or the BTC 142) to query existing blockchain transactions (24:1). The first request may include the following parameters: (i) a transaction filter (which may provide criteria for finding any matching transactions); (ii) an identifier and/or an address of a BCN; (iii) a category of matching transactions; (iv) a time interval within which matching transactions were created; (v) an identifier of each of one or more BTMs that have requested a BCN to create matching transactions; (vi) an identifier of each of one or more BTCs that have requested a BCN to create matching transactions; (vii) an identifier of each of one or more BCAs that have requested a BTM (or a BTC) to create matching transactions; (viii) an identifier of each of one or more BNAs that have requested a BCN to create matching transactions; (ix) a transaction creation priority; and/or (x) a transaction inclusion priority.

Step 2: The BTM 140 (or the BTC 142) may process the transaction query request (24:2). The BTM 140 (or the BTC 142) may authenticate and may authorize the transaction query request. The BTM 140 (or the BTC 142) may analyze the transaction filter as included in the request. By performing this analysis, the BTM 140 may decide whether to contact (e.g., first contact) an EDS 146. The EDS 146 may maintain an association between locally stored data and corresponding transactions stored in a designated blockchain. The association may be as simple as a pair of an address of stored data and an identifier of the corresponding transaction. If the transaction filter is not related to the content of transactions but to find the total number of transactions being created for a particular entity (e.g., a BNA or a BCA) within a time interval, the BTM 140 (or the BTC 142) may query such information directly from the EDS 146 without contacting any BCN. During this step, the BTM 140 may transform the transaction query to a new transaction query, which can be easily understood by the EDS 146 or BCNs. The new transaction query may include a transaction filter.

Step 3: If the EDS 146 is able to answer the transaction query as determined in step 2, the BTM 140 (or the BTC 142) may send the new transaction query to the EDS 146 (24:3).

Step 4: The EDS may receive the new transaction query, look up the associations between locally stored data and corresponding transactions stored in blockchains, and deduce one or more answers for the new transaction query. The EDS 146 may include the answer in a first response and may send the first response to the BTM 140 (or the BTC 142). If the EDS 146 finds one or more answers, step 5 and step 6 may be skipped.

Step 5: The BTM 140 (or the BTC 142) may select a list of BCNs that match the transaction filter and/or other criteria (e.g., if a BCN is currently available to support transaction query, etc.) (24:5). As an example, two BCNs (BCNx and BCNy) may be selected that may participate in two different blockchain networks or the same blockchain network.

Step 6: The BTM 140 (or the BTC 142) may send the new transaction query as produced in Step 2 to each selected BCN (24:6). Each of the selected BCNs may performs transaction lookup over its blockchain to match the transaction filter. Each BCN may send query results (i.e., answers which match the transaction filter) in a response to the BTM 140 (or the BTC 142) (24:6). The BTM 140 (or the BTC 142) may receive the response from each contacted BCN (24:6).

Step 7: The BTM 140 (or the BTC 142) may combine all received responses to generate a final query result (24:7).

Step 8: The BTM 140 (or the BTC 142) may send the final query result to the requestor (24:8).

Representative Transaction Subscription on Blockchain Networks

Figure 25:
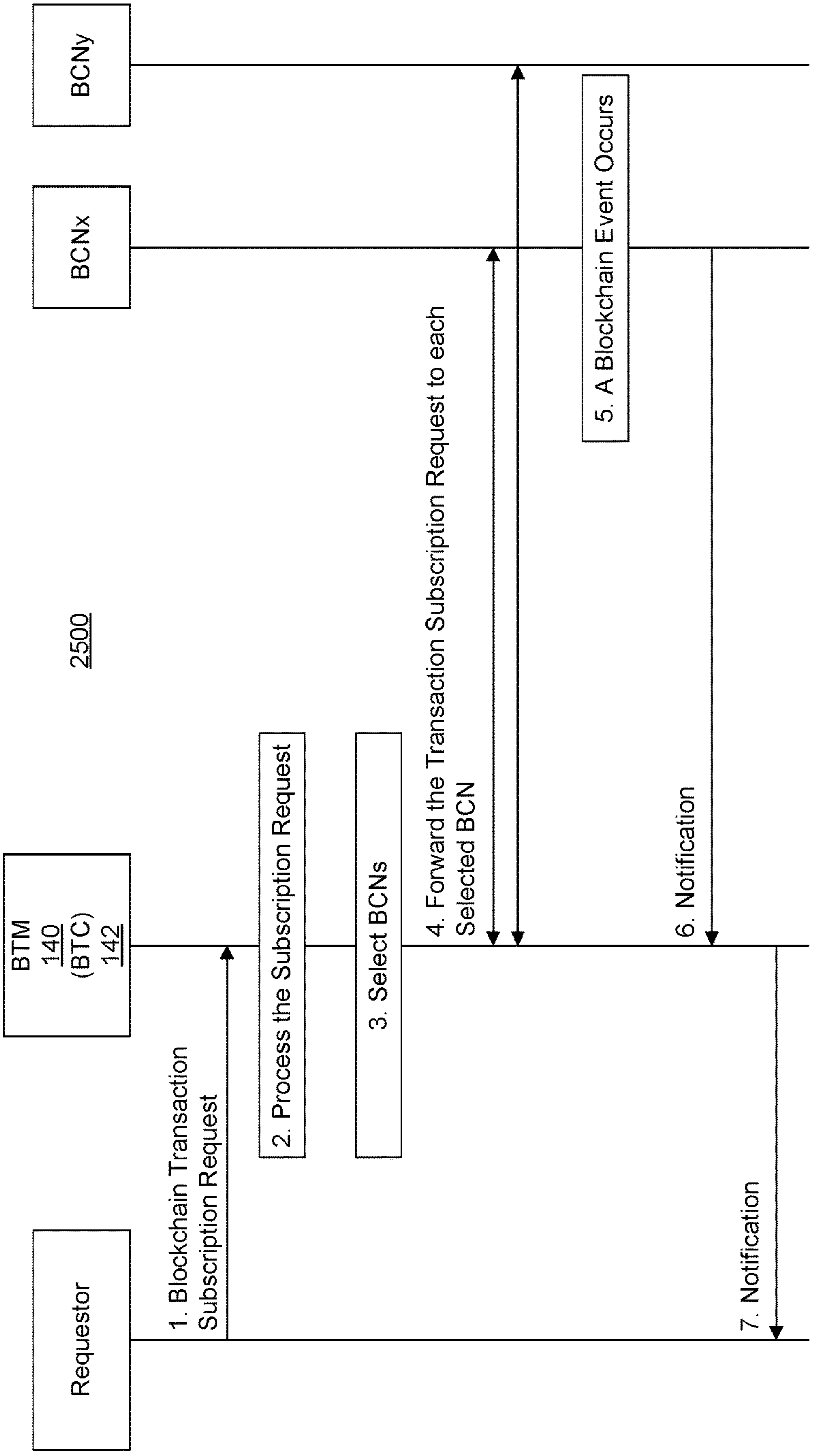
FIG. 25 illustrates a procedure for subscribing events on blockchain networks.

FIG. 25 illustrates a procedure 2500 for subscribing events on blockchain networks. The events may be the creation of a new transaction, the creation of a new transaction for a specific entity, the creation of a new transaction for a specific entity when it moves a specific location, the creation of a new block, etc. The procedure 2500 is described with reference to the transaction management architectures 1400, 1500 (FIGS. 14 and 15) and the communications system 100 (FIGS. 1 and 5) for convenience and simplicity of exposition. The procedure 2500 may be carried out using different architectures as well. The procedure 2500 may be suitable (used) for at least the following scenarios:

- Transaction-Subscription Scenario 1: The requestor may be a combination of a BCA 143 and a BTC 142. The BCA 143 may send a transaction subscription request to the BTC 142. The BTC 142 may send the transaction subscription request to a BTM 140. This interaction between the BCA 143 and the BTC 142 is not shown in FIG. 25.
- Transaction-Subscription Scenario 2: The requestor may be a BCA 143 and it may send a transaction subscription request to a BTC 142. The BTC 142, if it previously created transactions directly via one or more BCNs, may contact the BCNs directly, without going through a BTM 140.
- Transaction-Subscription Scenario 3: The requestor may be a BNA 144, a BTC 142, or a BTM other than the BTM 140. The requestor may send a transaction subscription request to the BTM 140. The BTM 140 may send the transaction subscription request to one or more BCNs.

Pre-Conditions: A requestor (a BTC 142, a BNA 144, or another BTM) may be registered to or associated with a BTM 140 (or a requested (a BCA 143) may be registered to or associated with a BTC 142). The BTM 140 (or the BTC 142) has the addresses of multiple BCNs and may be provisioned and/or configured communicate with them. The requestor may be provisioned and/or configured to access functionalities provided by the BTM 140 (or the BTC 142). The BTM 140 (or the BTC 142) may be provisioned and/or configured interact with designated blockchain systems via multiple BCNs. The BTM 140 (or the BTC 142) may be provisioned and/or configured interact with designated blockchain systems on behalf of the requestor. The requestor may be located in a device (e.g., a smartphone, a vehicle, a sensor); the BTM (or the BTC) as a function may reside (be disposed) in a device, a gateway, an element of an edge network, an element of a 3GPP core network, or an element of a data center. The BCN as a function may reside (be disposed) in a device, a gateway, an element of an edge network, an element of a 3GPP core network, or an element of a data center.

Step 1: The requestor may send a transaction subscription request to the BTM 140 (or the BTC 142) (25:1). The transaction subscription request may include the following parameters: a subscription filter (which may provide criteria on when and under which conditions a BCN needs to generate a notification message).

Step 2: The BTM 140 (or the BTC 142) may process the transaction subscription request (25:2). The BTM 140 (or the BTC 142) may authenticate and may authorize the request. The BTM 140 (or the BTC 142) may analyze the transaction filter as included in the request. By performing this analysis, the BTM 140 (or the BTC 142) may transform the transaction query from step 1 to a new transaction subscription request. The new transaction subscription request can be more easily understood by the BCNs. The new transaction subscription request may include a second subscription filter, which may include a subset of the criteria of the subscription filter included in step 1 or a modified subscription filter.

Step 3: The BTM 140 (or the BTC 142) may select a list of BCNs that match the subscription filter and/or other criteria (e.g., if a BCN is currently available to support transaction query, etc.) (25:3). As an example, two BCNs (BCNx and BCNy) be selected.

Step 4: The BTM 140 (or the BTC 142) may send the new transaction subscription request as produced in step 2 to each selected BCN (25:3). Each selected BCN may process and may store the second subscription filter. Each BCN may send a response message to the BTM 140 (or the BTC 142). The second subscription filter included in the new transaction subscription request to each selected BCN may be different and may be a subset of the original subscription filter.

Step 5: When a subscribed event as described by the subscription filter occurs at a BCN (e.g., BCNx) (25:5), the BCNx may generate a notification message. For example, a subscribed event may be when a new transaction is created by another BTM-Z for a blockchain-based V2X application as requested. When the BTM-Z (not shown in FIG. 25) requests another BCNz to create a new V2X transaction and after the requested transaction is successfully created and sent to the blockchain network, the BCNx (assuming BCNx and BCNz participate in the same blockchain network) may receive this transaction and may send a notification to the BTM 140 (or the BTC 142).

Step 6: The BCNx may send the notification message to the BTM 140 (or the BTC 142) (25:6).

Step 7: The BTM 140 (or the BTC 142) may forward the notification message to the requestor (25:7).

Representative Analytics-based Access Control of Blockchain Networks

Figure 26:
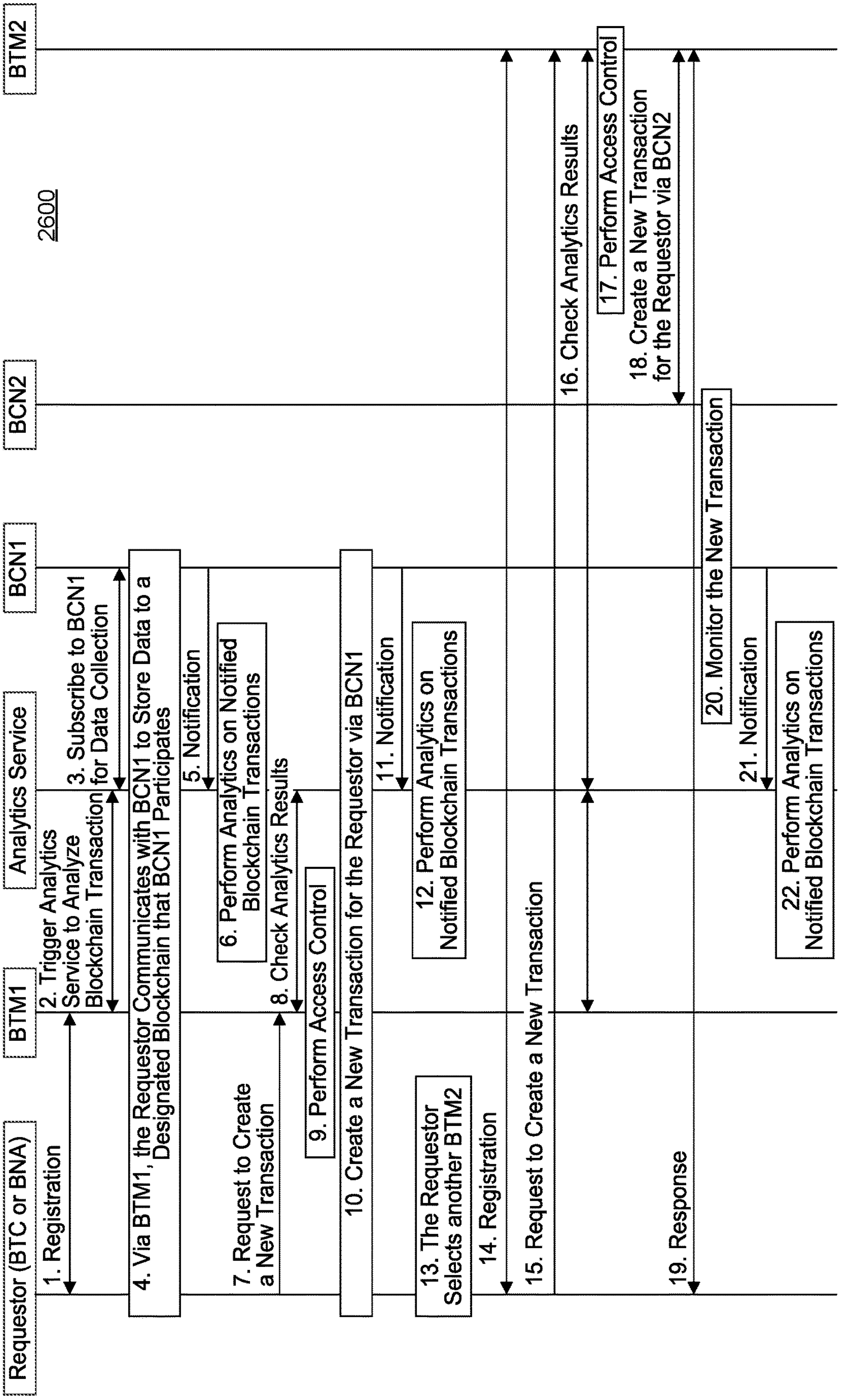
FIG. 26 illustrates a procedure for analytics-based access control to blockchain networks.

FIG. 26 illustrates a procedure 2600 for analytics-based access control to blockchain networks. The procedure 2600 is described with reference to the transaction management architecture 1400 (FIG. 14) and the communications system 100 (FIGS. 1 and 5) for convenience and simplicity of exposition. The procedure 2600 may be carried out using different architectures as well. The procedure 2600 may be suitable (used) in scenarios that include enabling a BTM 140 to use analytics results to perform certain access control when a requestor (e.g., a BTC 142 and/or a BNA 144) requests to create a transaction to a designated blockchain network. The analytics results may be provided by a standalone analytics service or other BTMs.

Pre-Condition: The requestor (e.g., a BTC 142 or a BNA 144) may discover a BTM 140-1. There may be an analytics service, which may be a standalone service or provided as a part of BTM 140-1 or other BTMs. The BTM 140-1 may be provisioned and/or configured with access to a BCN 141-1. A BTM 140-2 may be provisioned and/or configured with access to BCN 141-2. The BCN 141-1 and BCN 141-2 may be participants of the same blockchain network.

Step 1: The requestor may register itself to the BTM 140-1 (26:1). A new requestor identifier (i.e., Req-ID) may be generated and known to both the BTM 140-1 and the requestor.

Step 2: The BTM 140-1 may send to the analytics service a first request to trigger the analytics service to analyze blockchain transactions and generate analytics results (26:2), based on specific analytics requirements, which may be included in this first request. As a part of analytics requirements, an identifier of the requestor (i.e., Req-ID) may be included in this request as well. As an example, an analytics requirement may be: "to calculate the average number of blockchain transactions being created for the requestor for every 10 minutes to the designated blockchain network, which BCN1 participates". An identifier of the BCN 141-1 (i.e., BCN1-ID) may be included as a part of analytics requirements. The analytics service may send a first response to the BCN 141-1 to indicate if it accepts or rejects the indicated analytics requirements from BTM 141-1 (26:2).

Step 3: Based on all accepted analytics requirements, the analytics service may decide which kind of information may be collected in which frequency from BCN 141-1. The analytics service may send a subscription request to the BCN 141-1 and may expect to receive automatic notifications from BCN 141-1 for the purpose of data collection (26:3). The subscription request may include a subscription filter, which may be derived from the accepted analytics requirements. The BCN 141-1 may process the subscription request, store the subscription filter and send a second response to the analytics service.

Step 4: The requestor may use the BTM 140-1 to communicate with the BCN 140-1 in order to create a new transaction to the blockchain network which the BCN 140-1 participates. The BCN 140-1 may generate a new transaction and may send it to the blockchain network (26:4).

Step 5: The generated transaction in step 4 may meet the subscription filter which the BCN 141-1 received in Step 3. The BCN 141-1 may send a first notification to the analytics service (26:5). Based on the subscription filter, the BCN 141-1 may inform the analytics service that a transaction may be generated by BCN 141-1 for the requestor at time T1. The BCN 141-1 may include some other metadata about the generated transaction in the first notification.

Step 6: Based on the notification from BCN 141-1, the analytics service may perform a calculation and certain analytics algorithms to generate an analytics result (26:6). The analytics service may receive multiple notifications from BCN 141-1 and perform one-time analytics over them. The analytics service may maintain the analytics result, which can be retrieved/subscribed by other entities like BCN 141-1 and BCN141-2. Alternatively, and/or additionally, the analytics service can actively push selected analytics results to specific entities.

Step 7: The requestor may send to the BTM 140-1 a second request to create another transaction (26:7).

Step 8: The BTM 140-1 may send to the analytics service a third request to check analytics results related to the requestor (26:8). The third request may include parameters such as a Req-ID of the requestor, an identifier of BTM 140-1 (BTM1-ID), and/or a BCN1-ID. The analytics service may (i) receive the third request, (ii) use the parameters included in the third request to look up appropriate analytics results, and (iii) return any found analytics results to the BTM 140-1 (26:8).

Step 9: The BTM 140-1 may use the analytics results received from the analytics service to perform access control on the second request (26:9). For example, if the analytics results show the average transaction generate rate in the past 10 minutes exceeds a threshold, the BTM 140-1 may reject the second request. and step 10 may be skipped.

Step 10: If the access control allows the third request, the BTM 140-1 together with BCN 141-1 and the requestor may perform other required steps in order to create a new transaction for the requestor (26:10) as requested in Step 7.

Step 11: Similar to step 5, the BCN 141-1 may send a second notification to the analytics service (26:11) if a new transaction has been created as a result of step 10.

Step 12: Similar to step 6, the analytics service may perform analytics on the second notification (26:12) along with any previously received notifications and/or any previously generated analytics result as needed.

Step 13: The requestor may select another BTM 140-2 (26:13).

Step 14: Similar to step 1, the requestor registers itself to the BTM 140-2 (26:14). Along with other parameters as included in Step 1, the requestor may include additional parameters such as BTM1-ID and the Req-ID as assigned by the BTM 140-1.

Step 15: Similar to Step 7, the requestor may send to the BTM 140-2 a fourth request asking to create a new transaction (26:15). The fourth request may include an identifier of the BCN 141-2 (i.e., BCN2-ID).

Step 16: Similar to Step 8, the BTM 140-2 may check analytics results directly from the analytics service (26:16). Alternatively, the BTM 140-2 may check with the BTM 140-1, which may contact the analytics service and return analytics results to the BTM 140-2 (16:16).

Step 17: Similar to Step 9, the BTM 140-2 may perform access control for the fourth request based on the analytics results as received from Step 16 (26:17).

Step 18: If the access control passes, the BTM 140-2 may forward the fourth request to the BCN 141-2 (26:18). The BCN 141-2 may generate a new transaction as requested and send a second response to BTM 140-2.

Step 19: the BTM 140-2 may forward the second response to the requestor (26:19).

Step 20: After a new transaction is generated by BCN 141-2 into the blockchain network, the BCN 141-1 may be able to monitor and detect this, due to the broadcast nature of P2P networking used by the blockchain network (26:20).

Step 21: Similar to step 5 and step 11, the BCN1 may send a third notification to the analytics service (26:21) since the analytics service is subscribed to BCN 141-1.

Step 22: Similar to step 6 and step 12, the analytics service may perform analytics on the third notification and/or any previously received notifications as needed (26:22).

Representative Architectural Embodiment to 5GS

Figure 27:
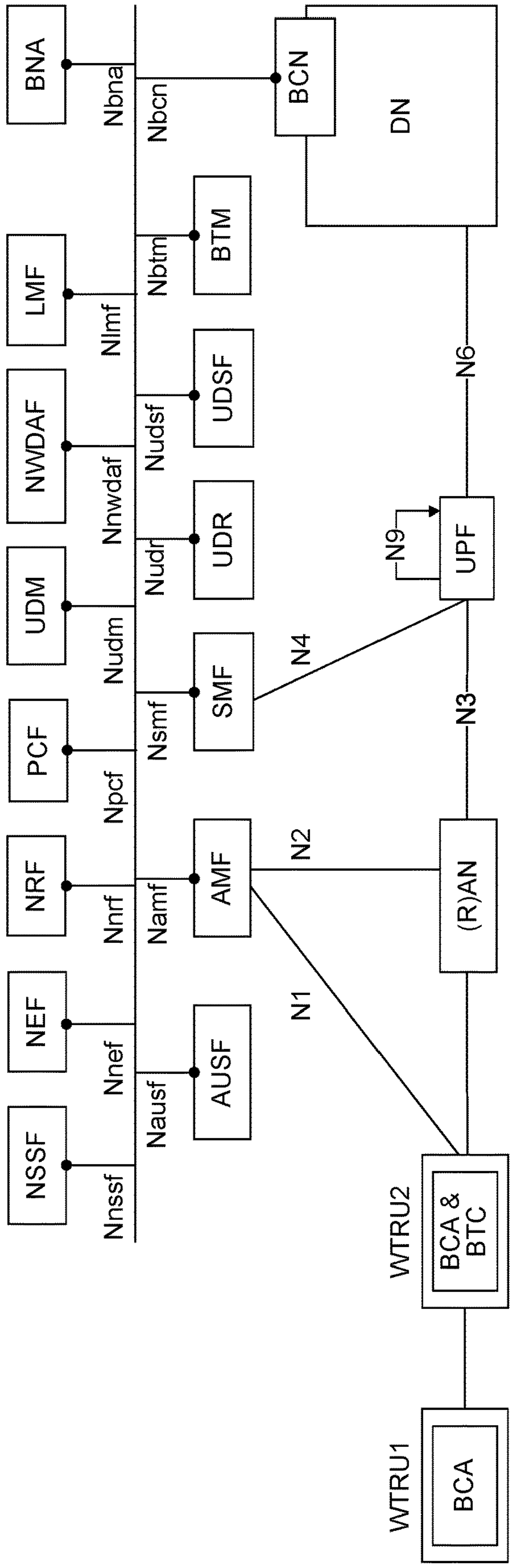
FIG. 27 illustrates an example 5GS architecture extension A with blockchain applications enablement.

FIG. 27 shows an embodiment of blockchain transaction management related logical entities in a context of 5G and beyond communications system architecture. For convenience and simplicity of exposition, the communications system architecture and the blockchain transaction management related logical entities are described with reference to the functional architecture 1400 and the architecture of the communications system 100. The core network refers to either 5G core network or a future wireless core network.

A BTM 140 may be implemented as a new control plane NF or an AF. The BTM 140 may reside (be disposed) in a core network and/or in an edge network. The BTM 140 may need to interact with one or more existing core network functions. For example, the BTM 140 may registers itself to a NRF so that it can discover and/or be discovered by other NFs. The BTM 140 may use an AUSF and/or a PCF to authenticate any blockchain transaction management related requests received from WTRUs 1, 2. The BTM 140 may check with the PCF for any blockchain transaction management related policy rules. The BTM 140 may use a UDSF to store blockchain-related policies. The BTM 140 may use the USDF to store extra data and/or a link to a transaction and/or a block of a blockchain. The BTM 140 may be exposed to, and may be accessed by, third parties through an NEF. The BTM 140 may use a NWDAF to analyze transactions and/or other features of a blockchain.

The BTM 140 may be implemented as a part of an existing network function, such as the NEF. A BCN 141 may be a new NF within the core network or outside of the core network as provided by a third party. If the BCN 141 is provided by a third-party, the BTM 140 may access it via the NEF. A BNA 144 may be implemented as an AF. If the BNA 144 is provided by a third party, it may interact with the BTM 140 via the NEF, but may be prevented from interacting with the BTM 140 directly. A BCA 143 and a BTC 142 may be implemented within a WTRU. Alternatively, a WTRU having constrained resources, such as a narrow-band IoT device, may host the BCA 143 only, and the BTC 142 may be hosted by other powerful WTRUs, such as a vehicle, a gateway, an edge server, etc. A DPP 145 may be implemented as a combination of the PCF and the UDSF. An EDS 146 may be implemented as a UDSF. An analytics service may be implemented as a part of a NWDAF.

Figure 28:
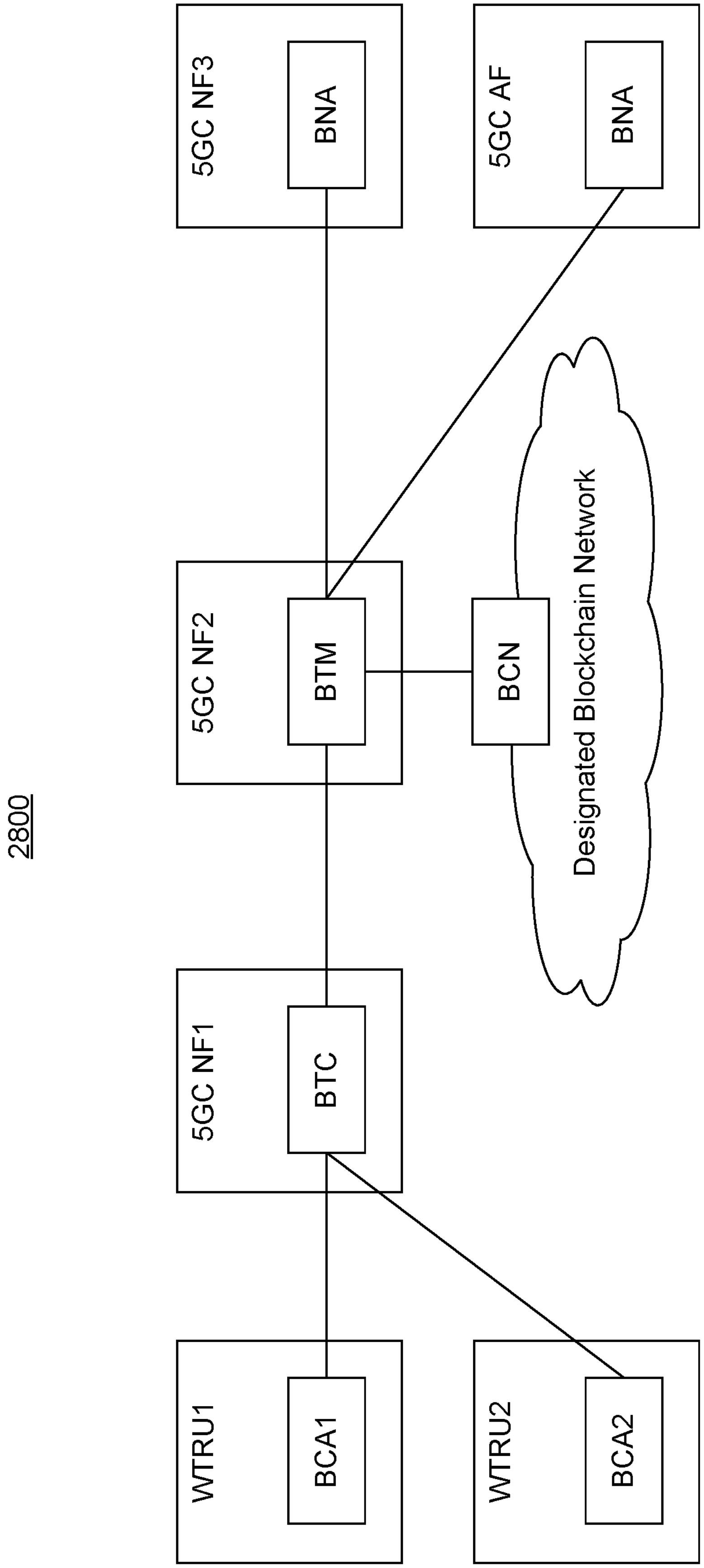
FIG. 28 illustrates an example 5GS architecture extension B with blockchain applications enablement.

As shown in FIG. 28, a BNA 144 may be implemented as new functionality to be part of any current 5G network function NF3 (e.g., an AMF) so that, this NF3 may interact with a BTM 140 and may send transactions to a blockchain network. For example, an SMF with an embedded BNA 144 when it receives a PDU establishment request, may send this event in a transaction to a blockchain network via the BTM 140. In another example, an NRF with an embedded BNA 144 when it receives a NF registration request, may send this event in transaction to a blockchain network via the BTM 140. The interactions between the BNA 144 and the BTM 140 may be implemented as new procedures between a current NF and the BTM 140.

As shown in FIG. 28, a BTC 142 may be implemented as a part of any current 5GC network function NF1, such as a serving AMF. As such, a WTRU1 (or WTRU1) may host a BCA 143*a* (or a BCA 143*b*), but not a BTC. The BCA 143*a* (or the BCA 143*b*) hosted by the WTRU1 (or WTRU2) may talk to the BTC 142 hosted by the network function NF1. The interactions between the BCAs 143*a*, 143*b* and the BTC 142 may be implemented as new procedures between the WTRUs and respective network functions NF1 (e.g., serving AMFs).

As shown in FIG. 28, the BTM 140 may be implemented as a part of a current 5G network function NF2 (e.g., an UDSF). Other network functions may interact with NF2 to use the services provided by the embedded BTM 140 disclosed herein. For example, if an UDSF has an embedded BTM 140, other NFs may request the UDSF to create transactions to a blockchain network. As a result, the UDSF may interface with a BCN to perform BTM-to-BCN and BCN-to-BTM interactions.

A UDSF (and/or a UDR) may use the BTM 140 to store data into the blockchain network to enable distributed data storage within 5GC. For example, the UDSF may include an embedded BNA 144. Whenever the UDSF receives a data storage request, it may use the embedded BNA 144 to talk to the BTM 140 and accordingly store the data into the blockchain in the form of transactions. Alternatively, the UDSF may host the BTM 140. The UDSF may interact with a BCN 141 directly to store data into the blockchain network.

A NRF may use the BTM 140 to store NF registration records into the blockchain network to enable distributed NF registration repository within 5GC. For example, the NRF may include an embedded BNA 144. Whenever the NRF receives a NF registration request, it may use the embedded BNA 144 to talk to the BTM 140 and may store the new NF registration record into the blockchain in the form of transactions. Alternatively, an NRF can host the BTM; and the NRF may interact with a BCN 141 directly to store data into the blockchain network.

Representative BTM-Controlled Transaction Creation in 5GS

Figure 29:
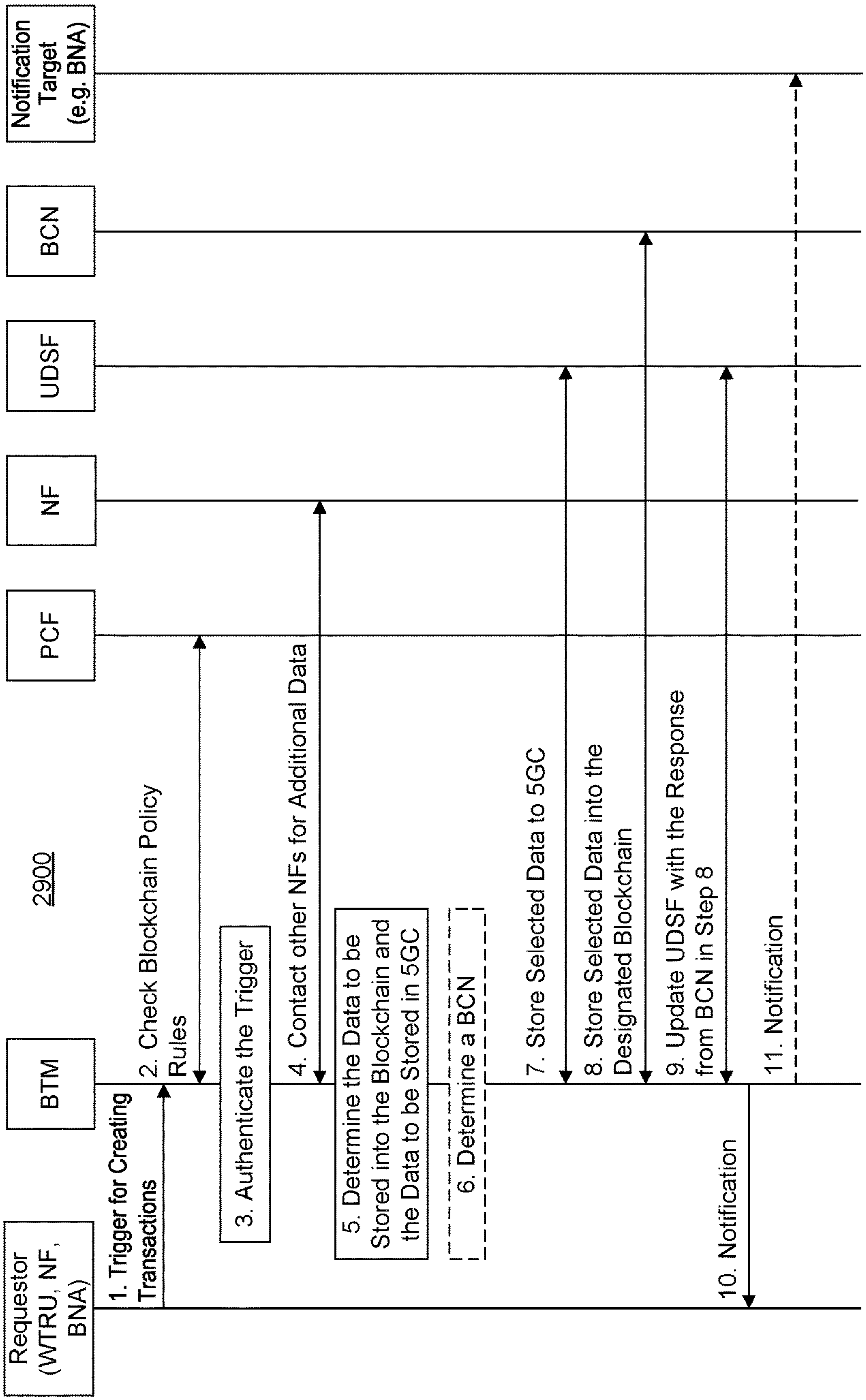
FIG. 29 illustrates an example procedure for transaction manager controlled transaction creation.

FIG. 29 illustrates a procedure 2900 for BTM-controlled transaction creation. The procedure 2900 is described with reference to the communications system architectures of FIG. 27 and/or the communications system architectures of FIG. 28 for convenience and simplicity of exposition. The procedure 2900 may be carried out using different architectures as well. The procedure 2900 may be suitable (used) for scenarios in which a requestor may trigger a BTM to create a new transaction to a designated blockchain network. The entities involved in this procedure include the requestor, the BTM, a PCF, an NF, a UDSF, a BCN, and a notification target.

In various embodiments, the requestor may be (i) a WTRU having a BCA and/or a BTC, (ii) an NF (e.g., an AMF), or (iii) an AF, such as a BNA. The BTM may be implemented as a control plane NF or an AF. The notification target may be an NF, an AF or a BNA. When the requestor is a WTRU, the WTRU may communicate with the BTM via its serving AMF. When the requestor is a BNA, the requestor may communicate with the BTM via an NEF. When the requestor is an NF and the BTM is an AF, the requestor may communicate with the BTM via an NEF. When the BTM is an AF, the requestor may communicate with other core network functions (i.e., the PCF, the NF, and the UDSF) via an NEF.

Pre-Conditions: The requestor may be registered to or associated with the BTM and may be provisioned and/or configured to use its functionalities. The BTM may have associated with the BCN of the blockchain network and may be provisioned and/or configured to request it to create transactions into the designated blockchain. The BTM has the address of an NRF and may be provisioned and/or configured to discover other NFs from the NRF.

Step 1: The requestor may send a trigger request to the BTM to trigger the BTM to create a transaction onto a designated blockchain (29:1). The trigger request may include all or some of the (i) transaction-creation parameter set, (ii) the additional transaction-creation parameters, (iii) the other transaction-creation and may include an identifier of the notification target.

When the requestor is a WTRU, the trigger request may include the following additional parameters: (i) an identifier of the WTRU (i.e., WTRU-ID); (ii) a location of the WTRU (i.e., WTRU-LOC); (iii) other context information about the WTRU, such as connectivity, battery level, etc. When the requestor is an NF, the trigger request may include the following additional parameter: an identifier of the NF (i.e., NF-ID).

Step 2: The BTM may send a first request to the PCF to check for any applicable blockchain policy rules for the requestor (29:2). The first request may include the identifier of the requestor. After receiving the first request, the PCF may retrieve the subscription data of the requestor from the UDR if the requestor is a WTRU. The PCF may generate one or more new blockchain policy rules. The PCF may send a first response to the BTM (29:2). The first response may include one or more blockchain policy rules that are applicable to the BTM and/or the requestor.

Step 3: The BTM may receive the trigger request from the requestor. The BTM may need to authenticate the trigger request (29:3). For this purpose, the BTM may contact an AUSF to retrieve authentication credentials for the requestor. The BTM may use the authentication credentials and policy rules (which may be locally maintained and/or received from the PCF in Step 2) to authenticate the trigger request. If the authentication passes, the following steps may be performed; otherwise, the following steps may be skipped.

Step 4: If the trigger request indicates that the BTM may need to retrieve additional data from one or more NFs, the BTM may contact one or more corresponding NFs to retrieve the additional data (29:4). For example, when the requestor is a WTRU, the WTRU can indicate in the trigger request that the BTM may need to retrieve its location as an additional data from its serving AMF by indicating the address or the identifier of its serving AMF.

Step 5: Similar to step 6 of procedure 1600 of FIG. 16, the BTM may determine data (referred to as Data-for-BC) to be stored to the designated blockchain and data (referred to as Data-for-Non-BC) to be stored in the UDSF (29:5), given all data received in connection with operations denoted in step 1 and step 4.

Step 6: Similar to step 7 of procedure 1600 of FIG. 16, the BTM may select a BCN for the requestor (29:6) if it has not indicated any in step 1. The BTM may search for a BCN from the NRF assuming BCNs register themselves to the NRF. If BCNs register themselves to the BTM, the BTM may search for a BCN from its local database maintaining the (e.g., all) registered BCNs.

Step 7: The BTM may send a data storage request to the UDSF (29:7). The data storage request may include the Data-for-Non-BC and one or more extra parameters, such as the identifier of the requestor and the identifier of the BTM. The UDSF may store Data-for-Non-BC with metadata including, but not limited to, a creation time, the identifier of the requestor, the identifier of the BTM, an address of the stored Data-for-Non-BC, etc. This step may be similar to step 8 and step 9 of procedure 1600 of FIG. 16.

Step 8: The BTM may contact the BCN to store the Data-for-BC and a Hash(Data-for-Non-BC) to the designated blockchain (29:8). As a result, a transaction may be generated by the BCN and may be stored in the distributed ledger. Operations similar to the operations denoted in step 10, step 11, step 14, and step 15 of procedure 1600 of FIG. 16 may be carried out, as well.

Step 9: The BTM may send a request to the UDSF to append the information of the transaction (as generated in step 8) to the Data-for-Non-BC and the additional metadata (29:9). The Data-for-Non-BC was stored in the UDSF as a result of operations denoted in Step 7. Operations similar to the operations denoted in step 16 of procedure 1600 of FIG. 16.

Step 10: The BTM may send a first notification to the requestor (29:10). The first notification may include the address of Data-for-Non-BC as stored in the UDSF and the information about the transaction generated in Step 8.

Step 11: The BTM may send a second notification to the notification target (29:11). The address of the notification target may have been included in the trigger request from the requestor (step 1), in the first request to the PCF (step 2), and/or locally determined by the BTM.

Representative Edge BTM-Controlled Transaction Creation in 5GS

Figure 30:
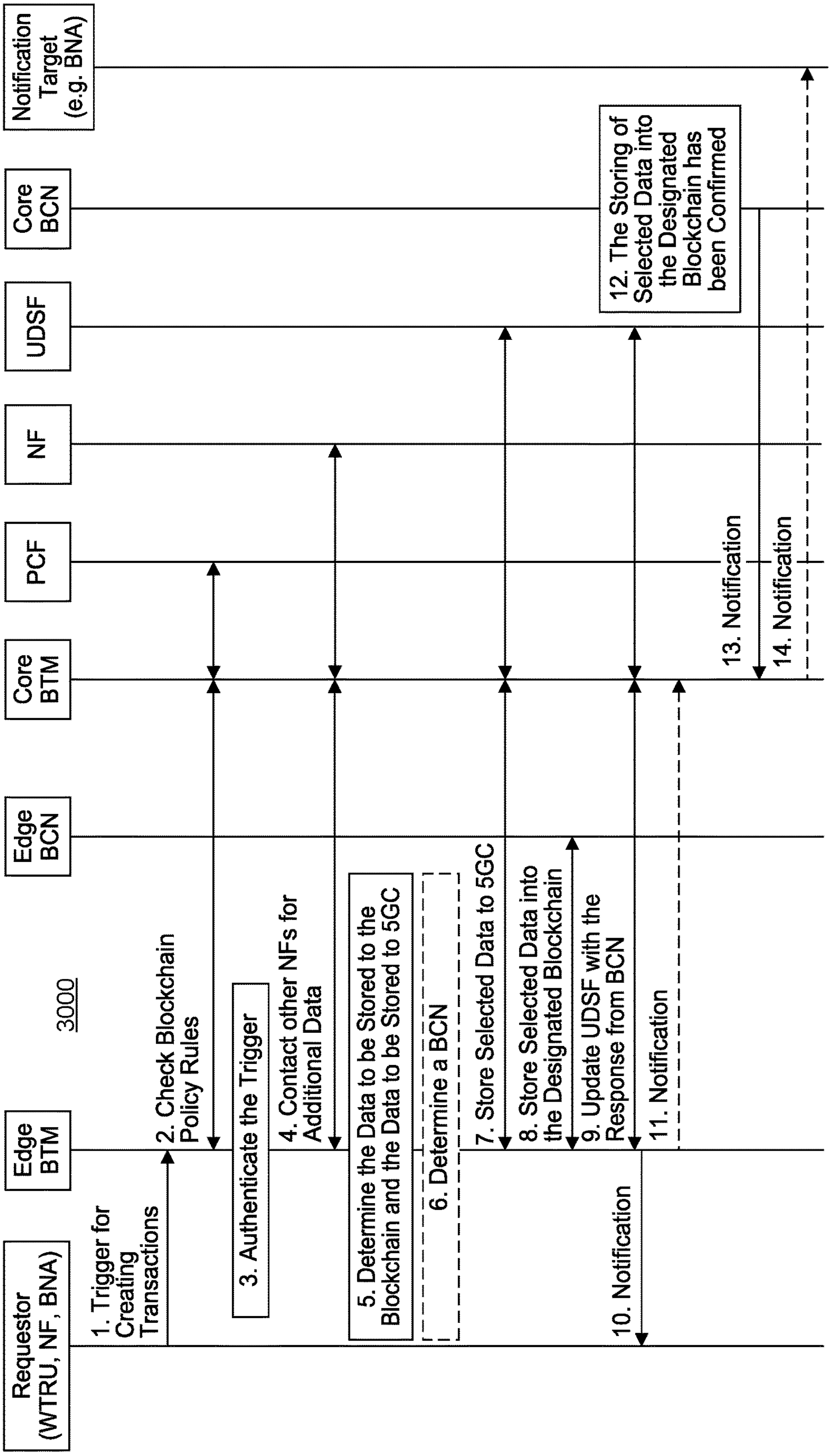
FIG. 30 illustrates an example procedure for transaction manager coordinated transaction creation.

FIG. 30 illustrates a procedure 3000 for BTM-controlled transaction creation. The procedure 3000 is described with reference to the communications system architectures of FIG. 27 and/or the communications system architectures of FIG. 28 for convenience and simplicity of exposition. The procedure 3000 may be carried out using different architectures as well. The procedure 3000 may be suitable (used) for scenarios in which an Edge BTM coordinates to create transactions to a designated blockchain network for a requestor. The entities involved in the procedure 3000 include the requestor, the Edge BTM, an Edge BCN, a Core BTM disposed in/hosted by an element of a CN, a PCF, an NF, a UDSF, a Core BCN disposed in/hosted by an element of a core network, and a notification target.

In various embodiments, the requestor may be a WTRU that has a BCA and/or a BTC. The Edge BTM and the Edge BCN are disposed in/hosted by one or more elements of the edge network close to the requestor. The Edge BTM and Core BTM may be implemented as a control plane NF or an AF. The notification target may be a BNA, an NF, or an AF. When the requestor is a WTRU, the WTRU may communicate with the Edge BTM directly using edge networks and communicate with the Core BTM via its serving AMF. When the BTM is an AF, it may communicate with other core network functions (i.e., the PCF, the NF, and the UDSF) via an NEF. The Edge BTM and Core BTM may communicate with each other directly or via an NEF.

Pre-Conditions: The requestor may be registered to or associated with the Edge BTM and can use its functionalities. The Edge BTM may be registered to or associated with the Core BTM and may be provisioned and/or configured to use its functionalities. The Edge BTM may be associated with the Edge BCN of the designated blockchain network and may be provisioned and/or configured to request it to create transactions to the designated blockchain network. The Core BTM has the address of an NRF and may be provisioned and/or configured communicate with it. The Core BTM may be provisioned and/or configured to discover other NFs from the NRF.

Step 1: The requestor may send a trigger request to the Edge BTM to request the Edge BTM to create a transaction to a designated blockchain network (30:1). The trigger request may include all or some of the parameters included in Step 3 or Step 3' of FIG. 16 and may include an identifier of the notification target. When the requestor is a WTRU, the trigger request may include the following additional parameters: (i) an identifier of the WTRU; (ii) a location of the WTRU (iii) other context information about the WTRU, such as connectivity, battery level, etc. When the requestor is an NF, the trigger request may include the following additional parameter: an identifier of the NF.

Before step 1, the requestor may have been assigned an identifier of the Edge BTM by the Core BTM, so that the requestor can communicate with the Edge BTM. The Core BTM may have assigned the Edge BTM to the requestor as a part of configuring new blockchain policy rules to the requestor and based on the context information of both the requestor (e.g., its current location) and the context information of the Edge BTM (e.g., its service area and current traffic load).

Step 2: The Edge BTM may send to the Core BTM a first request for retrieving new blockchain policy rules (30:2). The Core BTM may process the first request as follows:

- Case 1: If the Core BTM has maintained one or more local blockchain policy rules that can be applied to the Edge BTM and the requestor, the Core BTM may send a first response including the content of the policy rules to the Edge BTM directly without contacting the PCF. The Core BTM may include in the first response message information to configure the Edge BTM with a new Edge BCN and the identifier of the NF.

Case 2: Otherwise, the Core BTM may forward the first request to the PCF and may inform the PCF of one or more parameters, such as e.g., the identifier of the requestor, the identifier of the Edge BTM, the identifier of the Core BTM, etc. The PCF may process the first request and may contact a UDR to obtain subscription data of the requestor, based on which, the PCF generates new blockchain policy rules. The PCF may send to the Core BTM a second response including the content of the new blockchain policy rules. The Core BTM may send the second response to the Edge BTM. The Core BTM may include in the second response message information to configure the Edge BTM with a new Edge BCN and the identifier of the NF. The operations the PCF performs in Case 2 may be akin to the operations the PCF performs in step 2 of FIG. 29.

The Core BTM may include in the first/second response message information to indicate and/or instruct the Edge BTM as to whether it may contact the NF directly or indirectly via the Core BTM.

Step 3: The BTM may receive the trigger request from the requestor. The BTM may need to authenticate the trigger request (30:3). For this purpose, the BTM may contact an AUSF to retrieve authentication credentials for the requestor. The BTM may use the authentication credentials and policy rules (which may be locally maintained and/or received from the PCF) to authenticate the trigger request. If the authentication passes, the following steps may be performed; otherwise, the following steps may be skipped.

Step 4: Similar to Step 4 in FIG. 29. If the trigger request indicates that additional data for the NF is to be obtained, the Edge BTM may communicate with the NF to retrieve additional data (30:4). The Edge BTM may communicate with the NF directly or indirectly (e.g., communications between the Edge BTM and the NF may be relayed by the Core BTM). In various embodiments, the Edge BTM may receive the first/second response message sent to the Edge BTM (Step 2). The first/second response may include the information to indicate and/or instruct the Edge BTM as to whether it may contact the NF directly or indirectly). The Edge BTM may determine whether to communicate with the NF directly or indirectly based on that information.

Step 5: Similar to Step 5 in FIG. 29. The Edge BTM may determine Data-for-BC to be stored to the designated blockchain and Data-for-Non-BC to be stored in the UDSF (30:5), given all data received in connection with operations denoted in step 1 and step 4.

Step 6: Similar to Step 6 in FIG. 29. The Edge BTM may select an Edge BCN for the requestor (30:6). The BTM may search for the Edge BCN from the NRF assuming BCNs register themselves to the NRF. In various embodiments, the first/second response message from the Core BTM (step 2) may include an identifier of the Edge BCN. The Edge BTM may select the Edge BCN based on the identifier of the Edge BCN.

Step 7: Similar to Step 7 in FIG. 29. The Edge BTM may send a data storage request to the UDSF (30:7). The Edge BTM may send data storage request to the UDSF directly or indirectly via the Core BTM. In various embodiments, the first/second response message from the Core BTM (step 2) may include information indicating and/or instructing the Edge BTM as to whether to communicate the UDSF directly or indirectly via the Core BTM and/or indicate the address of the UDSF. The Edge BTM may determine whether to communicate with the UDSF directly or indirectly based on that information.

Step 8: Similar to Step 8 in FIG. 29. The Edge BTM may contact the BCN to store the Data-for-BC and a Hash(Data-for-Non-BC) to the designated blockchain (30:8). Operations similar to the operations denoted in step 10, step 11, step 14, and step 15 of procedure 1600 of FIG. 16 may be carried out, as well. Step 9: Similar to Step 9 in FIG. 29. The Edge BTM may send to the UDSF a second request to append the information of the transaction generated to the Data-for-Non-BC and the additional metadata (30:9). The Data-for-Non-BC may be stored in the UDSF as a result of operations denoted in Step 7. The Edge BTM may send the second request to the UDSF directly or indirectly via the Core BTM. In various embodiments, the first/second response message from the Core BTM (step 2) may include information indicating and/or instructing the Edge BTM as to whether to send the request or otherwise communicate with the UDSF directly or indirectly via the Core BTM. and/or indicate the address of the UDSF. The Edge BTM may determine whether to communicate with the UDSF directly or indirectly based on that information. Operations similar to the operations denoted in step 16 of procedure 1600 of FIG. 16.

Step 10: Similar to Step 10 in FIG. 29. The Edge BTM may send a first notification to the requestor (30:10). The first notification may include the address of Data-for-Non-BC as stored in the UDSF and the information about the transaction generated in Step 8.

Step 11: The Edge BTM may generate a third notification that may include context information about the transaction (step 8). The context information may include metadata and the metadata of the data being stored to the UDSF. The Edge BTM may send the third notification to the Core BTM (30:11). If Step 7 and Step 9 have been performed via the Core BTM, this step may be skipped.

Step 12: The transaction created in step 8 may be successfully confirmed in the designated blockchain as detected by the Core BCN (30:12).

Step 13: The Core BCN may send a second notification to the Core BTM (30:13). The second notification may include the context information of the transaction confirmed in step 12 including its content and metadata. The Core BTM may be subscribed to the Core BCN for receiving such a notification.

Step 14: The Core BTM may send a third notification to the notification target to inform it of the transaction (step 13) (30:14). This step may be similar to step 11 in FIG. 29. Alternatively, the Edge BTM may send such a notification to the notification target after step 10. The Core BTM may send such a notification to the Edge BTM.

Representative AF-Subscribed Transaction Creation in 5GS

Figure 31:
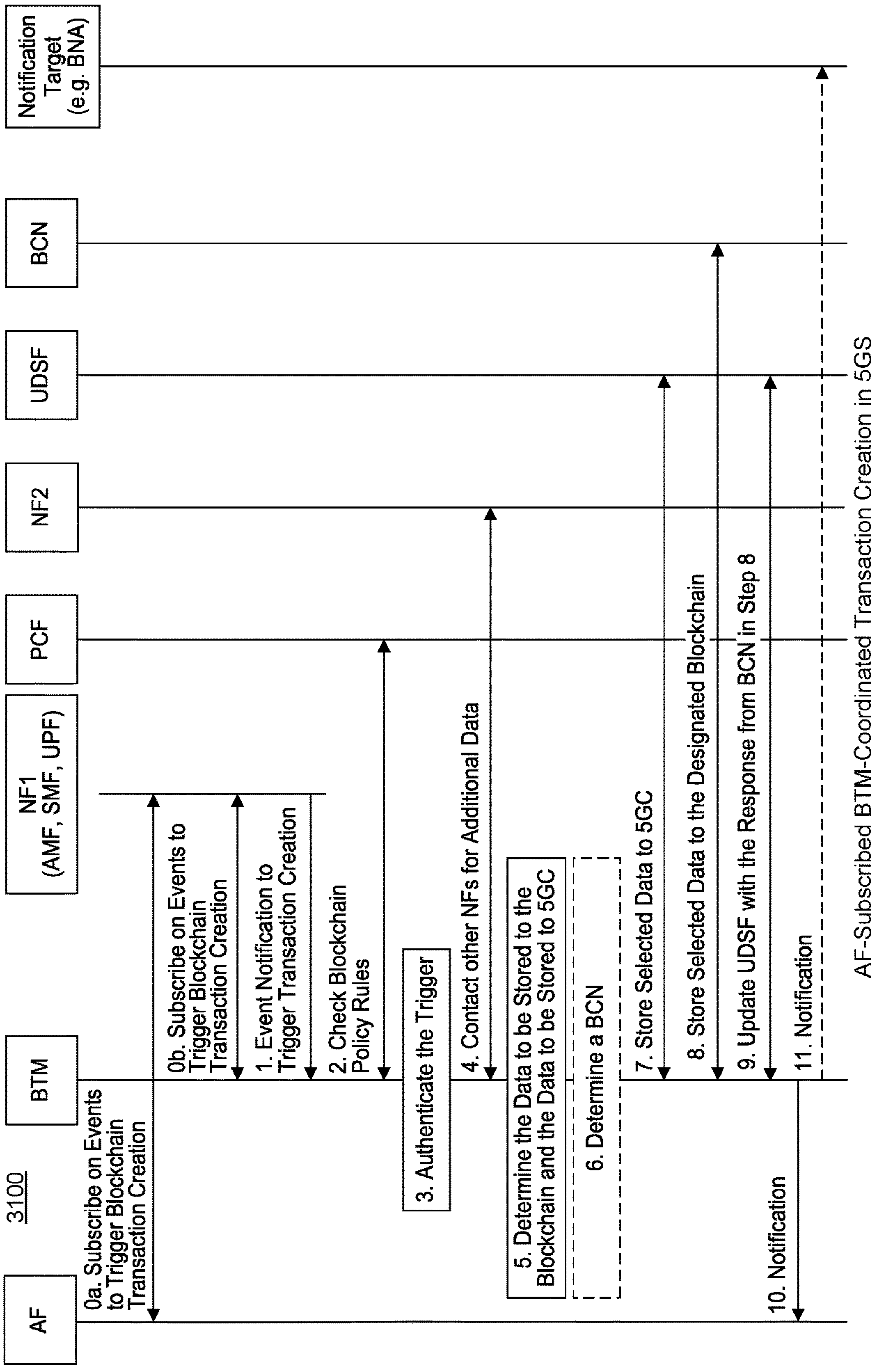
FIG. 31 illustrates an example procedure for coordinated transaction creation.

FIG. 31 illustrates a procedure 3100 for AF-subscribed transaction creation. The procedure 3100 is described with reference to the communications system architectures of FIG. 27 and/or the communications system architectures of FIG. 28 for convenience and simplicity of exposition. The procedure 3100 may be carried out using different architectures as well. The procedure 3100 may be suitable (used) for scenarios in which an AF or a BTM subscribes to a NF1 (e.g., an AMF, an SMF, a UPF) such that the NF1 can trigger the BTM to create a transaction when a subscribed event occurs at the NF1. The entities involved in this procedure include the AF, the BTM, the NF1, a PCF, a NF2, a UDSF, a BCN, and a notification target. The AF may communicate with the BTM via an NEF. The BTM can be implemented as a control plane NF or an AF. When the BTM is an AF, it may communicate with other core network functions (i.e., the PCF, NF2, and the UDSF) via an NEF.

Pre-Condition: The AF may be registered to or associated with the BTM and may be provisioned and/or configured to use its services. The BTM has the address of an NRF and can communicate with it; the BTM may be provisioned and/or configured to discover other NFs from the NRF. The BTM may be associated with the BCN of the designated blockchain network and may be provisioned and/or configured to request it to create transactions to the designated blockchain.

Step 0: Either the AF or the BTM may send a subscription request to the NF1 (31:0). The subscription request may include an identifier of the BTM, and/or an identifier of the AF. It may include a subscription filter indicating one or more conditions or expected events, which if occurring later at the NF1 may trigger the NF1 to send a notification to the NF1. The NF1 may receive this subscription request and may store the subscription filter.

Step 1: The NF1 may monitor its status and any occurring event and may compare each occurring event against the stored subscription filter (31:1). When there is a match, the NF1 may send a notification to the BTM. This notification may include the following parameters: (i) an identifier of the NF1; (ii) content of the matched event (for example, if the matched event is a WTRU registers with its serving AMF, the content of this event may include an identifier of the WTRU, a location of the WTRU, an event time, an identifier of the serving AMF, etc.).

Steps 2-10: Operations similar of the operations denoted by steps 2-10 of the procedure 2900 (FIG. 29) may be carried out.

Step 11: The BTM may send a second notification to the notification target (31:11). The address of the notification target may have been included in the trigger request (step 1), in the first request to the PCF (step 2), and/or locally determined by the BTM. The BTM may send the same notification to the NF1.

WTRU-Triggered Blockchain Transaction Creation Through 5GS Control Plane

Figure 32:
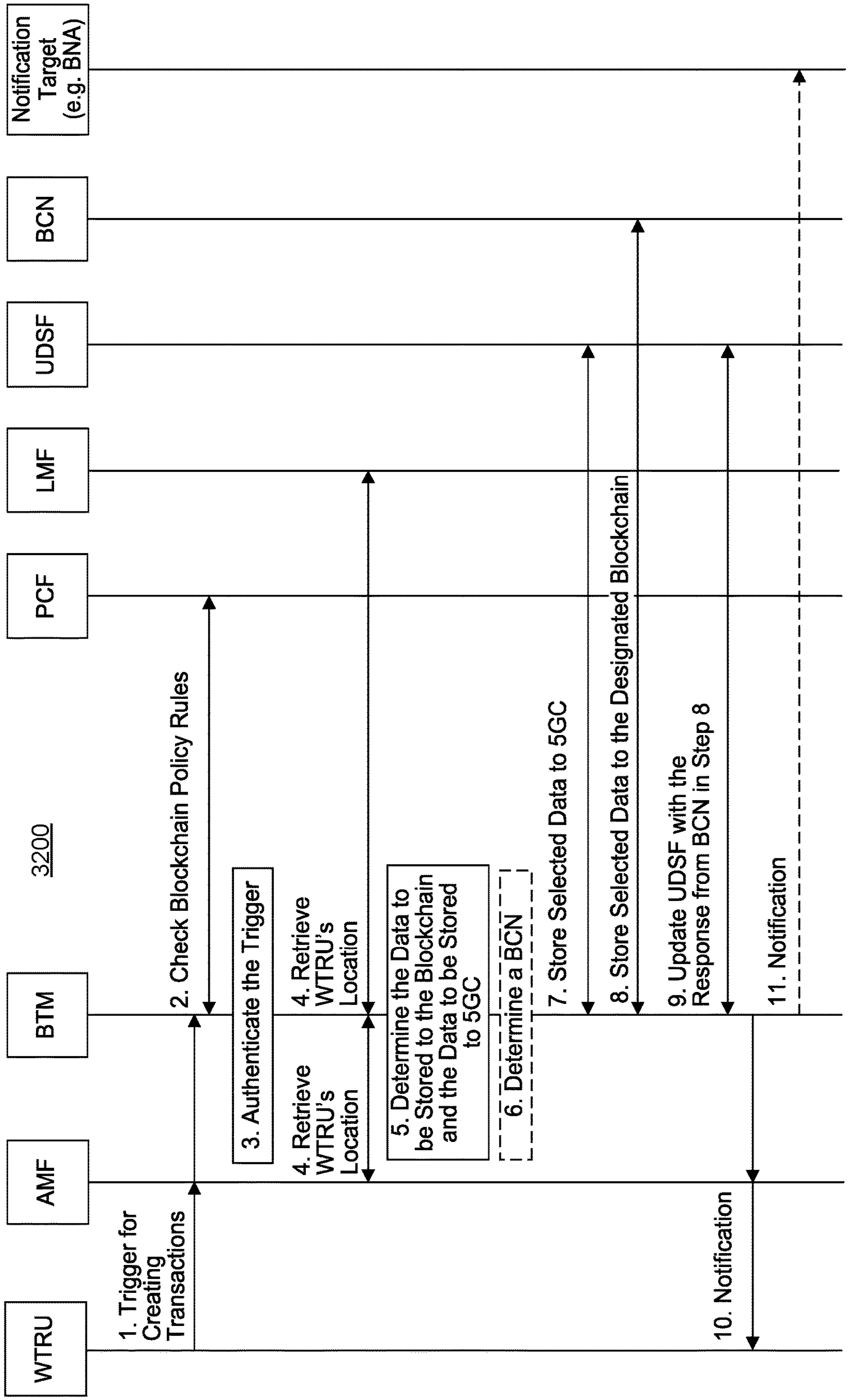
FIG. 32 illustrates an example WTRU-triggered transaction creation.

FIG. 32 illustrates a procedure 3200 for WTRU-triggered blockchain transaction creation. The procedure 3200 is described with reference to the communications system architectures of FIG. 27 and/or the communications system architectures of FIG. 28 for convenience and simplicity of exposition. The procedure 3200 may be carried out using different architectures as well. The procedure 3200 may be suitable (used) for scenarios in which a WTRU triggers a BTM to create a transaction to a designated blockchain network (in which a BCN participates) through the 5GS control plane. The entities involved in this procedure include the WTRU, a serving AMF, the BTM, a PCF, an LMF (or other NF), a UDSF, a BCN, and a notification target. In this case, the WTRU may have a BCA/BTC. The BTM may be implemented as a control plane NF or an AF. The notification target may be an AF, an NF, a BNA, or event another WTRU. The WTRU may communicate with the BTM via its serving AMF. When the BTM is an AF, it may communicate with other core network functions (i.e., the serving AMF, the PCF, the LMF, and the UDSF) via an NEF.

Pre-Conditions: The WTRU may be connected to its serving AMF (i.e., in CM-CONNECTED state). The WTRU (e.g., its BCA/BTC) may be registered to or associated with the BTM and may be provisioned and/or configured to use its functionalities. The BTM may be associated with the BCN of the designated blockchain network and may be provisioned and/or configured to request it to create transactions to the designated blockchain. The BTM has the address of an NRF and communicate with it; the BTM may be provisioned and/or configured to discover other NFs from the NRF.

Step 1: Similar to step 1 in FIG. 29. The WTRU may send the trigger in a request to its serving AMF, which may forward the trigger request to the BTM (32:1). If the identifier of a BTM is not included in the trigger request from the WTRU, the serving AMF may search the BTM from an NRF and/or a UDSF to find the BTM which the WTRU can communicate with. The serving AMF may forward the trigger request to the BTM. The serving AMF may buffer the received request from the WTRU if there is no available BTM. The serving AMF may contact an AUSF to retrieve authentication credentials of the WTRU and may contact a UDM to retrieve subscription data of the WTRU. Based on the authentication credentials and the subscription data, the serving AMF may drop the trigger request without forwarding it to the BTM.

Step 2: The BTM may send a first request to the PCF to check for any applicable blockchain policy rules for the requestor (32:2). The first request may include the identifier of the requestor. After receiving the first request, the PCF may retrieve the subscription data of the requestor from the UDR if the requestor is a WTRU. The PCF may generate one or more new blockchain policy rules. The PCF may send a first response to the BTM (32:2). The first response may include one or more blockchain policy rules that are applicable to the BTM and/or the requestor.

Step 3: The BTM may receive the trigger request from the requestor. The BTM may need to authenticate the trigger request (32:3). For this purpose, the BTM may contact an AUSF to retrieve authentication credentials for the requestor. The BTM may use the authentication credentials and policy rules (which may be locally maintained and/or received from the PCF in Step 2) to authenticate the trigger request. If the authentication passes, the following steps may be performed; otherwise, the following steps may be skipped.

Step 4: If the trigger request indicates that the BTM may retrieve additional data, where, for example, the additional data may be a current location of the WTRU, as an example. The BTM may send a location request directly to the LMF or send it to the serving AMF, which may retrieve the location on behalf of the BTM. Eventually, the BTM obtains the current location of the WTRU directly from the LMF or from the serving AMF.

Steps 5-9: Operations similar to the operations of steps 5-9 of the procedure 2900 (FIG. 29) may be carried out, where the identifier of the WTRU (i.e., WTRU-ID) is used.

Step 10: Similar to Step 10 in FIG. 29. The BTM may send a notification to the WTRU, which may be relayed by the serving AMF of the WTRU. If the serving AMF has been changed, the BTM can search for it from the UDM (or from the NRF) by providing the WTRU-ID.

Step 11: Operations similar to the operations of step 11 of the procedure 2900 (FIG. 29) may be carried out.

Figure 33:
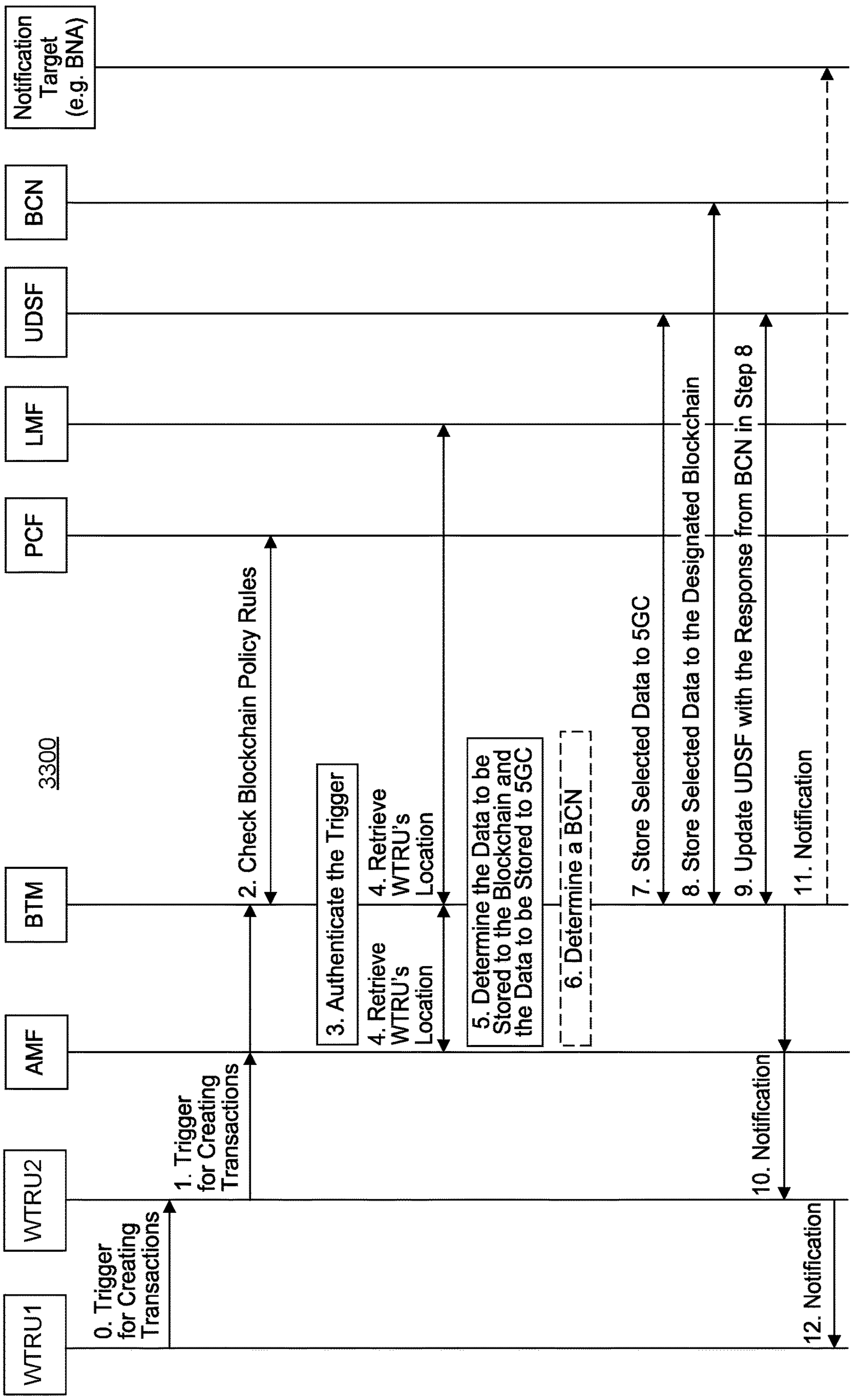
FIG. 33 illustrates an example WTRU-triggered transaction creation.

FIG. 33 illustrates a procedure 3200 for WTRU-triggered blockchain transaction creation. The procedure 3300 is described with reference to the communications system architectures of FIG. 27 and/or the communications system architectures of FIG. 28 for convenience and simplicity of exposition. The procedure 3300 may be carried out using different architectures as well. The procedure 3300 may be suitable (used) for scenarios in which a second WTRU2 may assist a first WTRU1 to create a transaction to a designated blockchain through the 5GS control plane, which a BCN participates. In this case, the WTRU1 may be a constrained device and can only host a BCA, while the WTRU2 may be more powerful and can host a BTC to serve the BCA in the WTRU1.

The entities involved in this procedure include the WTRU1, the WTRU2, a serving AMF, a BTM, a PCF, an LMF (or other NF), a UDSF, a BCN, and a notification target. The BTM can be implemented as a control plane NF or an AF. The notification target may be an AF, an NF, a BNA or even another WTRU. The WTRU2 may communicates with the BTM via its serving AMF. When the BTM is an AF, it may communicate with other core network functions (i.e., the serving AMF, the PCF, the LMF, and the UDSF) via an NEF.

Pre-Conditions: The WTRU1 has discovered the WTRU2 and may be provisioned and/or configured to communicate with the WTRU2 directly or indirectly via the 5GS. The WTRU2 may be connected to its serving AMF (e.g., in CM-CONNECTED state). The BCA on the WTRU1 may be registered to or associated with the BTC on the WTRU2. The WTRU2 (e.g., its BTC) may be registered to or associated with the BTM and may be provisioned and/or configured to use its functionalities. The BTM may be associated with the BCN of the designated blockchain and may be provisioned and/or configured to request it to create transactions to the designated blockchain network. The BTM has the address of an NRF and may be provisioned and/or configured communicate with it. The BTM may be provisioned and/or configured to discover other NFs from the NRF.

Step 0: The WTRU1 may send a trigger request to WTRU2 (33:0). This trigger request may include the same set of parameters as included in step 1 of FIG. 32.

Step 1: Similar to step 1 in FIG. 32, but the trigger being sent from the WTRU2 to the BTM may include identifiers of the WTRU1 and the WTRU2.

Step 2: Similar to step 2 in FIG. 32. The BTM may provide the identifiers of the WTRU1 and the WTRU2 to the PCF and request blockchain policy rules which can be applied to the WTRU1 and/or the WTRU2.

Step 3: Similar to step 3 in FIG. 32. The BTM may authenticate the received trigger request against both identifiers of the WTRU1 and the WTRU2.

Step 4: Similar to step 4 in FIG. 32. The BTM may ask to retrieve the current location and/or other information about the WTRU1 and/or the WTRU2.

Step 5: Similar to step 5 in FIG. 32.

Step 6: Similar to step 6 in FIG. 32.

Step 7: Similar to step 7 in FIG. 32. The BTM may inform the UDSF of the identifiers of the WTRU1 and the WTRU2, which the UDSF may store as a part of metadata of the data being stored as requested by the BTM.

Step 8: Similar to step 8 in FIG. 32. The created transaction may include the identifiers of the WTRU1 and/or the identifier of WTRU2.

Step 9: Similar to step 9 in FIG. 32.

Step 10: Similar to step 10 in FIG. 32.

Step 11: Similar to step 11 in FIG. 32.

Step 12: The WTRU2 may forward the notification received from step 10 to the WTRU1.

Figure 34:
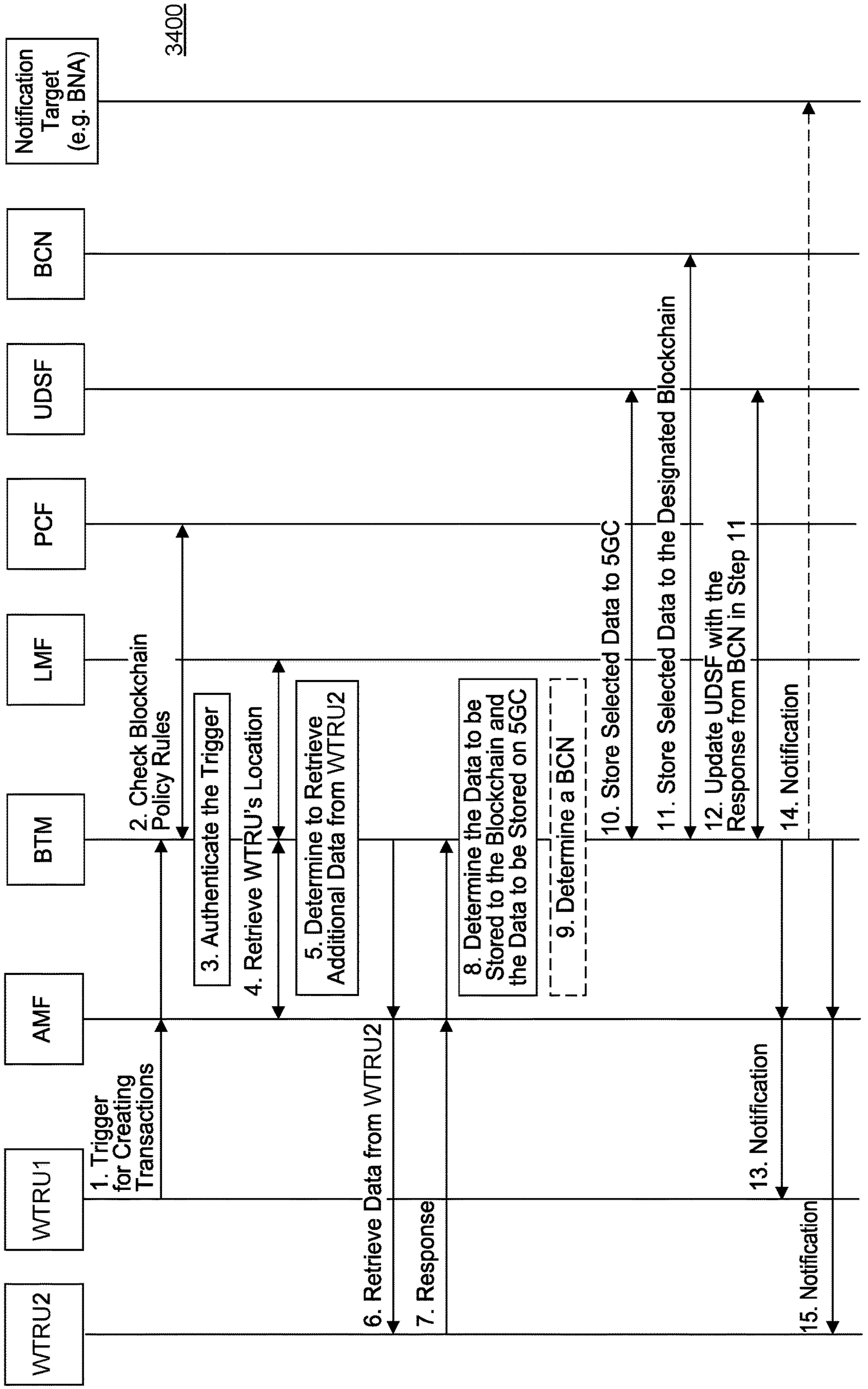
FIG. 34 illustrates an example WTRU-triggered transaction creation.

FIG. 34 illustrates a procedure 3400 for WTRU-triggered blockchain transaction creation. The procedure 3400 is described with reference to the communications system architectures of FIG. 27 and/or the communications system architectures of FIG. 28 for convenience and simplicity of exposition. The procedure 3400 may be carried out using different architectures as well. The procedure 3400 may be suitable (used) for scenarios in which a first WTRU1 may trigger a BTM to create a transaction to a designated blockchain through 5GS control plane, which a BCN participates. But in order to create the requested transaction, the BTM needs to get the approval or additional data from another WTRU2 (or another NF, another AF or another BNA). The entities involved in this procedure include the WTRU1, the WTRU2, a serving AMF, the BTM, a PCF, an LMF, a UDSF, a BCN, and a notification target. In this case, either the WTRU1 or the WTRU2 has a BCA/BTC. The BTM can be implemented as a control plane NF or an AF. The notification target may be an AF or a BNA. The WTRU1 and the WTRU2 may communicate with the BTM via the serving AMF. is Although only one serving AMF is shown, the WTRU1 and the WTRU2 may have different serving AMF. When the BTM is an AF, it may communicate with other core network functions (i.e., the serving AMF, the PCF, the LMF, and the UDSF) via an NEF.

Pre-Condition: The WTRU1 and the WTRU2 may be connected to the serving AMF (e.g., in CM-CONNECTED state). The WTRU1 and the WTRU2 (e.g., BCA/BTC thereof) may be registered to or associated with the BTM and may be provisioned and/or configured to use its functionalities. The BTM may be associated with the BCN of the designated blockchain and may be provisioned and/or configured to request it to create transactions to the designated blockchain. The BTM has the address of an NRF and may be provisioned and/or configured communicate with it. The BTM may be provisioned and/or configured to discover other NFs from the NRF.

Step 1: Similar to Step 1 in FIG. 32. Since in this scenario the transaction creation may be confirmed by the WTRU2 and/or may obtain additional data from the WTRU2, an identifier of the WTRU2 may be included in this step. Alternatively, the identifier of WTRU2 may be included in blockchain policy rules which the BTM maintains locally or obtains from the PCF; as such, the BTM can obtain the identifier of the WTRU1 as a part of Step 5 from blockchain policy rules. The trigger request may indicate that the BTM may need to contact another AF (or another NF or another BNA) instead of the WTRU2.

Step 2: Similar to step 2 in FIG. 32.

Step 3: Similar to step 3 in FIG. 32.

Step 4: Similar to step 4 in FIG. 32.

Step 5: Based on the trigger request from step 1 and/or blockchain policy rules which the BTM maintains locally and/or receives from the PCF, the BTM may determine that it needs to get additional data or a confirmation from the WTRU2 (or another NF/AF/BNA) before performing further steps.

Step 6: The BTM may send a request to the WTRU2 to retrieve additional data or get its confirmation. The request may include the identifier of WTRU1, an identifier of a BCA in the WTRU1, an identifier of a BTC in the WTRU1, the identifier of the BTM, an identifier of a BCA in the WTRU2, a identifier of a BTC in the WTRU2, etc. This request may be relayed by the serving AMF of the WTRU2. The BTM may search serving AMF of the WTRU2 from a UDM or an NRF using the WTRU2's identifier. If the WTRU2 is currently in CM-IDLE state, the serving AMF may page the WTRU2 to make it connect to the serving AMF and return to a CM-CONNECTED state. The serving AMF may forward the request to the WTRU2. If it is indicated in step 1 or step 5 that the BTM needs to contact another AF (or another NF/BNA) instead of the WTRU2, the BTM may contact another AF (or another NF/BNA) for obtaining its confirmation or additional data.

Step 7: WTRU2 may receive the request and may send a response to the BTM via its serving AMF. The response message may include a confirmation or the additional data as the BTM requested in step 6.

Step 8: Similar to step 5 in FIG. 32.

Step 9: Similar to step 6 in FIG. 32.

Step 10: Similar to step 7 in FIG. 32.

Step 11: Similar to step 8 in FIG. 32.

Step 12: Similar to step 9 in FIG. 32.

Step 13: Similar to step 10 in FIG. 32. The identifier of the WTRU2 may be included in this step.

Step 14: Similar to step 11 in FIG. 32. The notification message may include identifiers of the WTRU1 and the WTRU2.

Step 15: Similar to Step 13, the BTM may send a notification to the WTRU2 via its serving AMF. This notification message may include the same content as included in the notification in step 13.

WTRU-Triggered Blockchain Transaction Creation Through 5GS Data Plane

Figure 35:
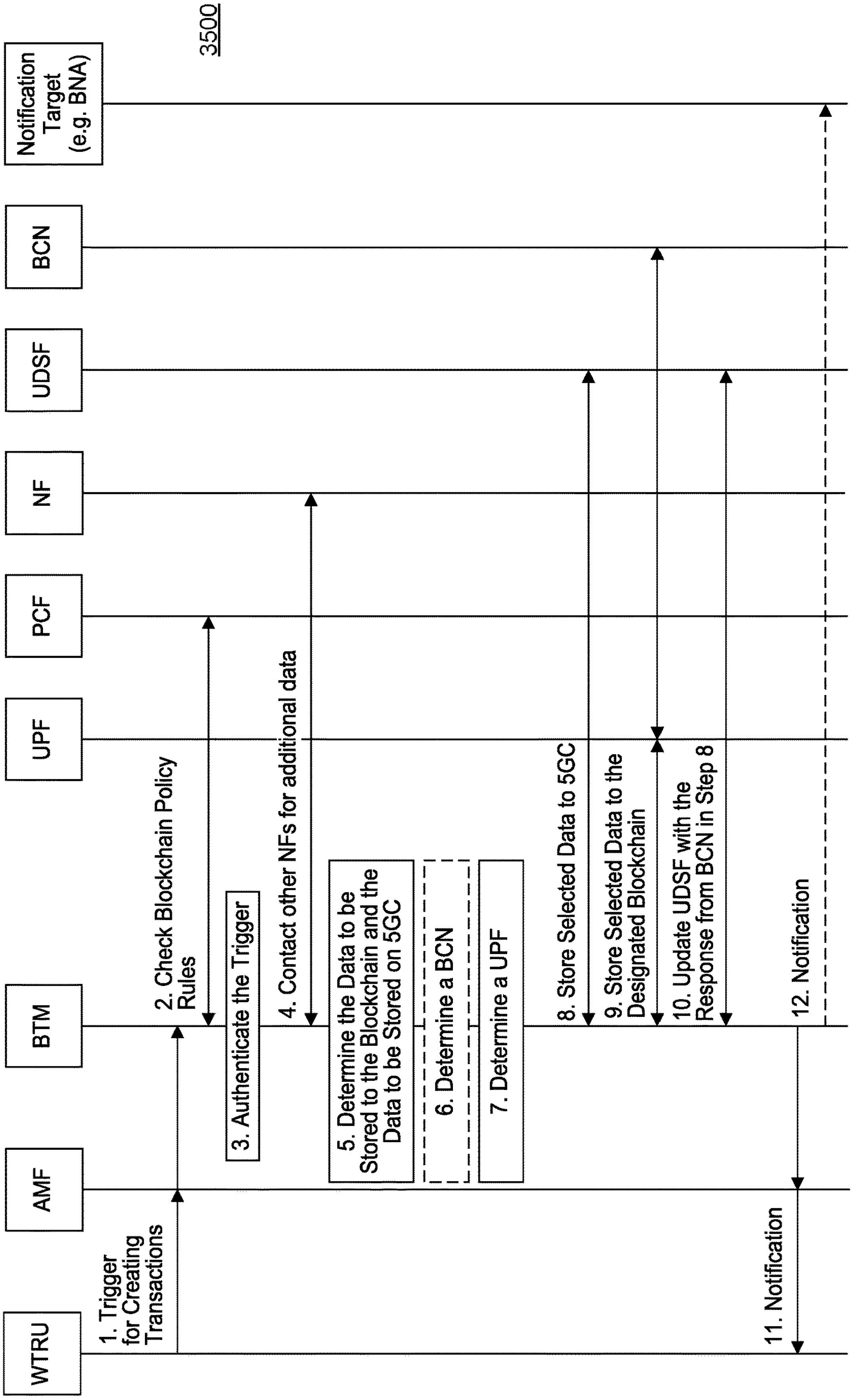
FIG. 35 illustrates an example WTRU-triggered transaction creation.

FIG. 35 illustrates a procedure 3500 for WTRU-triggered blockchain transaction creation. The procedure 3200 is described with reference to the communications system architectures of FIG. 27 and/or the communications system architectures of FIG. 28 for convenience and simplicity of exposition. The procedure 3200 may be carried out using different architectures as well. The procedure 3200 may be suitable (used) for scenarios in which a WTRU may trigger a BTM to create a transaction to a designated blockchain through the 5GS data plane, which a BCN participates. The entities involved in this procedure include the WTRU, a serving AMF, the BTM, a UPF, a PCF, an NF (e.g., an LMF), a UDSF, a BCN, and a notification target. In this case, the WTRU has a BCA/BTC. The BTM can be implemented as a control plane NF or an AF. The Notification Target may be an NF, an AF or a BNA. The WTRU communicates with the BTM via its serving AMF. When the BTM is an AF, it may communicate with other core network functions (i.e., the serving AMF, the UPF, the PCF, the NF, and the UDSF) via an NEF.

Pre-Condition: The WTRU may be connected to its serving AMF (e.g., in CM-CONNECTED state). The WTRU (e.g., its BCA/BTC) may be registered to or associated with the BTM and may be provisioned and/or configured to use its functionalities. The BTM may be associated with the BCN of the designated blockchain and may be provisioned and/or configured to request it to create transactions to the designated blockchain. The BTM has the address of an NRF and may be provisioned and/or configured communicate with it. The BTM may be provisioned and/or configured to discover other NFs from the NRF.

Steps 1-6: Same as Step 1-6 in FIG. 32.

Step 7: After the BCN is determined, the BTM may determine the UPF, through which the BTM can reach the BCN. For this purpose, the BTM may send a request to an SMF to establish a PDU session for the BCN. The SMF may determine and select a UPF based on the address of the BCN, which the BTM provided to the SMF. The SMF may establish such a PDU session for the BTM and passes session information (e.g., the address of the BTM, the address of the BCN, and other QoS related flow information for the traffic from the BTM to the BCN) to the selected UPF. The SMF may send a response back to the BTM with the established session information and/or the address of the UPF.

Step 8: Same as Step 7 in FIG. 32.

Step 9: The BTM may use the 5GS data plane to reach the BCN. The request being sent to the BCN for creating a new transaction may be sent to the UPF via an SMF. The UPF may forward the request to the BCN. In the other direction, when the BCN sends a response back to the BTM, the response may be intercepted by the UPF and may be forwarded to the BTM by the UPF via an SMF.

Step 10: Same as Step 9 in FIG. 32.

Step 11: Same as Step 10 in FIG. 32.

Step 12: Same as Step 11 in FIG. 32. This notification may be sent to the notification target over the same PDU session as established as a part of Step 7.

Figure 36:
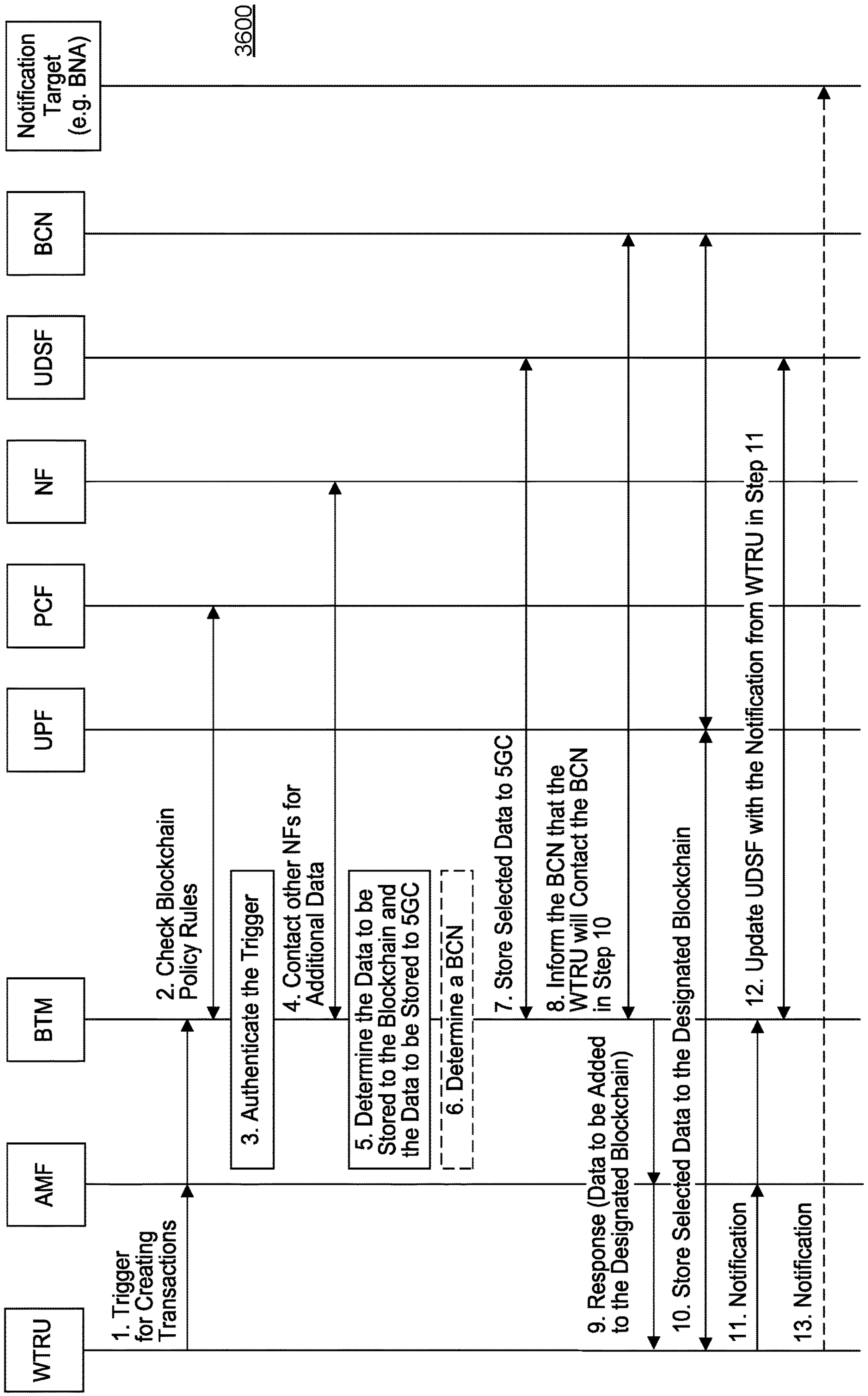
FIG. 36 illustrates an example WTRU-triggered transaction creation.

FIG. 36 illustrates a procedure 3600 for WTRU-triggered blockchain transaction creation. The procedure 3600 is described with reference to the communications system architectures of FIG. 27 and/or the communications system architectures of FIG. 28 for convenience and simplicity of exposition. The procedure 3600 may be carried out using different architectures as well. The procedure 3600 may be suitable (used) for scenarios in which a WTRU may trigger a BTM to create a transaction to a designated blockchain through the 5GS data plane, which a BCN participates. The entities involved in this procedure include the WTRU, a serving AMF, the BTM, a UPF, a PCF, an NF (e.g., an LMF), a UDSF, a BCN, and a notification target. In this case, the WTRU may have a BCA/BTC. The BTM may be implemented as a control plane NF or an AF. The notification target may be an NF, an AF or a BNA. The WTRU may communicates with the BTM via its serving AMF. When the BTM is an AF, it may communicate with other core network functions (i.e., the serving AMF, the UPF, the PCF, the NF, and the UDSF) via an NEF.

Pre-conditions: The WTRU may be connected to its serving AMF (e.g., in CM-CONNECTED state). The WTRU (e.g., its BCA/BTC) may be registered to or associated with the BTM and may be provisioned and/or configured to use its functionalities. The BTM may be associated with the BCN of the designated blockchain and may be provisioned and/or configured to request it to create transactions to the designated blockchain. The BTM has the address of an NRF and may be provisioned and/or configured communicate with it. The BTM may be provisioned and/or configured to discover other NFs from the NRF.

Step 1: Same as Step 1 in FIG. 35.

Step 2: Same as Step 2 in FIG. 35.

Step 3: Same as Step 3 in FIG. 35.

Step 4: Same as Step 4 in FIG. 35.

Step 5: Same as Step 5 in FIG. 35.

Step 6: Same as Step 6 in FIG. 35.

Step 7: Same as Step 8 in FIG. 35.

Step 8: The BTM may send a request to inform the BCN that the WTRU may contact the BCN for storing data to the designated blockchain in Step 10. The request may include the WTRU's identifier and security credential information (e.g., a token, a security certificate), which the BCN can use to authenticate the WTRU when the WTRU contacts the BCN in Step 10.

Step 9: The BTM may send a response to the WTRU via its serving AMF. The response may include the data to be stored to the designated blockchain and all other required information for performing this task by the WTRU in Step 10. The response may include the same security credential information as included in Step 8. In addition, the address of the BCN may be included in the response message.

Step 10: The WTRU may send the data received from Step 8 in a request to the BCN via an established PDU session. If a PDU session has not been established, the WTRU may establish a PDU session towards the BCN via its serving AMF/SMF. The request may include the WTRU1's identifier and the same security credential information as received in Step 9. The BCN may compare the WTRU's identifier and the security credential as received in Step 10 and Step 8. If the WTRU's identifier and the security credential as received in Step 10 and Step 8 match (e.g., identical, or one can decrypt the other), the BCN may authorize the request. The BCN may (i) create a new transaction as requested, (ii) store the new transaction to the designated blockchain, and (iii) send a response back to the WTRU via the same UPF.

Step 11 & Step 12: The WTRU may send a notification to the BTM indicating all relevant information about the created transaction in Step 10. Similar to Step 9 in FIG. 32, the BTM may send an update to the UDSF. Alternatively, instead of the BTM sending an update to the UDSF, the WTRU can send the same update to the UDSF via WTRU's serving AMF.

Step 13: The WTRU may send a notification to the notification target. This notification may include all relevant information about the created transaction in Step 10. Alternatively, the BTM may send such a notification to the notification target as it received in Step 10.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 25 U. S.C. § 112, ¶6 or means-plus-function claim format, and any claim without the terms "means for" is not so intended.

What is claimed is:

1. A method implemented in a first device comprising circuitry, including a transmitter, a receiver and a processor, the method comprising:

receiving at least one first transmission from at least one second device via any of wired and wireless transmission media, wherein each of the at least one first transmission comprises content and first information, wherein the first information indicates (i) a request to add the content to a distributed ledger; (ii) an identifier of a client application of the corresponding at least one second device, the client application associated with the request, and (iii) second information identifying the distributed ledger, and wherein the content comprises at least one of first data and third information indicating a locator for retrieving second data from a first repository other than the distributed ledger;

generating a digital transaction record for fourth information, wherein the fourth information comprises (i) at least some of the first data, (ii) at least some of the second data or (ii) at least some of the first data and at least some of the second data;

determining a node of a distributed ledger based at least in part on the first information and at least in part on a proximity of the first device to the node of the distributed ledger; and transmitting at least one second transmission to the at least one second device via any of the wired and wireless transmission media, wherein each of the at least one second transmission comprises (i) fifth information indicating a response to the request, (ii) sixth information indicating a block sequence number associated to the digital transaction record stored in the distributed ledger, and (ii) seventh information indicating an locator of third data associated with the digital transaction record and stored in a second repository separate and apart from the distributed ledger, wherein the third data comprises (i) at least some of the first data, (ii) at least some of the second data or (ii) at least some of the first and second data.

2. The method of claim 1, comprising:

transmitting the digital transaction record to the node of the distributed ledger via any of wired and wireless transmission media.

3. The method of claim 1, comprising:

transmitting the third data to the second repository via any of wired and wireless transmission media.

4. The method of claim 1, wherein the node of the distributed ledger is a first node of the distributed ledger, the method further comprising:

receiving a confirmation of successful insertion of the digital transaction record into the distributed ledger, wherein the confirmation is received from any of the first node of the distributed ledger, a second node of the distributed ledger and a second device associated with at least one of the first node and the second node.

5. The method of claim 1, comprising: notifying one or more recipients of a status of the digital transaction record.

6. The method of claim 1, wherein generating a digital transaction record comprises generating the digital transaction record based on the first information and at least one of (i) one or more policy rules and (ii) a hash value of the third data.

7. The method of claim 6, wherein the one or more policy rules comprise any of a first policy rule to regulate whether (i) at least some of the first data, (ii) at least some of the second data or (iii) at least some of the first data and some of the second data is to be added to the distributed ledger and a second policy rule to regulate how (i) at least some of the first data, (ii) at least some of the second data or (iii) at least some of the first data and at least some of the second data is to be added in the distributed ledger.

8. The method of claim 1, wherein the first information comprises any of (i) a number of transactions to be created, (ii) an application category associated with each of the one or more sources, (iii) an application name associated with each application, (iv) security credential information for each of the one or more sources, (v) a category of transaction to be created, (vi) a maximum transaction creation time, (vii) a maximum transaction waiting time, (viii) a transaction creation priority, (ix) a transaction inclusion priority, (x) an address of each of one or more recipients to be notified of a status of the transaction, (xi) a type of the distributed ledger, (xii) a hash function, (xiii) an indication of at least one of the one or more policy rules and (xiv) security credential information of the first device.

9. The method of claim 1, wherein at least one of generating the digital transaction record and determining the node of a distributed ledger is based on one or more blockchain transaction policy rules.

10. A first device comprising circuitry, including a transmitter, a receiver, a processor, and memory, configured to:

receive at least one first transmission from at least one second device via any of wired and wireless transmission media, wherein each of the at least one first transmission comprises content and first information, wherein the first information indicates (i) a request to add the content to a distributed ledger, (ii) an identifier of a client application of the corresponding at least one second device, the client application associated with the request, and (iii) second information identifying the distributed ledger, and wherein the content comprises at least one of first data and third information indicating a locator for retrieving second data from a first repository other than the distributed ledger;

generate a digital transaction record for fourth information, wherein the fourth information comprises (i) at least some of the first data, (ii) at least some of the second data, or (iii) at least some of the first data and at least some of the second data;

determine a node of a distributed ledger based at least in part on the first information and at least in part on a proximity of the first device to the node of the distributed ledger; and transmit at least one second transmission to the at least one second device via any of the wired and wireless transmission media, wherein each of the at least one second transmission comprises (i) fifth information indicating a response to the request, (ii) sixth information indicating a block sequence number associated to the digital transaction record stored in the distributed ledger, and (iii) seventh information indicating an indicator/locator of third data associated with the digital transaction record and stored in a second repository separate and apart from the distributed ledger, wherein the third data comprises (i) at least some of the first data, (ii) at least some of the second data, or (iii) at least some of the first and second data.

11. The first device of claim 10, wherein the circuitry is configured for at least one of (i) generating the digital transaction record based on one or more blockchain transaction policy rules and (ii) determining the node of a distributed ledger based on the one or more blockchain transaction policy rules.

12. The first device of claim 10, wherein the circuitry is configured to transmit the digital transaction record to the node of the distributed ledger via any of wired and wireless transmission media.

13. The first device of claim 12, wherein the circuitry is configured to transmit the third data to the second repository via any of wired and wireless transmission media.

14. The first device of claim 10, wherein the node of the distributed ledger is a first node of the distributed ledger, wherein the circuitry is configured to:

receive a confirmation of successful insertion of the digital transaction record into the distributed ledger, wherein the confirmation is received from any of the first node of the distributed ledger, a second node of the distributed ledger and a second device associated with at least one of the first node and the second node.

15. The first device of claim 10, wherein the circuitry is configured to notify one or more recipients of a status of the digital transaction record.

16. The first device of claim 10, wherein the circuitry is configured to generate the digital transaction record based on the first information and at least one of (i) one or more policy rules and (ii) a hash value of the third data.

17. The first device of claim 16, wherein the one or more policy rules comprise any of a first policy rule to regulate whether (i) at least some of the first data, (ii) at least some of the second data, or (iii) at least some of the first data and some of the second data is to be added to the distributed ledger and a second policy rule to regulate how (i) at least some of the first data, (ii) at least some of the second data, or (iii) at least some of the first data and at least some of the second data is to be added in the distributed ledger.

18. The first device of claim 10, wherein the first information comprises any of (i) a number of transactions to be created, (ii) an application category associated with each of the one or more sources, (iii) an application name associated with each client application, (iv) security credential information for each of the one or more sources, (v) a category of transaction to be created, (vi) a maximum transaction creation time, (vii) a maximum transaction waiting time, (viii) a transaction creation priority, (ix) a transaction inclusion priority, (x) an address of each of one or more recipients to be notified of a status of the transaction, (xi) a type of the distributed ledger, (xii) a hash function, (xiii) an indication of at least one of the one or more policy rules, and (xiv) security credential information of the first device.

* * * * *